(12) United States Patent
Norman et al.

(10) Patent No.: US 12,385,887 B2
(45) Date of Patent: Aug. 12, 2025

(54) COLLET, DEVICES, AND METHODS FOR INSTALLATION OF FLUIDIC CONDUITS TO FLUIDIC COMPONENTS

(71) Applicant: Agilent Technologies, Inc., Santa Clara, CA (US)

(72) Inventors: Wesley M. Norman, Ludenberg, PA (US); Wei J. Song, Wilmington, DE (US)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 245 days.

(21) Appl. No.: 17/120,632

(22) Filed: Dec. 14, 2020

(65) Prior Publication Data
US 2021/0190243 A1   Jun. 24, 2021

Related U.S. Application Data

(60) Provisional application No. 62/953,043, filed on Dec. 23, 2019.

(51) Int. Cl.
*G01N 30/60* (2006.01)
*F16L 19/02* (2006.01)

(52) U.S. Cl.
CPC ...... *G01N 30/6004* (2013.01); *F16L 19/0206* (2013.01); *F16L 19/0212* (2013.01); *G01N 30/6026* (2013.01)

(58) Field of Classification Search
CPC .............. F16L 19/0206; F16L 19/0212; G01N 30/6026; G01N 30/6034; G01N 30/6039; G01N 30/6004
USPC ................................................. 279/2.01–2.09
See application file for complete search history.

(56) References Cited

U.S. PATENT DOCUMENTS

| | | | |
|---|---|---|---|
| 5,938,919 A | * | 8/1999 | Najafabadi ........ G01N 30/6047 |
| 10,119,638 B2 | | 11/2018 | Pa et al. |
| 2008/0129045 A1 | * | 6/2008 | Shimizu .............. F16L 19/0231 |
| 2008/0309076 A1 | * | 12/2008 | Cormier ............. G01N 30/6026 |
| 2011/0298210 A1 | * | 12/2011 | Hochgraeber ..... G01N 30/6026 |
| 2012/0117784 A1 | * | 5/2012 | Collin .................. F16L 19/0206 |
| 2012/0205304 A1 | * | 8/2012 | Plant .................. G01N 30/6034 |
| 2012/0223520 A1 | * | 9/2012 | Graham ............. G01N 30/6039 |
| 2014/0130580 A1 | * | 5/2014 | Mcadams .......... G01N 30/6026 |
| 2014/0353929 A1 | * | 12/2014 | Motschi .............. B23B 31/4006 279/2.03 |

FOREIGN PATENT DOCUMENTS

EP            0406597 A2 *  6/1990  ............ F16L 19/083

* cited by examiner

*Primary Examiner* — Zachary T Dragicevich

(57) ABSTRACT

A collet includes a cap, a conduit grasper, a collet bore, and a collet slot. The grasper is composed of a flexible material such that the grasper is compressible in response to an applied force. A conduit such as a column is installed in a fluidic component by passing the conduit through the collet and into a fluidic coupling device. The collet is then coupled to the fluidic coupling device so as to compress the grasper against the column, thereby securing the column in the fluidic coupling device. The conduit may then be inserted into the fluidic component, and fluidic coupling device may be coupled to the fluidic component to complete the conduit installation. The collet or at least the cap may then be removed by moving the collet or at least the cap around the column via the collet slot. The grasper may be removed via a grasper slot.

17 Claims, 21 Drawing Sheets

COLLET, DEVICES, AND METHODS FOR INSTALLATION OF FLUIDIC CONDUITS TO FLUIDIC COMPONENTS

CROSS-REFERENCE TO RELATED APPLICATIONS

This application claims the benefit of priority of U.S. provisional patent application, Appl. No. 62/953,043, filed Dec. 23, 2019, the content of which is incorporated in its entirety herein by reference.

TECHNICAL FIELD

The present invention relates generally to fluidic fittings, particularly the installation of fluidic conduits such as tubes, including capillary tubes or other types of conduits to a fluidic fitting or other type of fluidic component. As one example, the invention may be applied to chromatographic instrumentation in which a column is installed to a fluidic fitting associated with a sample inlet, a detector, etc.

BACKGROUND

Chromatography (e.g., gas chromatography (GC) or liquid chromatography (LC)) involves the use of chromatographic columns. A chromatographic column is configured to subject a sample flowing through the column to chromatographic separation. That is, as the sample flows through the column, different chemical compounds of the sample from each other, and elute from the outlet of the column as "bands". The separated bands (chemical compounds) then flow to an appropriate detector, which detects and quantitatively measures the bands. The electrical output signal from the detector is then processed to generate a chromatogram, in which the bands appear as "peaks" (measured signal intensity) over time. The sample is conducted through the column while being carried by (or dissolved in) a gas mobile phase (in the case of GC) or liquid mobile phase (in the case of LC). The mobile phase is a solvent or a mixture of two or more solvents. The column contains a stationary phase formulated to interact with the sample. The different affinities the different chemical compounds have for the stationary phase, or the different relative affinities each chemical compound has for the mobile phase on the one hand and the stationary phases on the other hand, forms the basis for the chromatographic separation. As such, the column plays a critical role in the successful operation of the chromatographic instrument in analyzing the sample. Such columns are typically fused silica or metal tubes and are capillary-sized, typically having inside diameters on the order of micrometers (μm).

A column is installed in a chromatography instrument by connecting (fluidly coupling) one end of the column to a sample inlet (e.g., a "GC inlet" in the case of GC) and the other end to a detector configured to detect the separated chemical compounds. The connection between the column and a sample inlet or detector is typically made by compressing and deforming a ferrule to form fluidic seals between the ferrule and a column nut, and between the ferrule and the column.

Widely known difficulties attend the conventional installation of a column, which involves utilizing known fluidic coupling devices (in particular, column nuts). To realize optimal and acceptable performance, there are several common requirements for the installation of a column end. One requirement is that the column end needs to be squarely and cleanly cut. Another requirement is that the column end needs to extend out from the tip of the ferrule by a certain distance, referred to herein as a "designated axial distance" or "designated column end distance," so that the column end will be positioned in the correct location in the fluidic component to which the column is to be installed. There are many different types of fluidic components, particularly sample inlets and detectors, to which the column may need to be connected. Examples of sample inlets include a split/splitless inlet, a purged-packed inlet, a Multimode Inlet (MMI) device (available from Agilent Technologies, Inc., Santa Clara, California, USA), etc. Examples of detectors include a flame ionization detector (FID), a thermal conductivity detector (TCD), an electron capture detector (ECD), a flame thermionic detector (FTD), a flame photometric detector (FPD), a mass spectrometer (MS) (e.g., MSD instruments available from Agilent Technologies, Inc.), an ion mobility spectrometer (IMS), etc. Each type of sample inlet or detector requires a specific (value of the) designated axial distance (e.g., 1.5 millimeters (mm), 5 mm, 13 mm, etc.) to achieve the best analytical results. Moreover, there are several types of ferrule materials, such as pure graphite, metal, a Vespel® polymer, and Vespel® polymer-graphite composites. There are also several types of column nuts, such as the standard type of column nut (of which there are many variations), a self-tightening column nut, a Capillary Flow Technology (CFT) device (available from Agilent Technologies, Inc.), etc.

All of the foregoing variations make column installation very complicated. For instance, it can be difficult to rotate the column nut and maintain the above-noted designated axial distance at the same time, all the while fighting gravity and the stresses in the column that are pulling on the column. If pure graphite or metal ferrules are utilized, they can be pre-swaged onto the column and thereby often stay in position during the installation process. The column may then be properly trimmed to achieve the correct designated axial distance for the particular fluidic component. However, the pre-swaging process is very delicate, requiring a trained technician and nonetheless prone to error. Moreover, a ferrule made of a Vespel® polymer or a Vespel® polymer-graphite composite cannot be pre-swaged at all, because this type of ferrule material would spring back to its original dimensions and thus not grasp the column. This would cause sliding and repositioning of the ferrule on the column, which may or may not be discovered by the user.

In view of the foregoing, there is an ongoing need for new and/or improved devices or apparatuses, and methods for installing tubes, including columns, as part of making a leak-free fluidic coupling.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one example, a collet for installing a conduit in a fluidic coupling includes a cap and a conduit grasper. The cap comprises: a cap comprising an outer lateral cap surface and a collet engagement component configured to engage a fluidic coupling device; a conduit grasper comprising an outer grasper surface; a collet bore extending through the cap and the conduit grasper along a collet axis; and a collet slot extending along the collet axis, and extending radially from the collet bore to the outer lateral cap surface and to the outer grasper surface, wherein the conduit grasper has a toroidal shape about the collet axis, and is composed of a flexible material such that the conduit grasper is compressible in response to a force applied to the outer grasper surface.

According to another example, a collet for installing a conduit in a fluidic coupling includes: a cap; and a conduit grasper. The cap comprises: a first cap end surface; a second cap end surface spaced from the first cap end surface along a collet axis; a cap bore extending along the collet axis from the first cap end surface to the second cap end surface, the cap bore comprising a threaded cap section; an outer lateral cap surface extending from the first cap end surface to the second cap end surface and surrounding the cap bore; and a cap slot extending along the collet axis from the first cap end surface to the second cap end surface, and extending radially relative to the collet axis from the cap bore to the outer lateral cap surface. The conduit grasper comprises: a first grasper end surface; a second grasper end surface axially opposing the first grasper end surface; a grasper bore extending from the first grasper end surface to the second grasper end surface; an outer grasper surface extending from the first grasper end surface to the second grasper end surface and surrounding the grasper bore; and a grasper slot extending axially from the first grasper end surface to the second grasper end surface, and extending radially from the grasper bore to the outer grasper surface. The conduit grasper is configured to be disposed in (e.g., integral with, or inserted into) the cap bore such that the grasper bore is aligned with the cap bore on the collet axis. The conduit grasper is composed of a flexible material such that the grasper bore is compressible in response to a force applied to the outer grasper surface.

According to another example, a fluidic coupling device for installing a conduit includes: a conical cavity configured to receive an outer grasper surface of a collet according to any of the examples disclosed herein; a conduit nut body comprising a first axial nut end and a second axial nut end spaced from the first axial nut end along a device axis; a nut bore extending through the conduit nut body from the first axial nut end to the second axial nut end; and a first nut engagement component disposed at the first axial nut end, and configured to engage a fluidic component configured to receive the conduit.

According to another example, a fluidic coupling assembly includes: a fluidic coupling device according to any of the examples disclosed herein; and a conduit extending through the collet bore and into the nut bore, wherein the conduit grasper is compressed against the conical cavity, and the conduit grasper is compressed against the conduit in the collet bore.

According to another example, a fluidic coupling device includes: a conduit nut body elongated along a device axis, and comprising a first axial nut end and a second axial nut end spaced from the first axial nut end along the device axis; a nut bore extending through the conduit nut body from the first axial nut end to the second axial nut end, the nut bore comprising a conical nut section disposed at the second axial nut end, wherein the conical nut section is configured to contact an outer grasper surface of a collet according to any of the examples disclosed herein; a first nut engagement component disposed at the first axial nut end, and configured to engage an engagement component of a fluidic component configured to receive a conduit; and a second nut engagement component disposed at the second axial nut end, and configured to engage a collet engagement component of the collet.

According to another example, a fluidic coupling assembly includes: a fluidic coupling device according to any of the examples disclosed herein; and a conduit extending through the collet bore and into the nut bore, wherein an outer grasper surface of the conduit grasper is in contact with the conical nut section, and the conduit grasper is in contact with the conduit in the collet bore.

According to another example, a fluidic coupling device includes: a conduit nut body elongated along a device axis, and comprising a first axial nut end and a second axial nut end spaced from the first axial nut end along the device axis; a nut bore extending through the conduit nut body from the first axial nut end to the second axial nut end; a first nut engagement component disposed at the first axial nut end, and configured to engage an engagement component of a fluidic component configured to receive a conduit; a second nut engagement component disposed at the second axial nut end; and an adapter comprising an adapter bore, a first adapter engagement component configured to engage the second nut engagement component, and a second adapter engagement component configured to engage the collet engagement component, wherein the adapter bore comprises a conical adapter section configured to contact the outer grasper surface.

According to another example, a fluidic coupling assembly includes: a fluidic coupling device according to any of the examples disclosed herein; and a conduit extending through the collet bore and the adapter bore, and into the nut bore, wherein an outer grasper surface of the conduit grasper is compressed against the conical adapter section, and the conduit grasper is compressed against the conduit in the collet bore.

According to another example, a method for installing a conduit in a fluidic coupling device includes: providing a collet according to any of the examples disclosed herein, the collet comprising a cap, a conduit grasper, and a collet bore; removably engaging the cap with the fluidic coupling device, such that the conduit grasper is between the cap and the fluidic coupling device; passing the conduit through the collet bore and into a device bore of the fluidic coupling device; and after the engaging and the passing, securing an axial position of the conduit by axially translating the cap in a first direction relative to the fluidic coupling device to axially translate the conduit grasper into contact with the fluidic coupling device, wherein the conduit grasper is compressed against the conduit in the collet bore.

According to another example, a method for installing a conduit in a fluidic coupling device includes: providing a collet according to any of the examples disclosed herein, the collet comprising a cap, a conduit grasper, and a collet bore; providing an adapter comprising an adapter bore; removably engaging the adapter with the fluidic coupling device; removably engaging the cap with the adapter, such that the conduit grasper is between the cap and the adapter; passing the conduit through the collet bore and the adapter bore, and into a device bore of the fluidic coupling device; and after the engaging the adapter with the fluidic coupling device, after the engaging the cap with the adapter, and after the passing, securing an axial position of the conduit by axially translating the cap in a first direction relative to the adapter to axially translate the conduit grasper into contact with the adapter, wherein the conduit grasper is compressed against the conduit in the collet bore.

In an example of any of the methods disclosed herein, the method includes making a fluid coupling assembly. Here, the passing comprises passing the conduit through the device bore such that an end section of the conduit protrudes beyond the fluidic coupling device, the end section terminating at a conduit end. The method further includes: after the securing, inserting the conduit end into a component bore of a fluidic component, and coupling the fluidic coupling device to the fluidic component.

In an example of any of the methods disclosed herein, the method further includes, after the securing, removing the cap.

In an example of any of the methods disclosed herein, the cap is removed by: axially translating the cap in a second direction opposite to the first direction to disengage the collet engagement component from the engagement component of the fluidic coupling device; and moving the cap away from the conduit such that the conduit passes through the cap slot.

According to another example, a kit for installing a conduit in a fluidic coupling includes: a fluidic coupling device according to any of the examples disclosed herein, and configured to be coupled to a fluidic component configured to receive a conduit; and a collet according to any of the examples disclosed herein, and configured to be coupled to the fluidic coupling device.

According to another example, a kit for installing a conduit in a fluidic coupling includes: a fluidic coupling device according to any of the examples disclosed herein, and configured to be coupled to a fluidic component configured to receive a conduit; an adapter according to any of the examples disclosed herein, and configured to be coupled to the fluidic coupling device; and a collet according to any of the examples disclosed herein, and configured to be coupled to the adapter.

According to another example, a chromatograph apparatus or system includes: a conduit comprising a conduit inlet and a conduit outlet; a fluidic component according to any of the examples disclosed herein; and a fluidic coupling device according to any of the examples disclosed herein, wherein the fluidic coupling device couples at least one of the conduit inlet or the conduit outlet to the fluidic component. In an example, the chromatograph apparatus or system includes at least a first fluidic coupling device coupled to the conduit inlet and a second fluidic coupling device coupled to the conduit outlet. In an example, the fluidic coupling device(s) may be coupled or assembled according to any of the methods disclosed herein.

In any of the examples disclosed herein, the toroidal shape of the conduit grasper may have one of the following configurations: a cylinder (e.g., a straight cylinder); a cylinder, wherein the outer grasper surface comprises a conical grasper section, and the conduit grasper is compressible in response to a force applied to the conical grasper section; and a torus (e.g., like an o-ring).

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
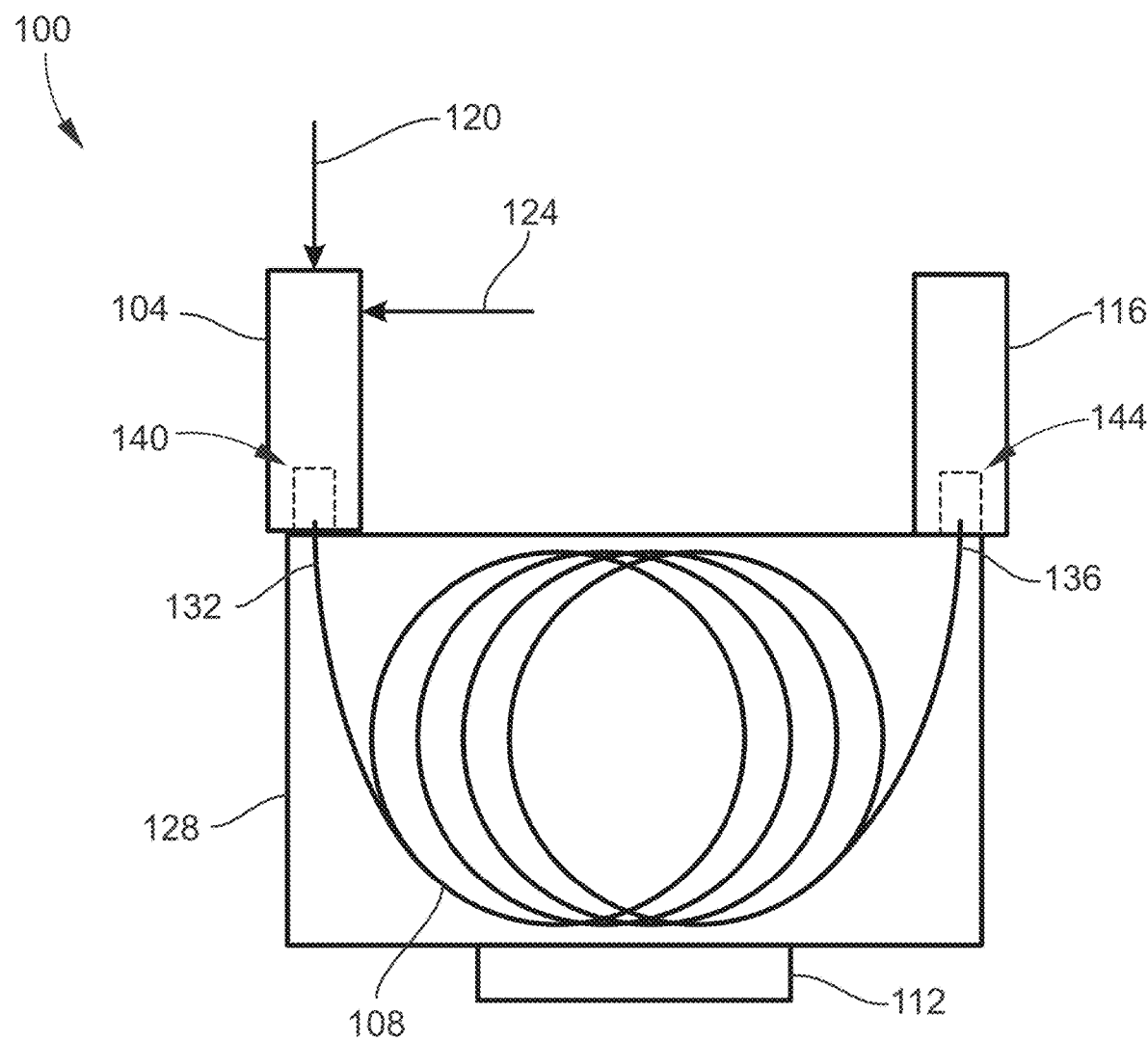
FIG. 1 is a schematic view of an example of a gas chromatograph (GC) system or apparatus according to an example of the present disclosure.

FIG. 1 illustrates a non-exclusive example of an operating environment to which the presently disclosed subject matter may be applied. Specifically, FIG. 1 is a schematic view of an example of a gas chromatograph (GC) system or apparatus 100, also referred to simply as a gas chromatograph or GC, according to a representative example. Gas chromatography and instrumentation utilized in the implementation of gas chromatography are generally understood by persons skilled in the art. Accordingly, the GC 100 and certain components thereof are described only briefly herein as needed for facilitating an understanding of the subject matter disclosed herein. The GC 100 is but one non-exclusive example of a system or apparatus in which the subject matter disclosed herein may be implemented.

The GC 100 may generally include a GC inlet (or GC inlet device) 104, a GC column 108, a heating device (or column heater) 112, and a detector 116. The GC 100 may also include a sample introduction device (e.g., sample injector) 120 and a carrier gas source (or carrier gas supply device) 124. The GC 100 may further include a system controller or computing device (e.g., hardware, firmware, software, user input and output interface devices, etc., not shown) for controlling various components of the GC 100 (e.g., for controlling operating parameters such as fluid pressure, flow rate, temperature programming, etc.; timing of operations such as sample injection, etc.), as appreciated by persons skilled in the art. The GC 100 may further include a power source (not shown) to provide electrical power to one or more power-consuming components of the GC 100 such as the system controller, the heating device 112, etc.

The sample introduction device 120 may be any device configured for introducing by, for example, injecting a sample into the GC inlet 104. The carrier gas source 124 supplies a flow of an inert carrier gas or gases (e.g., helium, nitrogen, argon, and/or hydrogen) to the GC inlet 104 via a carrier gas line at a regulated flow rate and/or pressure. The carrier gas serves as a chemically inert mobile phase that facilitates transport of the sample through the GC column 108, as appreciated by persons skilled in the art. The carrier gas source 124 can also supply gas that does not flow through the column 108, such as split vent flow in a split/splitless inlet, septum purge flow, etc., as appreciated by persons skilled in the art.

The GC inlet 104 is configured to introduce the sample to be analyzed into the carrier gas flow. The GC inlet 104 includes ports communicating with the sample introduction device 120, the carrier gas source 124, and the head of the column 108. Examples of the GC inlet 104 include, but are not limited to, a split/splitless inlet, a purged-packed inlet, a Multimode Inlet (MMI), etc.

The detector 116 may be any detector suitable for detecting the separated chemical compounds bands (i.e. analytes of a sample introduced into the inlet of the column 108) as they elute as "bands" or "peaks" from the outlet of the column 108. Examples of such a detector include, but are not limited to, a flame ionization detector (FID), thermal conductivity detector (TCD), electron capture detector (ECD), flame thermionic detector (FTD), flame photometric detector (FPD), etc. In some examples, the detector 116 is, or is part of, an analytical instrument such as, for example, a mass spectrometer (MS), an ion mobility spectrometer (IMS), etc. Thus in some examples the GC system 100 may be a hyphenated system such as a GC-MS or GC-IMS system. The detector 116 may also be schematically representative of a data acquisition system, display/readout device, and other components associated with generating chromatograms and spectra as appreciated by persons skilled in the art.

The GC 100 may include a housing 128 that encloses the column 108 (and possibly all or part of the GC inlet 104 and/or heating device 112). The housing 128 may include one or more doors enabling access to the column 108 and other components and features located in the interior of the housing 128. In some examples, the housing 128 is or includes a temperature-programmable GC oven, and the heating device 112 is configured for heating the interior of the GC oven through which the column 108 extends. In other examples, the heating device 112 may directly heat the column 108. A predetermined temperature profile may be implemented, for example, for balancing parameters such as elution time and measurement resolution.

The column 108 typically is a small-bore tube (e.g., with an inside diameter on the order of tens or hundreds of micrometers (μm)) composed of a glass (e.g., fused silica) or metal. The column 108 has a column length from one column end serving as a column inlet 132 to the other column end serving as a column outlet 136. Typical column lengths range from 5 m to 100 m while typical column inside diameters range from 50 μm to 530 μm. The column 108 may have an outer coating of polyimide or another material to strengthen and protect the column 108. The column may include an inner coating or coatings to deactivate the column 108. The column 108 may include a stationary phase appropriate for GC that typically lines or coats the inside surface of the column 108. The stationary phase may be, for example, a layer of liquid or polymer having a formulation effective for chromatographic separation and supported on an inert substrate, as appreciated by persons skilled in the art. As illustrated, the column 108 may be coiled into a single-loop or multi-loop configuration to accommodate a desired length between the column inlet 132 and the column outlet 136 while minimizing the size of the housing 128. The column 108 may be supported in a fixed position in the housing 128 between the GC inlet 104 and the detector 116, by employing suitable mounting components (not shown) that typically engage the coiled portion of the column 108. In some examples, the column 108 shown in FIG. 1 may schematically represent two or more distinct columns, arranged in series and/or in parallel via appropriate fluidic couplings (unions, tee connections, etc.). The GC system 100 may in some examples be configured for multi-dimensional GC sample runs as appreciated by persons skilled in the art.

A general example of operating the GC system 100 to analyze a sample is as follows. The carrier gas source 124 is operated to establish a flow of carrier gas under desired (predetermined) flow conditions (pressure, flow rate, etc.) through the GC inlet 104, the column 108, and the detector 116, referred to as column flow. The period of time starting with sample injection, followed by the flow of the sample through the column 108 and the arrival of the separated bands at the detector 116 (i.e. the elution of the analytes of interest from the column 108), may be referred to as the sample run time. The column flow (or pressure) may be held constant or ramped throughout the sample run time. The heating device 112 is operated to heat the column 108 to a predetermined initial column temperature. During the sample run time, the heating device 112 is operated to maintain the column temperature at a predetermined or set point value, or to vary the column temperature according to a predetermined temperature profile or program, as prescribed by the particular method (chromatography run) being implemented. The sample introduction device 120 is operated to inject a sample into the carrier gas stream flowing through the GC inlet 104 to produce a mixture of the sample and the carrier gas. The internal gas pressure at the head of the column 108 drives the sample/carrier gas mixture through the column 108, during which time the different analytes of the sample interact with the stationary phase in the column 108 with different degrees of affinity. This results in the different analytes becoming separated from each other along the length of the column 108, which ultimately results in the different analytes eluting from the column outlet 136, and thereafter reaching the detector 116, at different times (i.e., in sequence—e.g., first analyte A, then analyte B, then analyte C, etc.), with analyte molecules of the same type (i.e., the same chemical compound) eluting together as a "band" or "peak." The detector 116 detects the different analytes as they arrive at the detector 116, operating on a detection/measurement principle that depends on the type of detector being employed (FID, MS, etc.). The detector 116 outputs electrical signals (analyte detection/measurement signals) to the system controller, which conditions and processes the signals as needed to produce a chromatogram, as appreciated by persons skilled in the art.

The ends of the column 108 (column inlet 132 and column outlet 136) are fluidly connected to the GC inlet 104 and detector 116, respectively, by fluid-tight fluidic coupling assemblies 140 and 144. Examples of making fluidic couplings at the column ends according to the present disclosure are described below in conjunction with FIGS. 2A to 14.

Figure 2A:
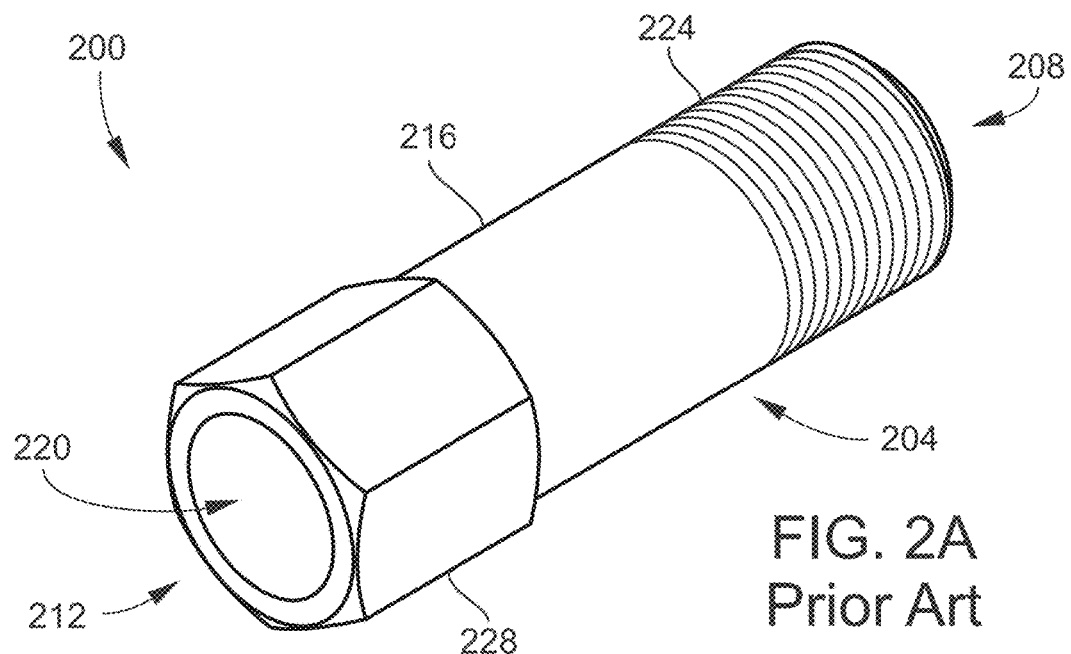
FIG. 2A is a schematic perspective view of an example of a column nut as may be utilized as, or as part of, a fluidic coupling device.
Figure 2B:
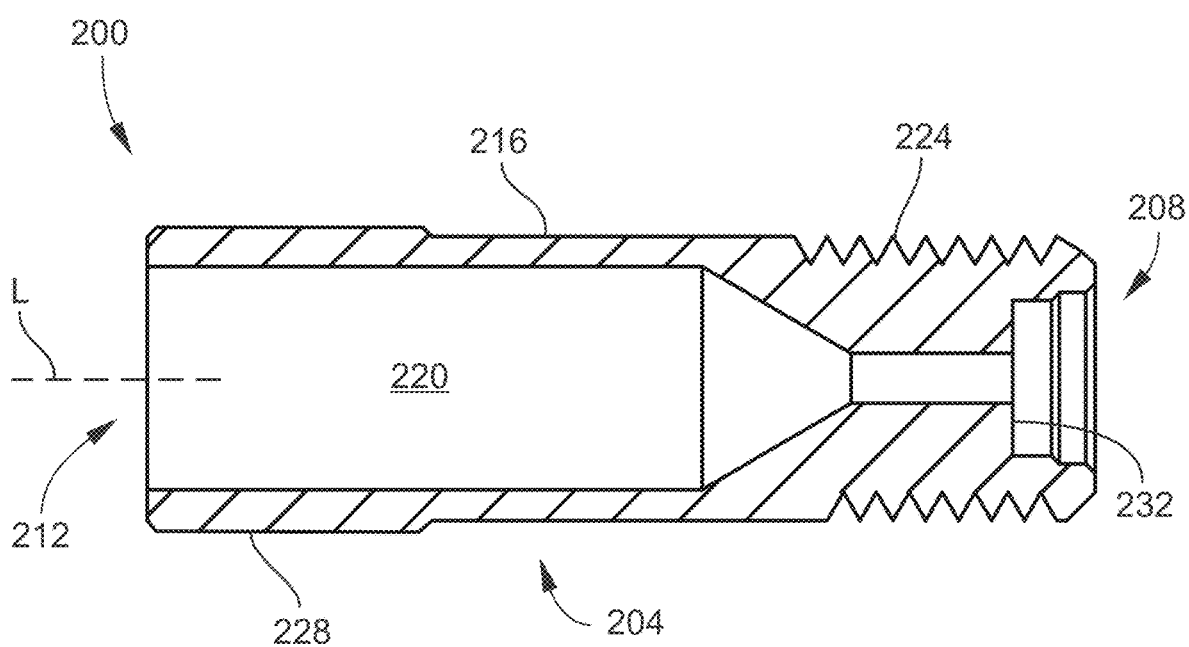
FIG. 2B is a schematic cross-sectional view of the column nut illustrated in FIG. 2A.

FIG. 2A is a schematic perspective view of a known example of a column nut 200 as may be utilized as, or as part of, a fluidic coupling device configured to install a column (e.g., the column 108 described above) in a GC inlet, detector, or other fluidic fitting. FIG. 2B is a schematic cross-sectional view of the column nut 200. The column nut 200 generally includes a (typically cylindrical) column nut body 204 elongated along a longitudinal device axis L. The column nut body 204 includes a first axial nut end 208, a second axial nut end 212 spaced from (axially opposite to) the first axial nut end 208 along the device axis L, and outer lateral nut surface 216 extending from the first axial nut end 208 to the second axial nut end 212. A nut bore 220 extends through the column nut body 204 from the first axial nut end 208 to the second axial nut end 212. The nut bore 220 is sized to allow the column 108 to be passed therethrough. A nut engagement component 224 is disposed at the first axial nut end 208, and is configured to engage a fluidic component configured to receive the column 108 and in which the column 108 is to be installed. Typically and as illustrated, the nut engagement component 224 is an externally threaded nut section disposed on or defining at least part of the outer lateral nut surface 216, and which is configured to engage an internally threaded section of the fluidic component to which the column nut 200 is to be coupled.

The column nut 200 further includes an external nut engagement component 228 configured to facilitate rotation of the column nut body 204 by a user, which may involve the use of a tool such as a wrench. Typically and as illustrated, the external nut engagement component 228 is a cylindrical section of polygonal (e.g., hexagonal, etc.) perimeter disposed on or defining at least part of the outer lateral nut surface 216. That is, the perimeter is defined by a number of adjoining flat surfaces ("flats") such as wrench flats. Alternatively or additionally, the external nut engagement component 228 may include one or more gripping members (e.g., radially outward extending wings, ribs, handles, or the like, or knurling, flats, etc.) configured to facilitate rotation of the column nut body 204 by the user, such as described in U.S. Pat. No. 10,119,638, titled FLUIDIC COUPLING DEVICES, ASSEMBLIES, AND RELATED METHODS, the entire content of which is incorporated by reference herein.

The column nut 200 further includes a nut end surface 232 located at or near the first axial nut end 208, which typically annularly surrounds an end of the nut bore 220. The nut end surface 232 is utilized to contact (abut) an end (typically the flat end) of a ferrule slid onto the column 108, such that axial translation of the column nut 200 imparts an axial force on the ferrule, as described further below.

The column nut 200 as described above and illustrated FIGS. 2A and 2B, when considered alone, may be representative of commercially available column nuts. However, the column nut 200 may be according to examples of the present disclosure. For example, the nut engagement component 224 may be an internally threaded nut section defining at least part of the nut bore 220, and configured to engage an externally threaded section of the fluidic component. Alternatively or additionally, the column nut 200 may include another (second) nut engagement component configured to engage a collet as disclosed herein. For example, the second nut engagement component may be external and configured to engage an internal engagement component of the collet, as described below in conjunction with FIGS. 4A to 7. In another example, the second nut engagement component may be internal and configured to engage an external engagement component of the collet, as described below in conjunction with FIGS. 8A to 8D. The column nut 200 may be further or differently modified as disclosed herein.

It will be understood that the column nut 200 as illustrated may represent a simplified example of a column nut. Some examples of the column nut 200 may include additional components and/or features configured to enhance performance, such as a movable piston, one or more springs, one or more internal ferrules and/or compression rings, etc. Examples of the column nut 200 include, but are not limited to, the standard type of column nut and its many variations (of which the illustrated column nut 200 is an example), a self-tightening column nut, a Capillary Flow Technology (CFT) device, etc. Some specific examples of a column nut configured to exhibit a self-tightening attribute, and to which the presently disclosed subject matter may be applied in the manner described herein, are described in the above-referenced U.S. Pat. No. 10,119,638.

Figure 3A:
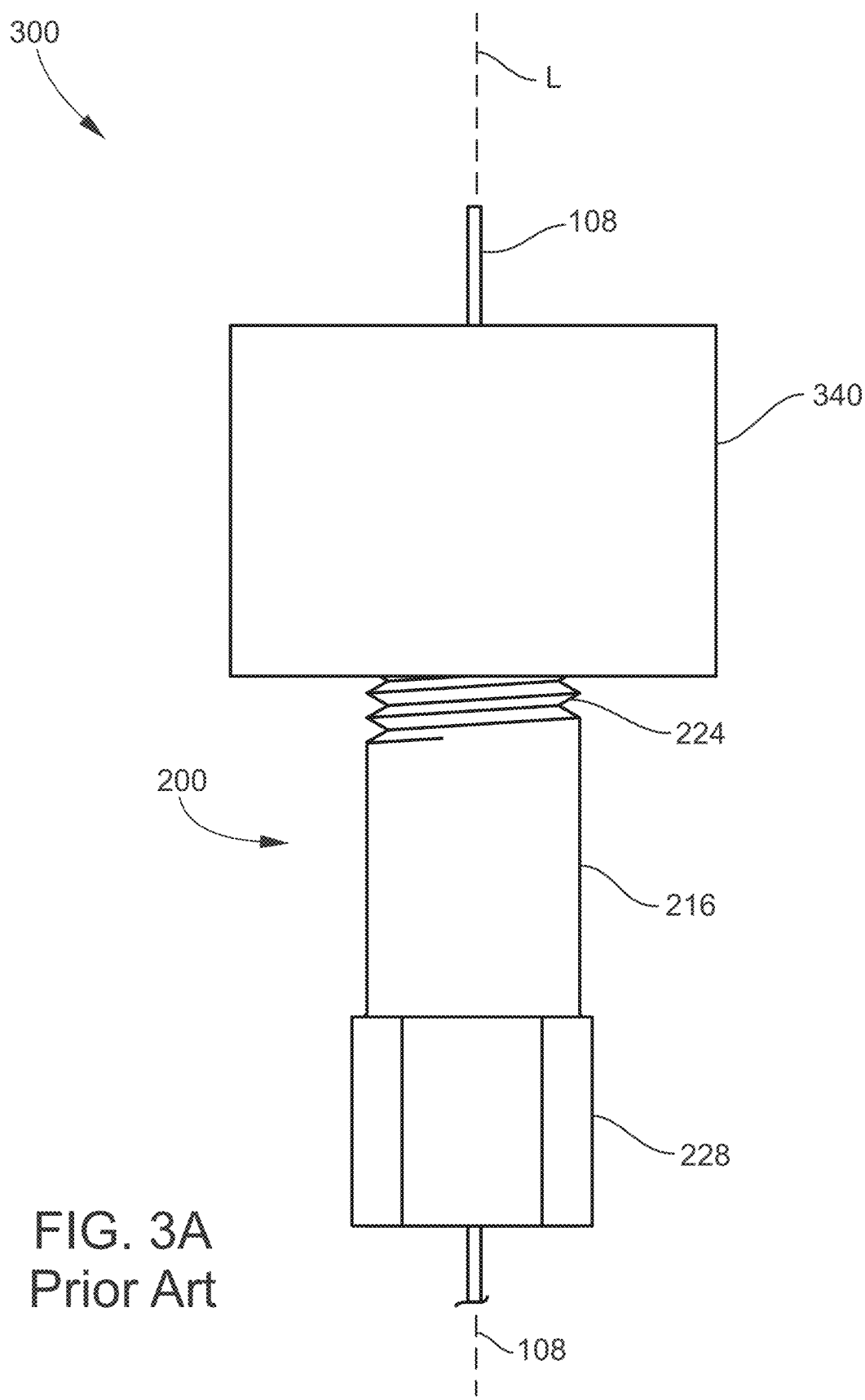
FIG. 3A is a schematic elevation view of an example of a fluidic coupling assembly to which the presently disclosed subject matter may be applied.
Figure 3B:
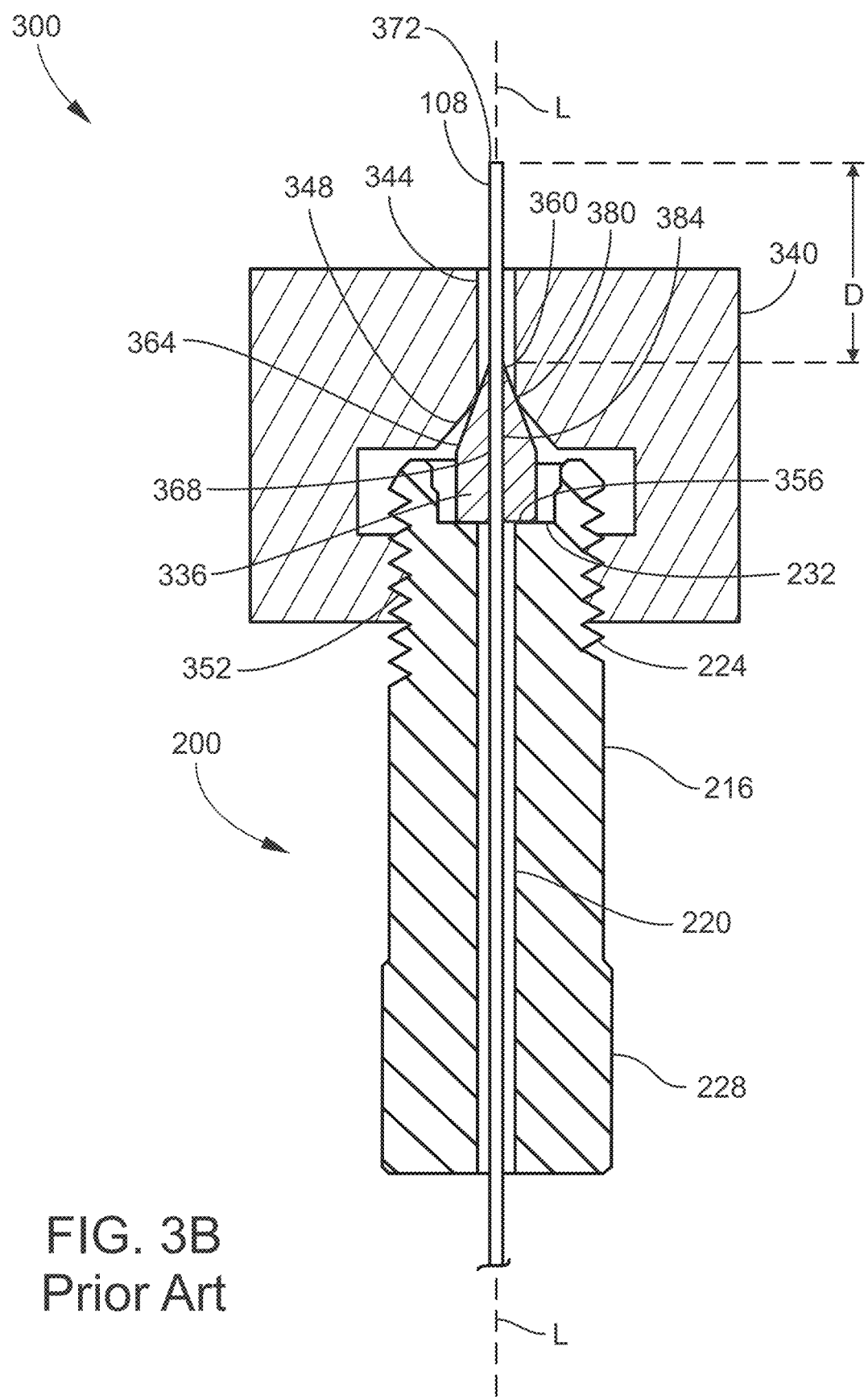
FIG. 3B is a schematic cross-sectional elevation view of the fluidic coupling assembly illustrated in FIG. 3A.

FIG. 3A is a schematic elevation view of an example of a fluidic coupling assembly 300 to which the presently disclosed subject matter may be applied. FIG. 3B is a schematic cross-sectional elevation view of the fluidic coupling assembly 300. The fluid coupling assembly 200 may be made at either end of the column 108, or two such fluid coupling assemblies 200 may be made at the respective ends of the column 108. Accordingly, the fluid coupling assembly 200 may, for example, correspond to the fluid coupling assembly 140 and/or the fluid coupling assembly 144 described above and illustrated in FIG. 1.

In the present context, the fluidic coupling assembly 300 generally may be considered as including the column 108, the column nut 200, a ferrule 336, and a fluidic component 340. For illustrative purposes, the components of the fluidic coupling assembly 300 are considered to be generally arranged along a longitudinal device axis L of the fluidic coupling assembly 300. As used herein, terms such as "axial" and "axially" relate to the device axis L (or a collet axis C described below), unless specified otherwise.

Generally, the fluidic component 340 is any component configured to receive the column 108 such that, after the column 108 is coupled to the fluidic component 340, a fluid flow path is defined from the lumen of the column 108 to an interior fluidic portion (e.g., conduit, channel, chamber, another chromatographic column, etc.) of the fluidic component 340, or to an interior fluidic portion of a device of which the fluidic component 340 is a part or to which the fluidic component 340 is attached. As non-exclusive examples, the fluidic component 340 may be, or be a part of (e.g., as a tube fitting), a GC inlet (e.g., the GC inlet 104 described above and illustrated in FIG. 1) or a detector (e.g., the detector 116 described above and illustrated in FIG. 1, in particular, the inlet of such detector). For example, depending on the example or application, an end of the column 108 may fluidly communicate with a liner or chamber of a GC inlet, or with a flow cell, sample probe, or ion source of a detector, etc. One or more inside surfaces or walls of the fluidic component 340 define a component bore 344 that receives the column 108 during assembly of the fluidic coupling assembly 300. A part of the inside surface or wall defining (or communicating with) the component bore 344 is an inside tapered (e.g., conical) surface 348 that interfaces with the ferrule 336 in a manner described below. Another part of the inside surface or wall defining (or communicating with) the component bore 344 is a fluidic component engagement section 352, which is an internally threaded section, and which interfaces (threadedly engages) with the column nut 200 during assembly.

The ferrule 336 has a ferrule body extending axially from a (typically flat) ferrule rear surface 356 to a ferrule tip 360. At least a portion of the ferrule body that terminates at the ferrule tip 360 is tapered (e.g., conical), while the remaining portion of the ferrule body is typically cylindrical. Accordingly, at least a portion of the outside surface of the ferrule 336 is an outside tapered (e.g., conical) surface 364. As illustrated in FIG. 3B, the angle of the outside tapered surface 364 is typically different (smaller relative to the device axis L) than the angle of the inside tapered surface 348 of the fluidic component 340. The ferrule 336 further has a central ferrule bore 368, which extends axially through the ferrule body from the ferrule rear surface 356 to the ferrule tip 360. The ferrule 336 is composed of a material that is sufficiently deformable to allow the ferrule 336 to deform and be compressed against the inside tapered surface 348 and the outside surface of the column 108, in response to an application of an appropriate force. Examples of ferrule materials include pure graphite, polyimide, a composite or mixture of graphite and polyimide, and various metals.

A general example of making the fluid coupling assembly 300—i.e., installing the column 108 into the fluidic component 340—in the typical, conventional manner, is as follows. The column 108 is passed through the central nut bore 220 of the column nut 200 to extend beyond the column nut 200, such that one column end 372 of the column 108 (the column end that is to be fluidly coupled to the fluidic component 340 or its associated device) is located at some distance from the corresponding end (the top end, from the perspective of FIG. 3B) of the column nut 200. The ferrule 336 is then installed on the column 108 from the column end 372, such that the ferrule rear surface 356 abuts the nut end surface 232 of the column nut 200, and the column 108 passes through the ferrule bore 368 to extend beyond the ferrule tip 360. At some point in the assembly process, the column end 372 is (preferably) squarely and cleanly cut by an appropriate technique.

After the foregoing steps have been taken, the pre-assembly constituting the column 108, the column nut 200, and the ferrule 336, is axially aligned with the component engagement section 352 of the fluidic component 340, so that the column 108 (column end 372 first) and ferrule 336 are able to be inserted into the component bore 344 of the fluidic component 340 (and possibly fully through and beyond the component bore 344 as in the illustrated example, depending on the configuration of the fluidic component 340 or its associated device). The nut engagement component 224 of the column nut 232 is then threaded into the component engagement section 352 of the fluidic component 340. The column nut 200 is then rotated (relative to the fluidic component 340, which typically remains stationary), thereby causing the column nut 200 and ferrule 336 to be axially translated together into the component bore 344. In particular, rotation of the column nut 200 causes the outside tapered surface 364 of the ferrule 336 to be axially translated toward, and eventually into contact with, the inside tapered surface 348 of the component bore 344.

At this point, before the ferrule 336 (specifically the inside wall of the ferrule 336 defining the ferrule bore 368) is urged into gripping contact with the column 108 via further rotation of the column nut 200, the column 108 may be axially translated back and/or forth to attempt to locate the column end 372 ideally at a certain designated (or specified, predetermined, desired, etc.) axial distance D from the ferrule tip 360. This distance D depends on the type (e.g., a specific commercially available make and model) of the fluidic component 340 or its associated device (e.g., a specific commercially available make and model of a GC inlet, detector, fluidic fitting, fluidic union, etc.). After the designated axial distance D is reached, the column nut 200 is further rotated, whereby the axially translating ferrule 336 contacts the inside tapered surface 348 of the fluidic component 340 with a contact force sufficient to deform and compress the ferrule 336. Due to the tapered geometry of the ferrule 336, the corresponding reactive force imparted by the inside tapered surface 348 of the fluidic component 340 has a force component normal to the outside tapered surface 364 of the ferrule 336, and a force component normal (radial) to the device axis L directed against the outside surface of the column 108. Consequently, the rotation of the column nut 200 (and resulting axial translation of the column nut 200 and ferrule 336) creates a ferrule-to-fluidic component sealing interface 380 (between the ferrule's outside tapered surface 364 and the fluidic component's inside tapered surface 348) and a ferrule-to-column sealing interface 384 (between the wall of the ferrule bore 368 and the column 108), thereby securely fixing the position of the column 108 in the fluidic component 340, and establishing a fluid-tight fluidic coupling.

The fluidic coupling assembly 300 as described above and illustrated FIGS. 3A and 3B, when considered alone, may be representative of a known fluidic coupling assembly. However, one or more components of the fluidic coupling assembly 300 may be modified or replaced with different components, and/or other components may be added, in accordance with examples disclosed herein.

As noted in the Background section above, difficulties attend the conventional installation of a column 108 utilizing known examples of the column nut 200. One particular challenge arising during column installation is presented by the requirement to achieve the above-noted designated axial distance D. As noted above, there are many types of fluidic components 340 (e.g., many types of GC inlets, detectors, fittings, unions, etc.) to which a column 108 may need to be installed, depending on the instrumentation employed by the user. The various types require different specific axial distances D to achieve the best analytical results. As also noted above, there are several types of ferrule materials and several types of column nuts 200. With all of these variations, and due to the conventional design of the components utilized for column installation, traditionally it has been difficult to obtain and maintain a prescribed value for the designated axial distance D during and up to the completion of the column installation. In particular, it has been difficult to prevent the column 108 and/or ferrule 336 from sliding and repositioning during column installation.

As noted above, according to the present disclosure, the fluidic coupling of a fluidic conduit (such as the column 108 described herein) to a fluidic coupling device (such as a column nut 200 or other devices), and further to a fluidic component as described herein, may be improved, as described by examples below with reference to FIGS. 4A to 14. In the context of the present disclosure, the term "conduit" or "fluidic conduit" generally denotes any type of conduit (e.g., tube, tubing, capillary, pipe, etc.) utilized for fluidly connecting two or more fluidic components (e.g., devices, subsystems of an instrument or system, etc.), and for which installation to a fluid-tight coupling or fitting is desired. In particular, the fluidic conduit may need to be installed with a desired length of protrusion beyond a ferrule or other fluidic component (e.g., the "designated axial distance D" referred to herein), especially in tight confines where it can be difficult to manage the proper making or maintaining of a leak-free fluidic connection. The conduit may be constructed from, for example, metal, glass, fused silica, or various plastic. The conduit may or may not additionally have one or more coatings serving a particular function or purpose such as a layer protecting the conduit, a layer providing biocompatibility or bio-inertness (e.g., to prevent contamination of the fluid transported through the conduit, such as metal ions, etc.). Accordingly, a chromatographic column (such as for GC, LC, or other analytical technique) is but one non-exclusive example of a fluidic conduit. Unless noted differently or the context dictates otherwise, the terms "conduit" are "column" are interchangeable.

According to one aspect of the present disclosure, examples of a collet are provided to address the problems noted herein. According to another aspect of the present disclosure, examples of a fluid coupling device, which may include examples of a column nut (or, more generally, a conduit nut) or additionally a removable column (or conduit) nut adapter (or adapter tool), are provided to address the foregoing problems.

Figure 4A:
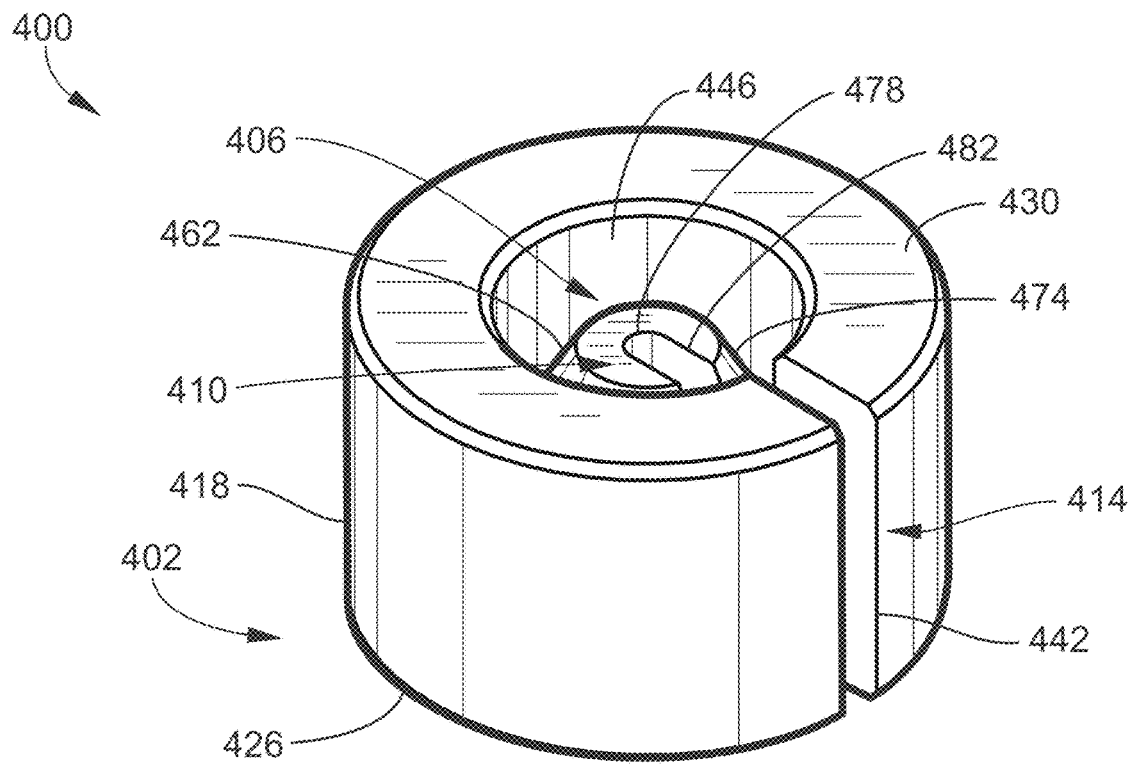
FIG. 4A is a schematic top perspective view of an example of a collet (or collet assembly) according to an example of the present disclosure.
Figure 4B:
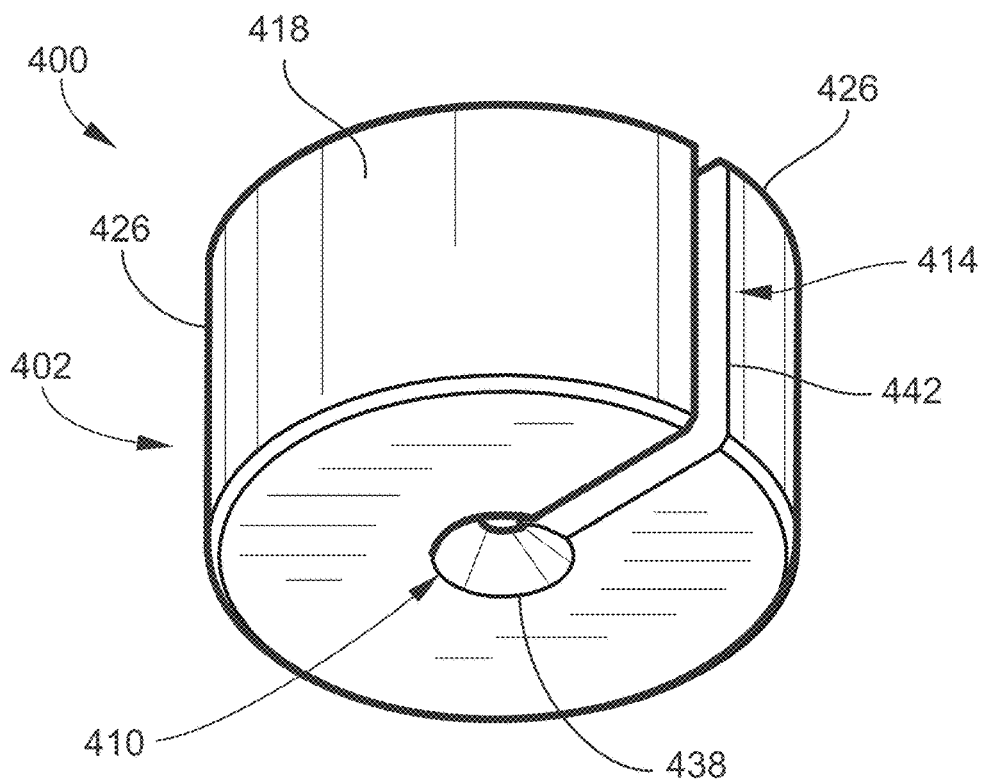
FIG. 4B is a schematic bottom perspective view of the collet illustrated in FIG. 4A, according to an example of the present disclosure.
Figure 4C:
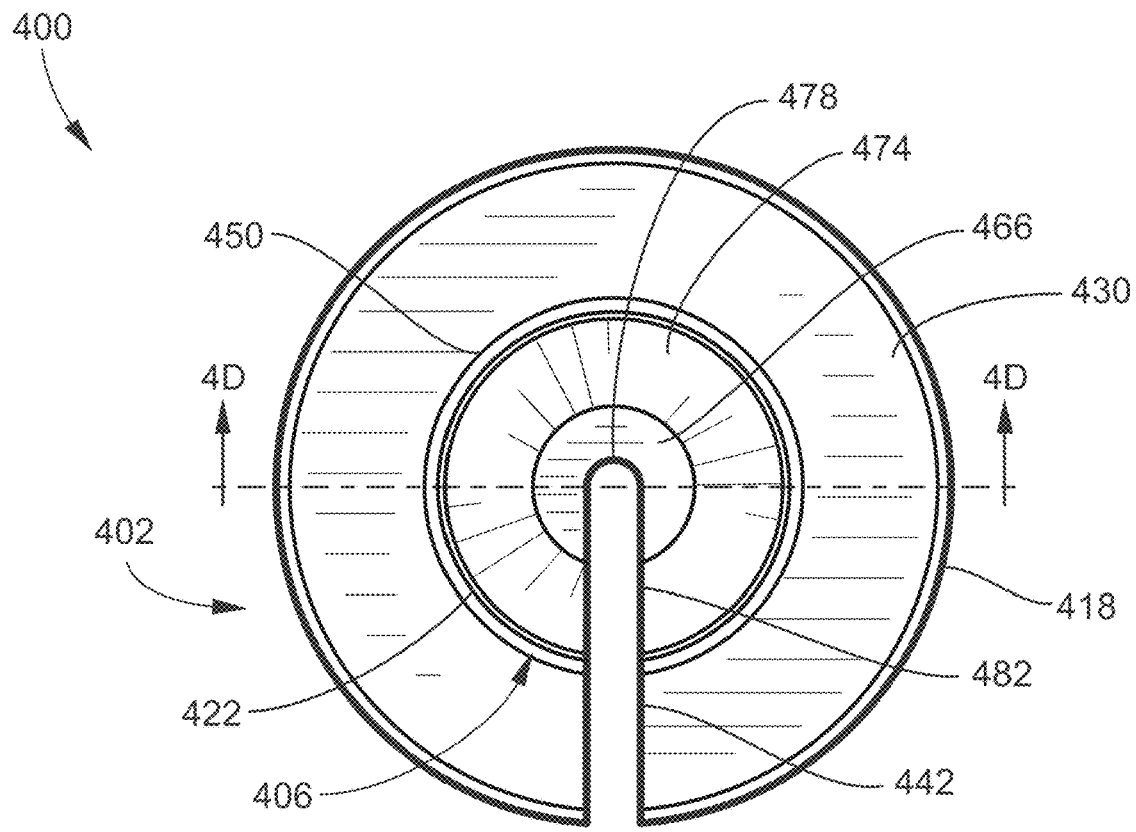
FIG. 4C is a schematic top plan view of the collet illustrated in FIG. 4A, according to an example of the present disclosure.
Figure 4D:
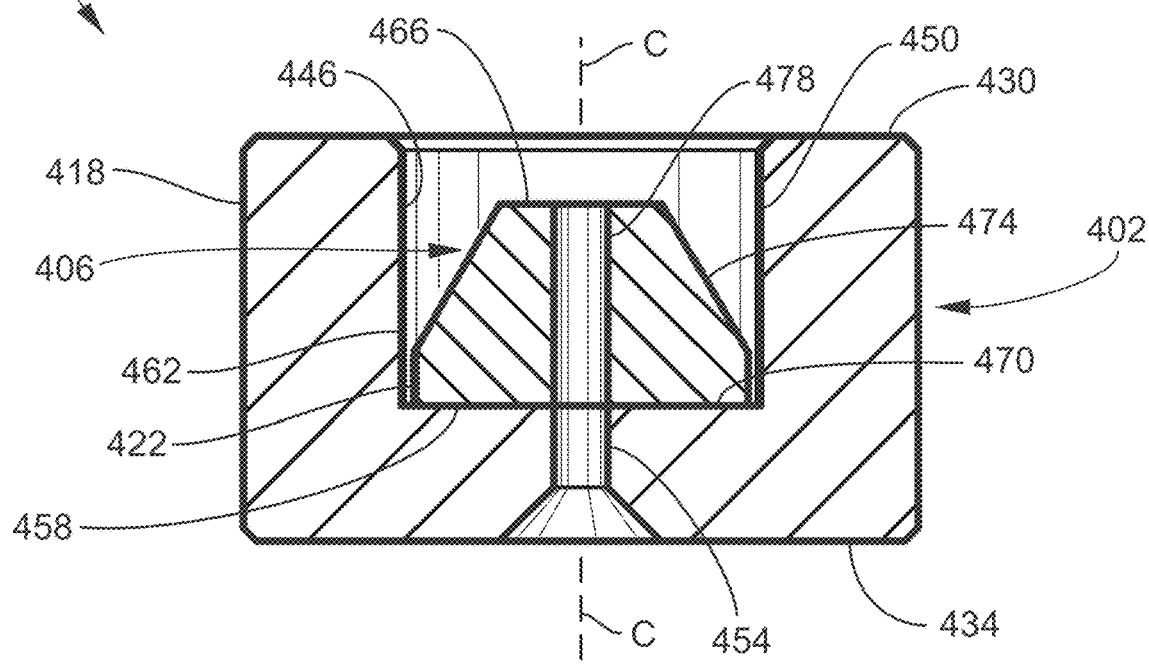
FIG. 4D is a schematic cross-sectional elevation view of the collet illustrated in FIG. 4A, taken along line 4D-4D in FIG. 4C, according to an example of the present disclosure.

FIGS. 4A to 4D illustrate an example of a collet (or collet assembly) 400 according to an example. Specifically, FIG. 4A is a schematic top perspective view of the collet 400. FIG. 4B is a schematic bottom perspective view of the collet 400. FIG. 4C is a schematic top plan view of the collet 400. FIG. 4D is a schematic cross-sectional elevation view of the collet 400, taken along line 4D-4D in FIG. 4C. The collet 400 is configured for use in installing a column in a fluidic coupling. Thus, the collet 400 may be utilized to make a fluid coupling assembly as described herein. For illustrative purposes, the components of the collet 400 are considered to be generally arranged along a longitudinal collet axis C of the collet 400, as shown in FIG. 4D.

Referring to FIG. 4A, the collet 400 generally includes a cap 402, a flexible conduit grasper 406, a collet bore 410, and a collet slot 414. The conduit grasper 406 is composed of a flexible material effective to render the conduit grasper 406 compressible in response to an appropriate force applied to the conduit grasper 406, as described further below. The collet bore 410 (FIG. 4B) extends through the cap 402 and the conduit grasper 406 along the collet axis C (FIG. 4D). As shown in FIGS. 4B and 4D, the lowermost section of the collet bore 410 optionally may be cone-shaped to facilitate guiding and inserting the column into the collet bore 410 at the bottom side of the collet 400 (cap 402). The collet slot 414 extends along the collet axis C, and extends radially from the collet bore 410 to an outer lateral cap surface 418 and to an outer (lateral) grasper surface 422 (FIG. 4C). Generally, the collet bore 410 should be large enough (in diameter) to allow a column to freely pass therethrough. The collet slot 414 should be large enough (in arcuate or circumferential width about the collet axis C) to allow a column to pass therethrough in the radial direction to allow removal of the cap 402, or both the cap 402 and conduit grasper 406, from the column as described below.

The cap 402 generally includes a cap body 426 surrounding the collet axis C. The cap body 426 includes a first cap (axial) end surface 430 (FIG. 4A), a second cap (axial) end surface 434 (FIG. 4B) spaced from (axially opposing) the first cap end surface 430 along the collet axis C, and the outer lateral cap surface 418. The outer lateral cap surface 418 extends axially from the first cap end surface 430 to the second cap end surface 434. In a typical (but not exclusive) example, and as illustrated, the first cap end surface 430 and second cap end surface 434 are flat and orthogonal to the collet axis C, and the outer lateral cap surface 418 is cylindrical and parallel to the collet axis C. The cap 402 also includes a cap bore 438 surrounded by the outer lateral cap surface 418, and extending axially from the first cap end surface 430 to the second cap end surface 434. The cap 402 also includes a cap slot 442 extending axially from the first cap end surface 430 to the second cap end surface 434, and extending radially from the cap bore 438 to the outer lateral cap surface 418. Stated differently, the cap slot 442 extends radially inward into open communication with the cap bore 438 and thus adjoins the cap bore 438. The diameter of the second cap bore 454 may be the same (or substantially the same) as the width of the cap slot 442 (as illustrated) or may be different. The cap bore 438 defines at least a portion of the collet bore 410, and the cap slot 442 defines at least a portion of the collet slot 414.

The collet 400 (the cap 402 in the illustrated example) further includes a collet engagement component 446 configured to engage a fluidic coupling device, as described below. Generally, the collet engagement component 446 surrounds the collet axis C. In the illustrated example, the collet engagement component 446 is an internal feature surrounded by the outer lateral cap surface 418. In the illustrated example, the collet engagement component 446 is a cylindrical section of circular cross-section defining at least part of the collet bore 410. That is, the collet engagement component 446 may be a smooth wall without a thread. In such an example, the collet engagement component 446 is configured to engage an outer cylindrical surface of a fluidic coupling device by press-fitting (e.g., a slight interference fit), which may involve pushing the cap 402 or both pushing and rotating the cap 402 relative to the fluidic coupling device.

In another example, the collet engagement component 446 may be a cylindrical section of circular perimeter disposed on or defining at least part of the outer lateral cap surface 418. Here also, the collet engagement component 446 may be a smooth wall without a thread. In such an example, the collet engagement component 446 is configured to engage an inner cylindrical surface of a fluidic coupling device by press-fitting (e.g., a slight interference fit), which again may involve pushing the cap 402 or both pushing and rotating the cap 402 relative to the fluidic coupling device.

Figure 5A:
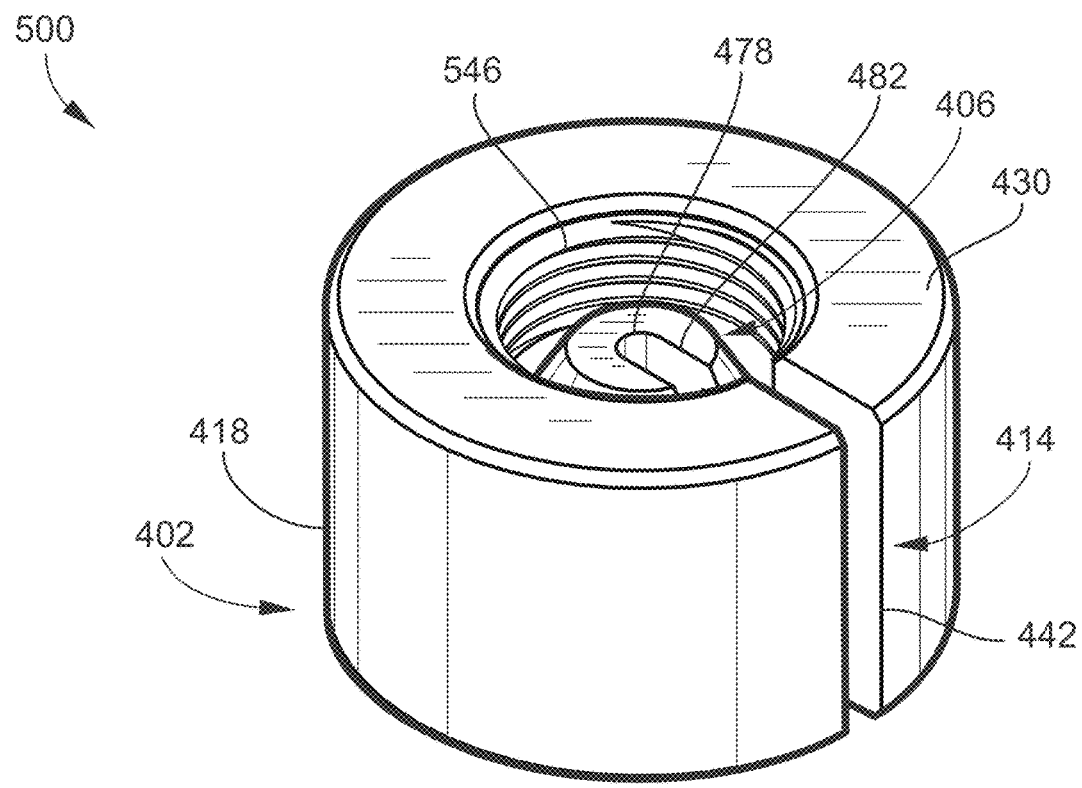
FIG. 5A is a schematic top perspective view of an example of a collet according to another example of the present disclosure.
Figure 5B:
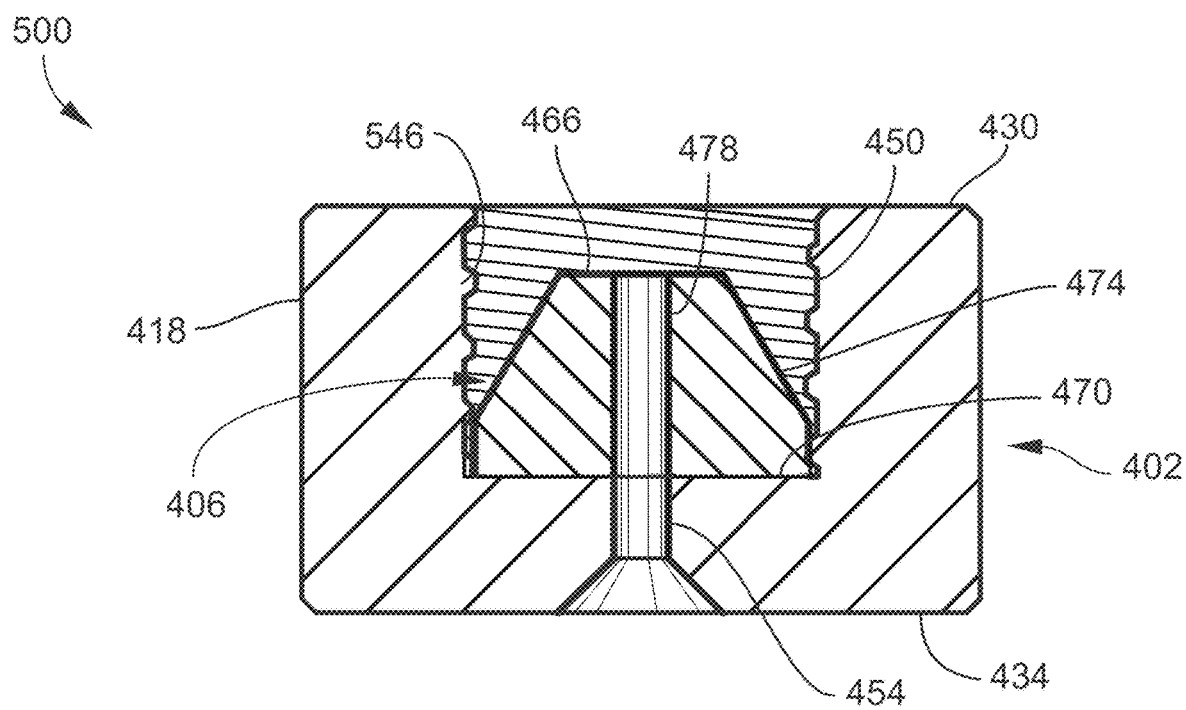
FIG. 5B is a schematic cross-sectional elevation view of the collet illustrated in FIG. 5A, according to an example of the present disclosure.

FIG. 5A is a schematic top perspective view of an example of a collet 500 according to another example. FIG. 5B is a schematic cross-sectional elevation view of the collet 500. In this example, the collet engagement component is an internally threaded cap section 546 defining at least part of the collet bore 410, and configured to engage an external thread of a fluidic coupling device. In another example, the collet engagement component 446 may be an externally threaded cap section disposed on or defining at least part of the outer lateral cap surface 418, and configured to engage an internal thread of a fluidic coupling device.

In an example and as illustrated in FIGS. 4D and 5B, the cap bore 438 includes a first cap bore (section) 450 and a second cap bore (section) 454. The first cap bore 450, which may also be referred to as a cap cavity, extends along the collet axis C from the first cap end surface 430 toward the second cap end surface 434, and has a first bore diameter. The second cap bore 454 extends along the collet axis C from the first cap bore 450 to the second cap end surface 434, and has a second bore diameter. In the illustrated example, the first bore diameter is greater than the second bore diameter. By this configuration, an annular internal shoulder 458 is defined between (or at the interface of) the first cap bore 450 and the second cap bore 454. Also, the larger, first cap bore 450 is sized to receive the conduit grasper 406, and the shoulder 458 is utilized to support the conduit grasper 406. That is, in the present example, the conduit grasper 406 is configured to contact the shoulder 458 when the conduit grasper 406 is inserted into the second cap bore 454. Also in this example, the collet engagement component 446 defines at least part of the first cap bore 450. Thus, the first bore diameter should be sized to engage a fluidic coupling device, and the second bore diameter should be large enough at least to allow a column to freely pass therethrough, as described below. Generally, the first and second bore diameters are on the order or scale of millimeters (mm), i.e., from about 0.2 mm to about 99.5 mm. Typically, the first and second bore diameters are in a range of from about 0.2 mm to about 50 mm, again with the first bore diameter being greater than the second bore diameter to accommodate the conduit grasper 406. As one non-limiting example, the first bore diameter may be in a range of from about 1 mm to about 20 mm, while the second bore diameter may be a range of from about 0.3 mm to about 15 mm, or from about 1 mm to about 10 mm.

As illustrated, the cap 402 may generally have the shape (geometry) of a hollow cylinder. However, no particular limitation is placed on the shape of the cap 402. Generally, the cap 402 should be shaped to facilitate manipulation (e.g., grasping and rotation) by the user. If desired, the cap 402 may include features (e.g., radially outward extending wings, ribs, handles, or the like, or knurling, flats, etc.) to facilitate handling by the user. Also, no particular limitation is placed on the size of the cap 402. Generally, the cap 402 should be sized to receive the conduit grasper 406 as well as a column, and to engage a fluidic coupling device as described below. Also, no particular limitation is placed on the material (composition) of the cap 402. Generally, the cap 402 may be constructed from various metals, plastics, ceramics, or flexible or deformable materials. Accordingly, depending on the example, the cap 402 may be fabricated from a rigid material (i.e., a material that is not appreciably flexible or deformable in response to forces typically applied to the collet 400 or 500 during column installation), or a flexible material. As an example of the latter, the cap 402 and the conduit grasper 406 may be composed of the same flexible material.

The conduit grasper 406 generally includes a grasper body 462 surrounding the collet axis C. As shown in FIG. 4D, the grasper body 462 may include a first grasper (axial) end surface 466, a second grasper (axial) end surface 470 spaced from (axially opposing) the first grasper end surface 466 along the collet axis C, and an outer (lateral) grasper surface 422. The outer grasper surface 422 extends axially from the first grasper end surface 466 to the second grasper end surface 470. Generally, the grasper body 462 has a hollow or toroidal (or ring) shape about the collet axis C—that is, the grasper body 462 may be or include a toroid. Accordingly, when viewed in the cross-sectional, elevational plane of FIG. 4D, the cross-section of the grasper body 462 in this plane is swept about the collet axis C, and thereby also defines an axial grasper bore 478 on the collet axis C. In one non-exclusive example and as illustrated, the first grasper end surface 466 and the second grasper end surface 470 are flat and orthogonal to the collet axis C. The outer grasper surface 422 includes a conical (or frustoconical, or tapered) grasper section 474, while the rest of the outer grasper surface 422 may be cylindrical and parallel to the collet axis C. The conical grasper section 474 may terminate at the first grasper end surface 466. In the present example, the conduit grasper 406 is configured as a column grasper, and thus alternatively may be referred to herein as such.

In other examples, the toroidal shape of the conduit grasper 406 may have other configurations. In one example, the toroid may be a cylinder, such as a straight cylinder where the outer grasper surface 422 does not include the illustrated conical grasper section 474. In such an example, the cross-section of the grasper body 462 in the elevational plane of FIG. 4D may have a polygonal shape such as square, rectangular, etc. The cylinder may be appreciably elongated along the collet axis C, or may be short and thus have a washer-like shape.

In another example, the toroid may be a torus, for example like an o-ring. In such an example, the cross-section of the grasper body 462 in the elevational plane of FIG. 4D may have a round shape such as a circle, ellipsis, etc. In such an example, the first grasper end surface 466, the second grasper end surface 470, and the outer (lateral) grasper surface 422 smoothly transition into each other without intervening edges along the curved outer grasper surface.

The conduit grasper 406 also includes a grasper bore 478 surrounded by the outer grasper surface 422, and extending axially from the first grasper end surface 466 to the second grasper end surface 470. By this configuration, the grasper bore 478 is compressible (i.e., the diameter of the grasper bore 478 is reduced) in response to an appropriate force applied to the outside grasper surface 422 (particularly the conical grasper section 474 in the illustrated example), thereby enabling the conduit grasper 406 to exert a grasping (or gripping) force on and around the outside surface of a conduit or column extending through the grasper bore 478.

The conduit grasper 406 also includes a grasper slot 482 extending axially from the first grasper end surface 466 to the second grasper end surface 470, and extending radially from the grasper bore 478 to the outer grasper surface 422. Stated differently, the grasper slot 482 extends radially inward into open communication with the grasper bore 478 and thus adjoins the grasper bore 478. The grasper slot 482 facilitates compression of the grasper bore 478, as well as allowing removal of the conduit grasper 406 from a column. The grasper bore 478 defines at least a portion of the collet bore 410, and the grasper slot 482 defines at least a portion of the collet slot 414.

No particular limitation is placed on the size of the conduit grasper 406. Generally, the nominal or initial diameter of the grasper bore 478 (i.e., when the grasper bore 478 is in an uncompressed state) should be large enough to allow a column or other type of conduit to pass through the grasper bore 478 and be freely axially translated in the grasper bore 478. In an example, the diameter of the grasper bore 478 may be the same (or substantially the same) as the cap bore 438 (or second cap bore 454). The diameter of the grasper bore 478 may be the same (or substantially the same) as the width of the grasper slot 482 (as illustrated) or may be different.

As noted above, the conduit grasper 406 is composed of a flexible (or deformable) material. Examples of the conduit grasper material include, but are not limited to, various rubbers such as a silicone rubber, vulcanized rubber, polyurethane, etc.; and various plastics such as polytetrafluoroethylene (PTFE), polyether ether ketone (PEEK) and other polymers in the polyaryletherketone (PAEK) family, and polyimide (polyimide-based polymers). Some examples of a polyimide are the family of Vespel® polymers manufactured by DuPont de Nemours, Inc., Wilmington, Delaware, USA. A Vespel® polymer may be composed of unfilled polyimide, or may be a compound of polyimide and one or more filler materials such as graphite, PTFE, and/or molybdenum disulfide. In an example, the flexible material of the conduit grasper 406 generally is one exhibiting high mechanical strength, for example, a mechanical strength sufficiently high to withstand, without being damaged or failing, the axial force imparted by the cap 402 and the reactive force(s) imparted by a fluidic coupling device during conduit installation, as described below.

It will be noted, however, that the forces encountered by the conduit grasper 406 are significantly less than the forces encountered by the components of a fluid-sealing compression fitting, such as a ferrule or compression ring. In particular, the flexible material enables the grasper bore 478 to be compressible (i.e., reducible in diameter) in response to small force applied to the conical grasper section 474 (as compared to a ferrule or the like), which is performed by manual manipulation of the collet 400 or 500 (particularly the cap 402). Moreover, the grasper slot 482 also promotes the compressibility of the grasper bore 478 as noted above, thereby lessening the amount of force needed to compress the conduit grasper 406. Unlike a ferrule or similar component, the conduit grasper 406 does not need to create a fluid-tight sealing interface with a column or other type of conduit. Instead, the conduit grasper 406 needs only to create a gripping interface that temporarily holds the conduit in place, after which the conduit grasper 406 can be easily and readily removed from the conduit, as described below. Moreover, the conduit grasper 406 is elastically deformable such that it can be easily removed from a conduit and reused in other conduit installation jobs, whereas a ferrule or the like is plastically deformable (and may bite into the outer surface of the conduit) and not able to be reused. Because the conduit grasper 406 can be removed and reused, its flexible material does not need to be rated to withstand high operating temperatures, whereas ferrule or the like is required to have a high-temperature rating to ensure the ferrule does not fail during operation and cause fluid leakage or pressure loss. Accordingly, the conduit grasper 406 as disclosed herein is significantly different from a ferrule or the like in terms of structure, function, and typically also material composition.

FIGS. 4A to 4D illustrate the collet 400, and FIGS. 5A and 5B illustrate the collet 500, in their assembled forms. In the illustrated example, the cap 402 and the conduit grasper 406 are (at least initially) separate components. To assemble the collet 400 or 500, the conduit grasper 406 is inserted into the cap 402, specifically the first cap bore 450 (cap cavity), such that the grasper bore 478 is aligned with the cap bore 438 (both the first cap bore 450 and the second cap bore 454) on the collet axis C. In an example, the conduit grasper 406 is attached to the cap 402 such as by an adhesive (e.g., an appropriate glue, resin, or the like), or with the use of other devices or means for attachment or capture of the conduit grasper 406. The adhesive may be applied before inserting the conduit grasper 406 into the cap 402 as needed. For example, a thin layer of adhesive may be applied to the shoulder 458 of the cap 402 (and/or to the second grasper end surface 470), and the conduit grasper 406 may be then inserted into the first cap bore 450 in the orientation shown in FIGS. 4A to 4D. In this orientation, as shown in FIG. 4D, the second grasper end surface 470 contacts the adhesive-coated shoulder 458 and the conical grasper section 474 faces away from the shoulder 458. After the adhesive cures or sets, any residual adhesive may be removed from exposed surfaces of the collet 400 or 500. In an example and as best shown in FIG. 4C, the conduit grasper 406 is inserted into the cap 402 such that the grasper slot 482 is aligned with the cap slot 442. Such orientation enables both the cap 402 and the conduit grasper 406 to be removed together (i.e., the entire collet 400 or 500 to be removed) from the conduit after conduit installation, as described below.

In another example, the conduit grasper 406 may be loosely disposed in the cap 402, without adhesion or other attachment, if the alignment between the grasper slot 482 and the cap slot 442 can be maintained during conduit installation. In another example, the collet 400 or 500 may have a unitary construction, i.e., the cap 402 and the conduit grasper 406 are integral as a single unit, for example, similar to the example shown in FIGS. 8A to 8D. In this case, the cap 402 and the conduit grasper 406 may be composed of the same flexible material.

Figure 6A:
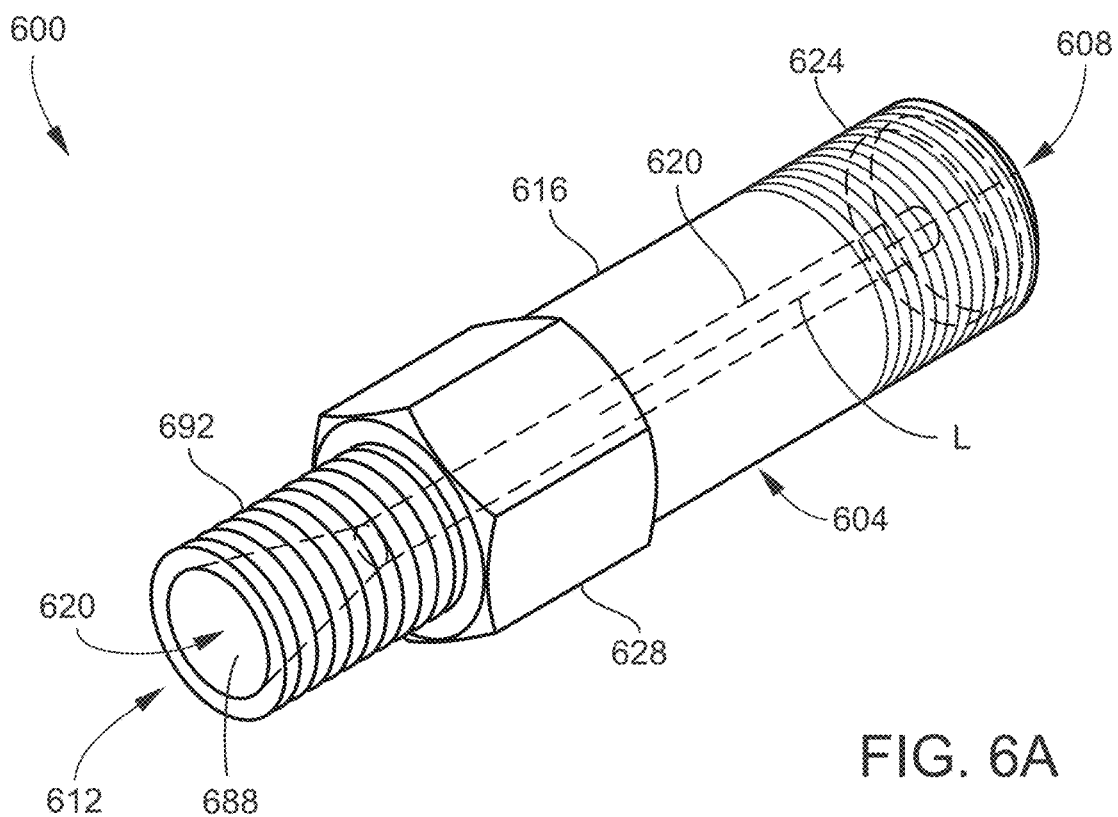
FIG. 6A is a schematic perspective view of an example of a conduit nut as may be utilized as, or as part of, a fluidic coupling device according to another example of the present disclosure.
Figure 6B:
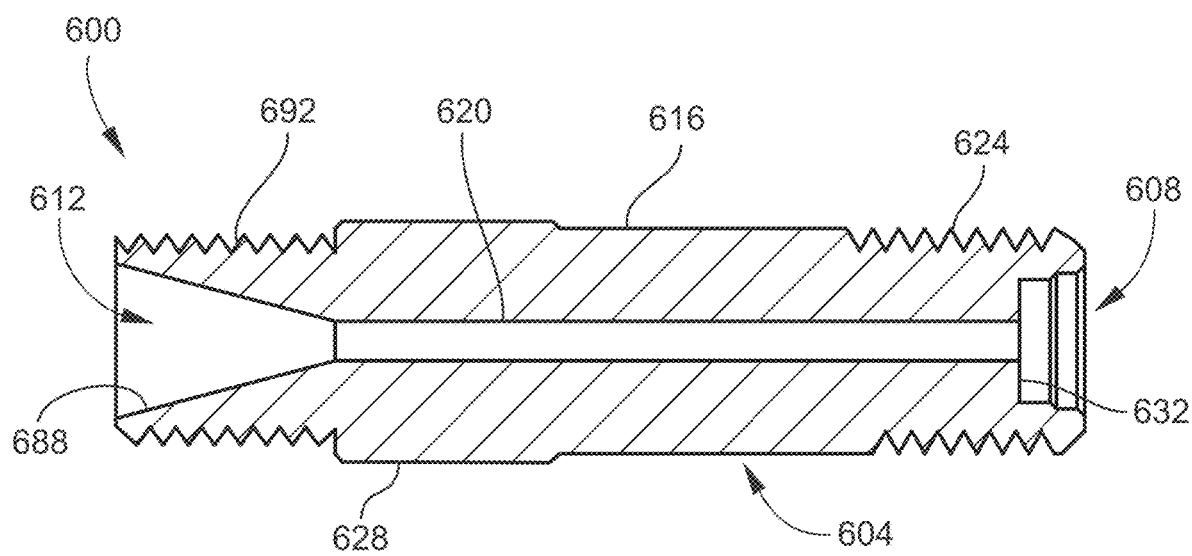
FIG. 6B is a schematic cross-sectional view of the conduit nut illustrated in FIG. 6A, according to an example of the present disclosure.

FIG. 6A is a schematic perspective view of an example of a conduit nut (e.g., column nut) 600 as may be utilized as, or as part of, a fluidic coupling device according to another example of the present disclosure. FIG. 6B is a schematic cross-sectional view of the conduit nut 600.

The conduit nut 600 generally includes a (typically cylindrical) conduit nut body 604 elongated along a longitudinal device axis L. The conduit nut body 604 includes a first axial nut end 608, a second axial nut end 612 spaced from (axially opposite to) the first axial nut end 608 along the device axis L, and outer lateral nut surface 616 extending from the first axial nut end 608 to the second axial nut end 612. A nut bore 620 extends through the conduit nut body 604 from the first axial nut end 608 to the second axial nut end 612. The nut bore 620 is sized to allow a conduit to be passed therethrough. A first nut engagement component 624 is disposed at (or near) the first axial nut end 608 and is configured to engage a fluidic component configured to receive the conduit and in which the conduit is to be installed. Typically and as illustrated, the first nut engagement component 624 is an externally threaded nut section disposed on or defining at least part of the outer lateral nut surface 616, and which is configured to engage an internally threaded section of the fluidic component to which the conduit nut 600 is to be coupled. In another example, the first nut engagement component 624 may be an internally threaded nut section defining at least part of the nut bore 620, which is configured to engage an externally threaded section of the fluidic component.

The conduit nut 600 further includes an external nut engagement component 628 disposed on or defining at least a part of the outer lateral nut surface 616. The external nut engagement component 628 is configured to facilitate rotation of the conduit nut 600 by a user about the device axis L, which may involve the use of a tool such as a wrench. Typically and as illustrated, the external nut engagement component 628 is a cylindrical section of polygonal (e.g., hexagonal, etc.) perimeter disposed on or defining at least part of the outer lateral nut surface 616. That is, the perimeter is defined by a number of adjoining flat surfaces such as wrench flats. Alternatively or additionally, the external nut engagement component 628 may include one or more gripping members (e.g., radially outward extending wings, ribs, handles, or the like, or knurling, flats, etc.) configured to facilitate rotation of the conduit nut body 204 by the user, such as described in above-referenced U.S. Pat. No. 10,119,638. The conduit nut 600 also includes a nut end surface 632 located at or near the first axial nut end 608, which typically annularly surrounds an end of the nut bore 620. The nut end surface 632 is utilized to contact (abut) an end (typically the flat end) of a ferrule, such that axial translation of the conduit nut 600 imparts an axial force on the ferrule, as described herein.

The nut bore 620 includes an internal conical (tapered) nut section 688 at the second axial nut end 612. The nut bore 620 is configured to interface with the conduit grasper 406 (FIGS. 4A to 4D), specifically the conical grasper section 474 thereof, in a manner described below. Alternatively, the conical nut section 688 may be considered as being a conical cavity or receptacle communicating with the nut bore 620.

The conduit nut 600 further includes a second nut engagement component 692 disposed at (or near) the second axial nut end 612. The second nut engagement component 692 is configured to engage the collet engagement component 446 or 546 (FIGS. 4A to 5B). In the illustrated example, the second nut engagement component 692 is an externally threaded nut section disposed on or defining at least part of the outer lateral nut surface 616 of the conduit nut 600. In this example, the second nut engagement component 692 is configured to engage the internally threaded cap section 546 of the collet 500 (FIGS. 5A and 5B). In another example, the second nut engagement component 692 may be an internally threaded nut section defining at least part of the nut bore 620 (for example, similar to the second adapter engagement component 1146 shown in FIG. 12B), and configured to engage an external thread of the collet engagement component 446.

In another example, the second nut engagement component 692 may be a cylindrical section of a circular perimeter without a thread, disposed on or defining at least part of the outer lateral nut surface 616. In such an example, the second nut engagement component 692 is configured to engage an internal, non-threaded cylindrical section of a circular cross-section of the collet engagement component 446 (FIGS. 4A to 4D). In another example, the second nut engagement component 692 may be a cylindrical section of a circular cross-section defining at least part of the nut bore 620, and configured to engage an external, non-threaded cylindrical section of a circular cross-section of the collet engagement component 446.

It will be understood that the conduit nut 600 as illustrated may include additional components and/or features configured to enhance performance, such as a movable piston, one or more springs, one or more internal ferrules and/or compression rings, etc. As examples, the conduit nut 600 may be a modification to a the standard type of column nut, a self-tightening column nut (see, e.g., above-referenced U.S. Pat. No. 10,119,638), a Capillary Flow Technology (CFT) device, etc.

Figure 7:
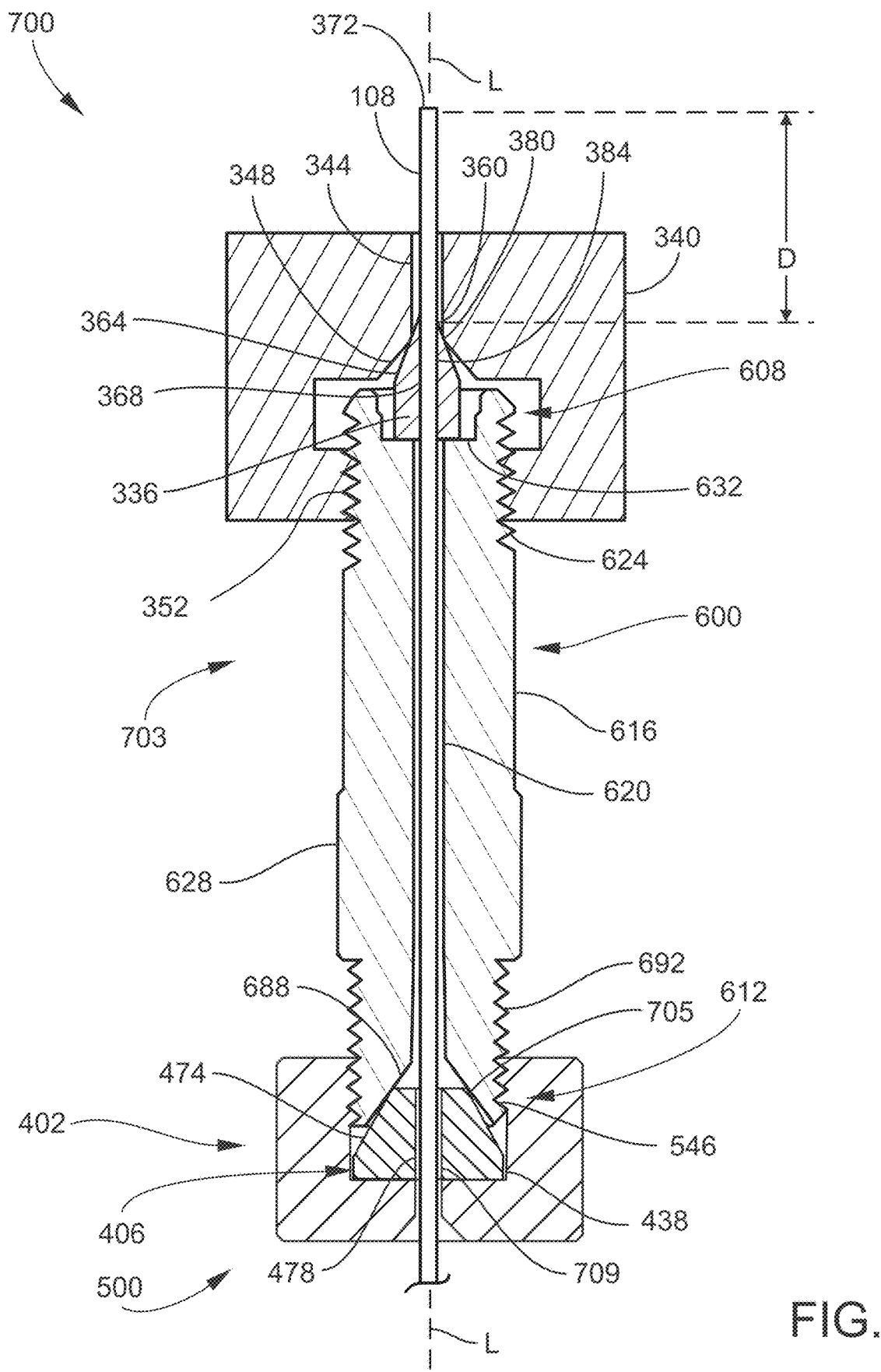
FIG. 7 is a schematic cross-sectional elevation view of an example of a fluidic coupling assembly according to an example of the present disclosure.

FIG. 7 is a schematic cross-sectional elevation view of an example of a fluidic coupling assembly 700 according to an example of the present disclosure. The fluid coupling assembly 700 may be made at either end of a conduit, or two such fluid coupling assemblies 700 may be made at the respective ends of the conduit. In some examples, the conduit may be, for example, a GC column, and thus may correspond to the column 108 described above and illustrated in FIG. 1. Accordingly, the fluid coupling assembly 700 may, for example, correspond to the fluid coupling assembly 140 and/or the fluid coupling assembly 144 described above and illustrated in FIG. 1. For illustrative purposes, the components of the fluidic coupling assembly 700 are considered to be generally arranged along a longitudinal device axis L of the fluidic coupling assembly 700.

In one example, the fluid coupling assembly 700 generally may be considered as including the column 108 or other type of conduit, a fluidic component 340, and a fluidic coupling device 703 utilized to securely install the column 108 into the fluidic component 340. In another example, the fluid coupling assembly 700 generally may be considered as including the column 108 and the fluidic coupling device 703 without necessarily also including the fluidic component 340—for example, when the fluidic coupling device 703 is not (yet) coupled to the fluidic component 340. In addition, depending on the example or stage of use or assembly, the fluidic coupling device 703 or the fluidic coupling assembly 700 may be considered as also including all or part of the collet 500 (or 400) or other collets disclosed herein—e.g., the conduit grasper 406 or both the conduit grasper 406 and the cap 402 (FIGS. 4A to 5B).

The fluidic component 340 may be the same as or similar to the corresponding general example of the fluidic component 340 described above and illustrated in FIGS. 3A and 3B. Accordingly, the same reference numerals are utilized in FIG. 7 to designate features corresponding to like features in FIGS. 3A and 3B.

Generally, the fluidic coupling device 703 is any device configured to couple the column 108 or other type of conduit to the fluidic component 340 in a fluid-sealed (leak-free) manner, and further which is configured to interface with (i.e., is compatible for use with) the collet 500 (or 400) or other collet disclosed herein. The fluidic coupling device 703 may include the column nut 600 described above in conjunction with FIGS. 6A and 6B, and further may include the ferrule 336 described above in conjunction with FIG. 3B. In addition, the fluidic coupling device 703 includes a conical cavity configured to receive at least the conical grasper section 474 of the collet 500. In the present example, the conical nut section 688 of the column nut 600 includes, or corresponds to, the conical cavity. The angle of the conical grasper section 474 of the collet 500 may be different (e.g., smaller, relative to the device axis L) than the angle of the conical nut section 688 of the nut bore 620.

A general example of a method for installing a conduit in the fluidic coupling device 703 is as follows. In this example, the column 108 is utilized as the conduit in the fluidic coupling device 703 is as follows. First, the collet 500 is positioned such that the conduit grasper 406 is positioned between the cap 402 and the fluidic coupling device 703, and the collet 500 is aligned with the fluidic coupling device 703, i.e., the collet axis C is coincident with the device axis L. The cap 402 is removably engaged with the fluidic coupling device 703. By this initial engagement, the collet 500 is only loosely attached to the fluidic coupling device 703. At this stage, the conduit grasper 406 may or may not be in contact with the nut bore 620 (more specifically, the internal conical nut section 688 in the illustrated example), but in either case, the conduit grasper 406 is not (appreciably) compressed. Accordingly, the grasper bore 478 is not (appreciably) compressed (i.e., is fully or almost fully open at its nominal inside diameter), and the grasper slot 442 (FIGS. 4A to 4C) is not (appreciably) compressed (i.e., is fully or almost fully open at its nominal arcuate width).

Before or after engaging the collet 500 with the fluidic coupling device 703, the column 108 is passed through the collet bore 410 and into the device bore (the nut bore 620) of the fluidic coupling device 703. As illustrated, the column 108 may be passed through the nut bore 620 to extend beyond the fluidic coupling device 703, such that one column end 372 of the column 108 (the column end that was inserted into the fluidic coupling device 703) is located at some distance from the corresponding end (the top end, from the perspective of FIG. 4A) of the fluidic coupling device 703, or specifically from the ferrule tip 360 in the illustrated example.

The axial position of the column 108 is then secured by axially translating the collet 500 (by manipulating the cap 402) in a first direction relative to the fluidic coupling device 703, to thereby axially translate the conduit grasper 406 into contact (or further contact) with the fluidic coupling device 703. In particular, axially translating the conduit grasper 406 causes the conduit grasper 406 to be compressed against the conical cavity, which in the present example is part of the nut bore 620. More specifically, the conduit grasper 406 is compressed against the conical nut section 688 of the column nut 600. Consequently, the conduit grasper 406 is compressed against the column 108 in the collet bore 410 (at least in the grasper bore 478). In other words, the rotation and corresponding axial translation of the collet 500 creates a conduit grasper-to-fluidic coupling device interface 705 and a conduit grasper-to-conduit gripping interface 709.

At this stage, the position of the column 108 is fixed relative to the fluidic coupling device 703, and the column 108 may then be installed into a selected fluidic component 340. At some point in the assembly process, before installing the column 108 in the fluidic component 340, the column end 372 is (preferably) squarely and cleanly cut by an appropriate technique.

As described above, if the collet 500 is threaded as illustrated, engaging the collet 500 with the fluidic coupling device 703 and axially translating the collet 500 in the first direction entails rotating the collet 500 via the mated threads of the collet 500 and the fluidic coupling device 703—i.e., threading or screwing the collet 500 onto or into the fluidic coupling device 703. If the collet 500 is not threaded (as shown in FIGS. 4A to 4D), engaging the collet 500 with the fluidic coupling device 703 and axially translating the collet 500 in the first direction entails pushing the collet 500, or both pushing and rotating (twisting) the collet 500, onto or into the fluidic coupling device 703 in the manner of a press-fitting, as described above in conjunction with FIGS. 4A to 4D.

After securing the column 108 in the fluidic coupling device 703, the collet 500 (or at least the cap 402) is removed by axially translating the collet 500 in a second direction opposite to the first direction to disengage the collet 500 from the fluidic coupling device 703. If the collet 500 is threaded, disengaging the collet 500 from the fluidic coupling device 703 entails rotating the collet 500 in the opposite direction via the mated threads of the collet 500 and the fluidic coupling device 703—i.e., unthreading or unscrewing the collet 500 from the fluidic coupling device 703. If the collet 500 is not threaded, disengaging the collet 500 from the fluidic coupling device 703 entails pulling the collet 500, or both pulling and rotating (twisting) the collet 500, away from the fluidic coupling device 703. In all such examples, after disengaging the collet 500, the collet 500 can then be moved away from the column 108 via the collet slot 414 (FIGS. 4A to 4C). That is, the collet slot 414 allows the collet 500 to be moved around the column 108 generally in a radially outward direction relative to the column 108, or equivalently, the collet slot 414 allows the column 108 to pass through the collet slot 414 when moving the collet 500 away from the column 108 in the radial direction.

In a typical example, the cap 402 is attached to or integral with the conduit grasper 406 as described above. In these cases, the entire collet 500 (both the cap 402 and the conduit grasper 406) is removed by axially translating the collet 500 in the second direction to disengage the collet 500 from the fluidic coupling device 703. The entire collet 500 can then be moved away from the column 108 via the entire collet slot 414 (both the cap slot 442 and the grasper slot 482, shown in FIGS. 4A and 4C).

In another example, if the conduit grasper 406 was loosely inserted into the cap 402 without being adhered or otherwise attached to the cap 402, the cap 402 and the conduit grasper 406 may be removed separately from the fluidic coupling device 703. In another example, the cap 402 may be removed and the conduit grasper 406 may be left in place, remaining compressed or wedged between the fluidic coupling device 703 and the column 108, including during subsequent use of the column in its operating environment. In this latter case, the flexible material of conduit grasper 406 would need to exhibit sufficiently high-temperature stability to be capable of withstanding, without being damaged or failing, the high temperatures encountered in the operating environment, such as the GC 100 described above and illustrated in FIG. 1. In the GC 100, the conduit grasper 406 if left on the column 108 may encounter temperatures up to, for example, 450° C. Moreover, the conduit grasper 406 if left on the column 108 should not adversely affect the temperature gradients inside the GC 100.

The collet 500 (or 400) enables or significantly enhances (depending on the ferrule material) the ability to reach and maintain the (specific value of the) above-described designated axial distance D during and up to the completion of the conduit installation process. Thus, in an example of the method, the column 108 is passed through the entire device bore (the nut bore 620, and also the ferrule bore 368 in the present example) of the fluidic coupling device 703 such that an end section of the column 108 protrudes beyond the fluidic coupling device 703. The end section terminates at the column end 372, which is the end that was first inserted through the collet 500 and the fluidic coupling device 703. The designated axial distance D is the distance of the column end 372 from the fluidic coupling device 703 (or more specifically, from the ferrule tip 360 in the present example). Subsequently, the column 108 is axially translated (i.e., the axial position of the column 108 is adjusted, e.g., by pushing and/or pulling the column 108 back and/or forth) until the designated axial distance D is obtained. The collet 500 (or 400) is then utilized to secure the column 108 as described herein. The securing of the column 108 is effective to maintain the designated axial distance D. The securing of the column 108 in effect "locks in" the column 108 at the designated axial distance D, such that the designated axial distance D will not change during the remainder of the conduit installation process.

In an example, the axial translation of the collet 500 in the first direction is performed in at least two steps: a first translating step and a separate, second translating step. The first translating step involves translating the collet 500 by a first amount that urges the conduit grasper 406 into light contact with the column 108 at the grasper bore 478, such that the conduit grasper 406 lightly holds the column 108 while allowing the column 108 to be axially translated through the grasper bore 478 by pulling and/or pushing the column 108. The subsequent second translating step involves translating the cap 402 by a second amount that compresses the conduit grasper 406 against the column 108 (to a greater degree than resulted from the first translating step), such that axial translation of the column 108 is now prevented. That is, the second translating step fully secures the column 108 in the fluidic coupling device 703.

In the illustrated example, the first translating step corresponds to a first rotating step and the second translating step corresponds to a second rotating step. The first rotating step entails rotating the collet 500 by a first amount that translates the collet 500 by a short distance (the term "short" being relative to the second rotating step), thereby lightly compressing the conduit grasper 406 against the column 108 at the grasper bore 478. Consequently, the grasper bore 478 is lightly compressed—i.e., the inside diameter of the grasper bore 478 is reduced by a small amount (the term "small amount" being relative to the second rotating step) —whereby the conduit grasper 406 lightly holds the column 108. The column 108 is "lightly" held in the sense that its axial position will remain fixed unless the column 108 is actually pushed or pulled by the user. Depending on the example or configuration (e.g., the thread pitch, the dimensions and angles of the conduit grasper 406 and the receiving end of the fluidic coupling device 703 (the conical nut section 470 in the illustrated example), etc.), rotating the collet 500 by the first amount may entail rotating the cap 402 through a partial turn and/or one or more full turns.

The second rotating step entails rotating the collet 500 by a second amount that is sufficient (or effective) to further compress the conduit grasper 406 against the column 108, such that axial translation of the column 108 is now prevented. The second rotating step entails turning the collet 500 further, and thus axially translating the conduit grasper 406 further (i.e., by a longer overall second distance in comparison to the above-described short first distance), than was done in the first rotating step. Consequently, the conduit grasper 406 now imparts a greater compressive force to the column 108, with the inside diameter of the grasper bore 478 being reduced by a greater amount, whereby the conduit grasper 406 firmly holds the column 108 in position. In other words, the second rotating step forms a tighter conduit grasper-to-conduit gripping interface 709 in comparison to the first rotating step. As in the case of the first rotating step, rotating the collet 500 by the second amount may entail rotating the collet 500 through a partial turn and/or one or more full turns.

The separate first and second translating steps are particularly useful for obtaining and maintaining the designated axial distance D. Thus, in an example of the method, the column 108 is passed through the entire device bore (nut bore 620) and beyond the fluidic coupling device 703 as described above. Then the first step of axially translating the cap 402 is performed. After the first translating step and before the second translating step, the column 108 is axially translated (adjusted by the user) until the designated axial distance D is obtained as described above. The second step of axially translating the collet 500 is then performed to maintain the designated axial distance D, in effect by locking in the column 108 at the designated axial distance D.

In an example, after securing the column 108 in the fluidic coupling device 703, such as by performing the second translating step just described, although the column 108 is no longer axially translatable, it may still be rotatable relative to the conduit grasper 406 (rotatable in the grasper bore 478) in response to a sufficient force or torque applied by the user. For example, the nature of the gripping contact between the column 108 and the conduit grasper 406 may be such that the gripping interface exhibits greater axial friction is than rotational friction, which may be due to the differing materials of the column 108 and the conduit grasper 406. Hence, rotation of the column nut 600 to couple it to the fluidic component 340 will not also rotate the column 108. This is useful when the column 108 has a coiled section, as is typical of GC columns and as shown in FIG. 1, because rotation of the column nut 600 will not twist the coiled section or cause the coiled section to impact another surface, which could damage the coiled section and thereby render the column 108 unusable, particularly in the case of a glass column 108.

A general example of making the fluid coupling assembly 700—i.e., installing a conduit in the fluidic coupling device 703 and further into the fluidic component 340 to achieve a complete fluidic coupling—is as follows. Again, the column 108 will be utilized in this example. First, the column 108 is secured to the fluidic coupling device 703 with the column end section that terminates at the column end 372 protruding beyond the fluidic coupling device 703 (and by a designated axial distance D if needed), as described above. Then, the combination (or assembly) of the column 108 and fluidic coupling device 703 is aligned with the component bore 344 of the fluidic component 340 on the device axis L. In particular, the first nut engagement component 624 of the fluidic coupling device 703 is aligned with the engagement section 352 of the fluidic component 340. The column 108 is then inserted (column end 372 first) into the component bore 344 (and possibly fully through and beyond the component bore 344 as in the illustrated example, depending on the configuration of the fluidic component 340 or its associated device), and the fluidic coupling device 703 is coupled to the fluidic component 340. This coupling is done in a manner that secures the column 108 in the fluidic component 340 in a fluid-sealed manner, thereby establishing a fluid flow path from the lumen of the column 108 to the component bore 344 and/or any other pertinent fluid conduit of an associated device (e.g., a sample inlet, detector, fluidic fitting, fluidic union, etc.) to which the fluidic component 340 is attached (or of which the fluidic component 340 is a part).

In the illustrated example, the coupling of the fluidic coupling device 703 to the fluidic component 340 is done by engaging the threaded section of the first nut engagement component 624 of the fluidic coupling device 703 with the threaded section of the engagement section 352 of the fluidic component 340. The column nut 600 is then rotated (typically by manipulating the external nut engagement component 628 of the column nut 600, as described above) relative to the fluidic component 340 (which typically remains stationary) until a secure coupling is achieved. Further, in the illustrated example, this coupling involves the use of at least one ferrule 336. Hence, rotation and accompanying axial translation of the column nut 600 also axially translates the ferrule 336 until a ferrule-to-fluidic component sealing interface 380 and a ferrule-to-conduit sealing interface 384 are formed, as described above.

At this point, the conduit installation is complete, although as a further step, the cap 402 or entire collet 500 may be removed for reuse in the manner as described above.

Figure 8A:
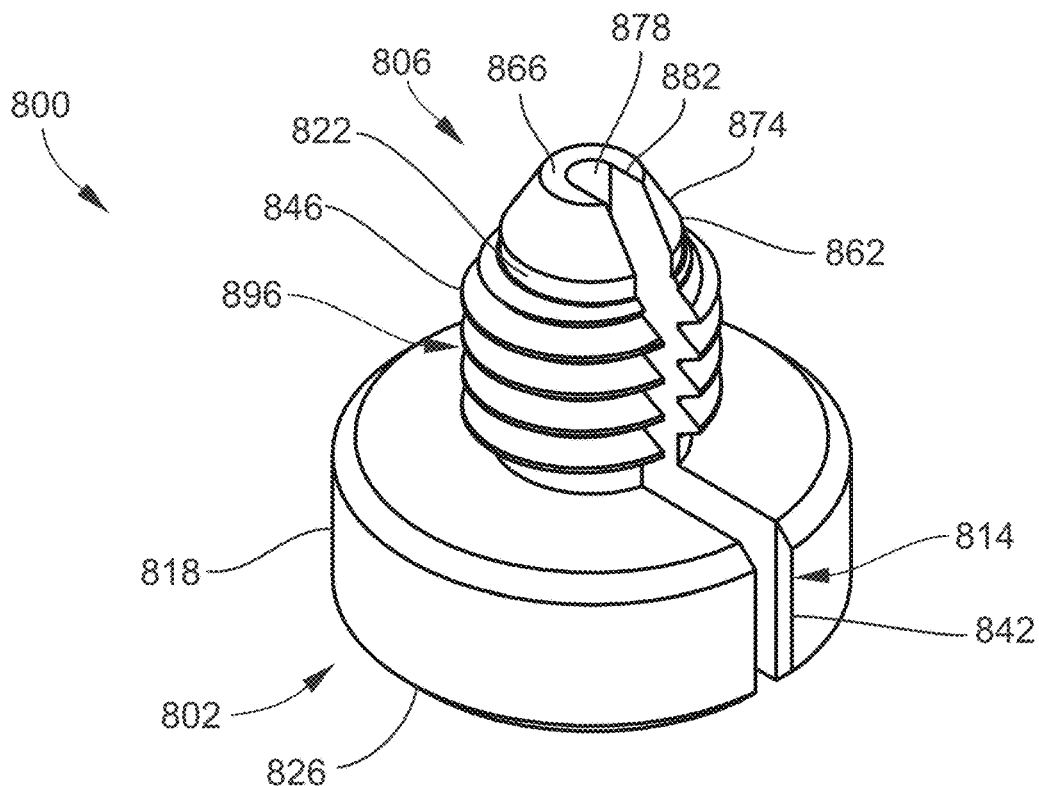
FIG. 8A is a schematic top perspective view of an example of a collet according to another example of the present disclosure.
Figure 8B:
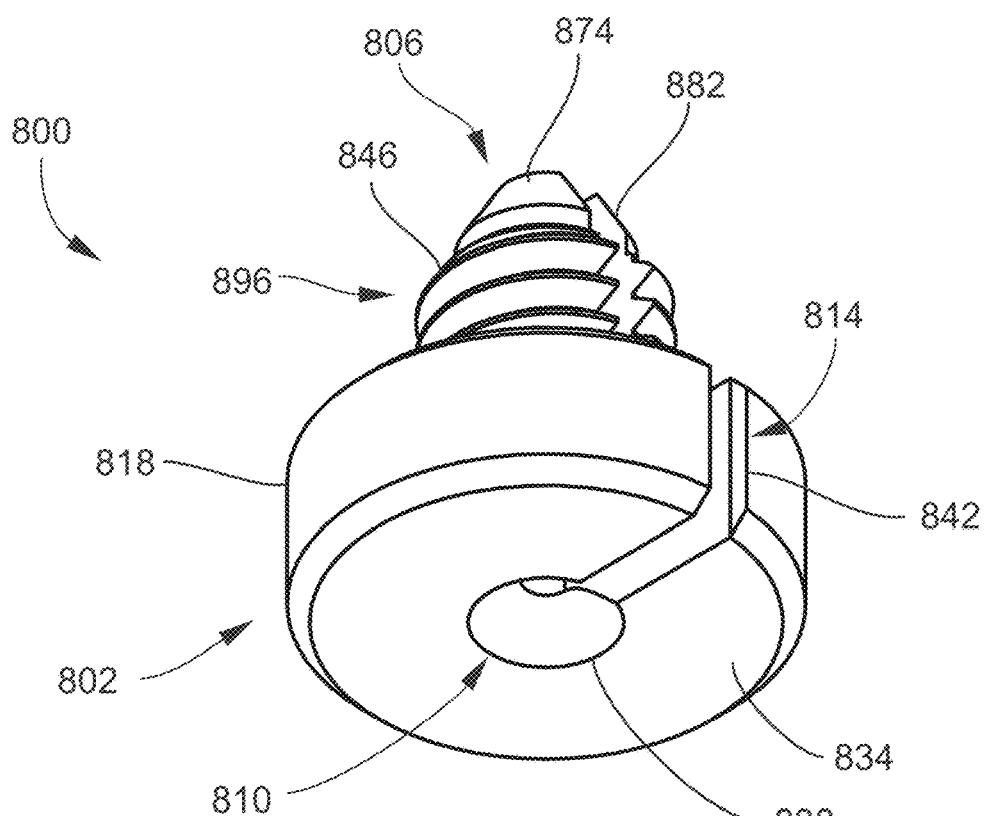
FIG. 8B is a schematic bottom perspective view of the collet illustrated in FIG. 8A, according to an example of the present disclosure.
Figure 8C:
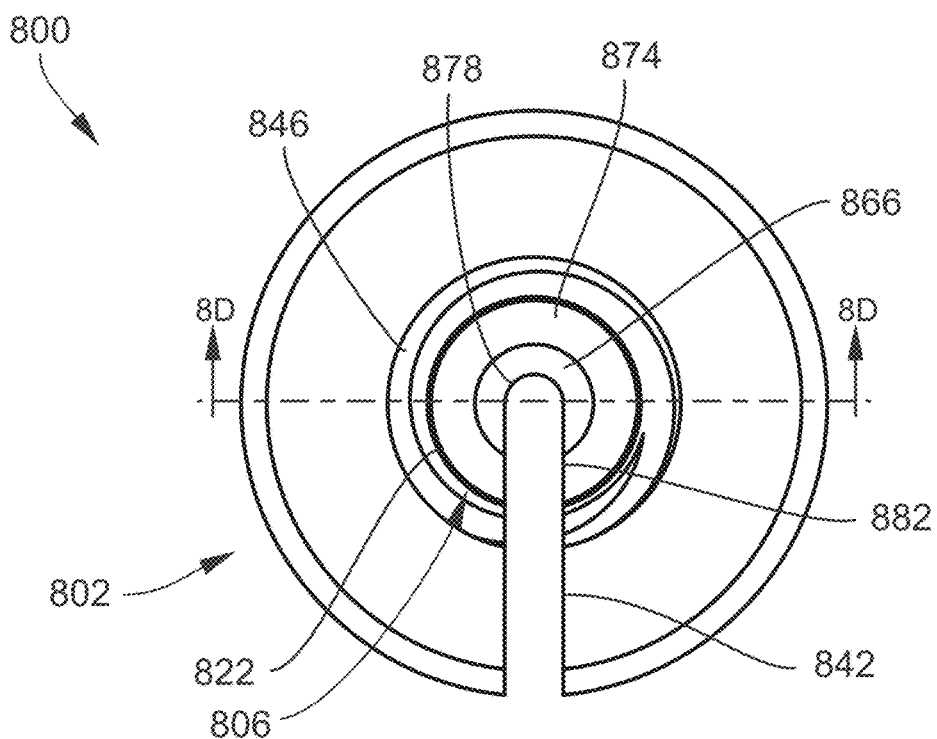
FIG. 8C is a schematic top plan view of the collet illustrated in FIG. 8A, according to an example of the present disclosure.
Figure 8D:
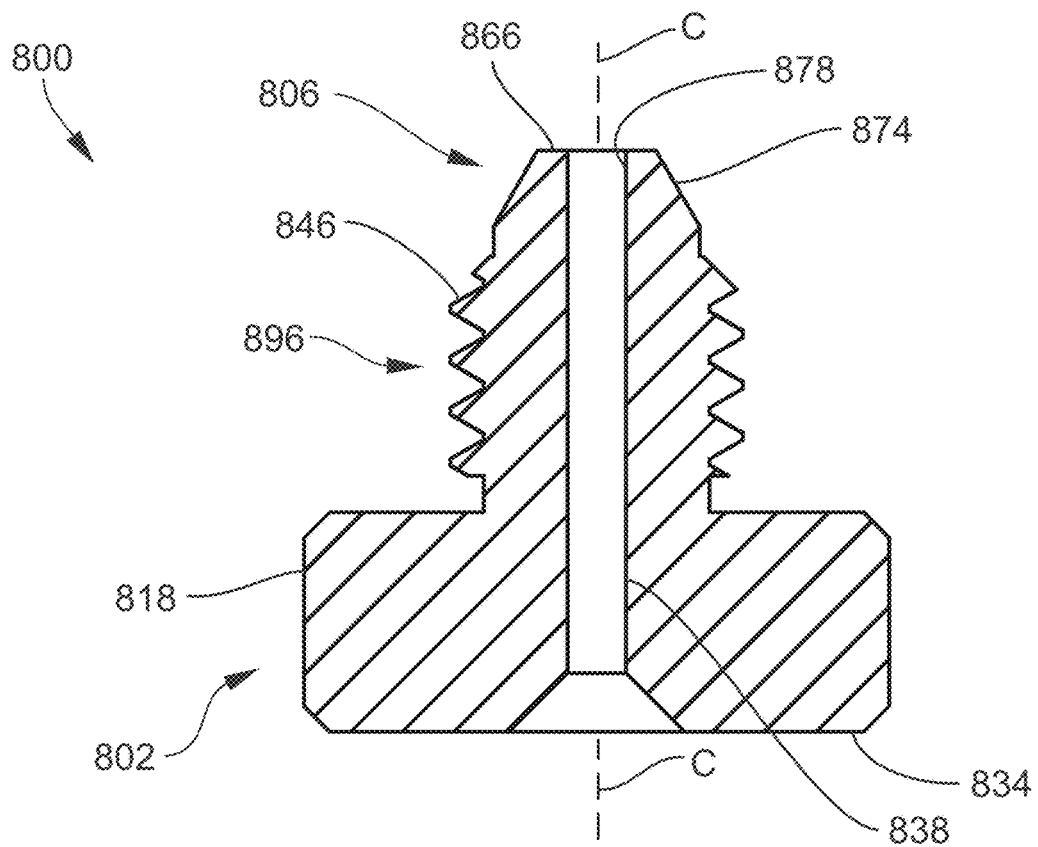
FIG. 8D is a schematic cross-sectional elevation view of the collet illustrated in FIG. 8A, taken along line 8D-8D in FIG. 8C, according to an example of the present disclosure.

FIGS. 8A to 8D illustrate an example of a collet (or collet assembly) 800 according to another example. Specifically, FIG. 8A is a schematic top perspective view of the collet 800. FIG. 8B is a schematic bottom perspective view of the collet 800. FIG. 8C is a schematic top plan view of the collet 800. FIG. 8D is a schematic cross-sectional elevation view of the collet 800, taken along line 8D-8D in FIG. 8C. The collet 800 may be provided as an alternative to the collets 400 and 500 described above and illustrated in FIGS. 4A to 5B, and a corresponding fluidic coupling device (e.g., the column nut 600 described above and illustrated in FIGS. 6A and 6B) may be modified (or provided with a column nut adapter as described below) accordingly.

Referring to FIG. 8A, the collet 800 generally includes a cap (section) 802, a conduit grasper (section) 806, a collet bore 810, and a collet slot 814. The conduit grasper 806, or both the conduit grasper 806 and the cap 802, are composed of a flexible material as described herein. The collet bore 810 extends through the cap 802 and the conduit grasper 806 along the collet axis C (FIG. 8D). The collet slot 814 extends along the collet axis C, and extends radially from the collet bore 810 to an outer lateral cap surface 818 and to an outer grasper surface 822.

The cap 802 generally includes a cap body 826 surrounding the collet axis C (FIG. 8D). The cap body 826 includes a cap (axial) end surface 834 (FIG. 8B) and the outer lateral cap surface 818. The cap 802 also includes a cap bore 838 surrounded by the outer lateral cap surface 818 and extending axially through the cap body 826 along the collet axis C. The cap 802 also includes a cap slot 842 extending axially through the cap body 826 along the collet axis C, and extending radially from the cap bore 838 to the outer lateral cap surface 818. The cap bore 838 defines at least a portion of the collet bore 810, and the cap slot 842 defines at least a portion of the collet slot 814.

The collet 800 further includes an intermediate body or section 896 axially disposed between the cap 802 and the conduit grasper 806. As illustrated, the intermediate section 896 may have a smaller outside diameter than the cap 802. The collet 800 further includes a collet engagement component 846 configured to engage a fluidic coupling device, as described herein. In the illustrated example, the collet engagement component 846 is disposed on or defines at least a part of the outside surface of the intermediate section 896. In the illustrated example, the collet engagement component 846 is an externally threaded section configured to mate with an internal thread of a fluidic coupling device (or a conduit nut adapter as described below). In another example, the collet engagement component 846 may be a non-threaded cylindrical section of circular perimeter disposed on or defining at least part of the outside surface of the intermediate section 896. In such an example, the collet engagement component 846 is configured to engage an inner cylindrical surface of a fluidic coupling device by press-fitting as described herein. Depending on the example, the intermediate section 896 may be considered as being a part of the cap 802 (e.g., an axially elongated extension of the cap body 826, including the cap bore 838 and cap slot 842) or as a component distinct from the cap 802. The larger-diameter portion of the cap 802 is configured to be handled/manipulated by a user as described herein.

The conduit grasper 806 generally includes a grasper body 862 surrounding the collet axis C (FIG. 4D). The grasper body 862 includes a grasper (axial) end surface 866 and the outer grasper surface 822. The outer grasper surface 822 includes a conical (or frustoconical, or tapered) grasper section 874, while the rest of the outer grasper surface 822 may be cylindrical and parallel to the collet axis C. The conical grasper section 874 may terminate at the grasper end surface 866 as illustrated. The conduit grasper 806 also includes a grasper bore 878 surrounded by the outer grasper surface 822 and extending axially through the grasper body 862 along the collet axis C. The grasper bore 878 is compressible (i.e., the diameter of the grasper bore 878 is reduced) in response to an appropriate force applied to the conical grasper section 874, thereby enabling the conduit grasper 806 to grasp (or grip) a conduit extending through the grasper bore 878 as described herein. The conduit grasper 806 also includes a grasper slot 882 extending axially through the grasper body 862 along the collet axis C, and extending radially from the grasper bore 878 to the outer grasper surface 822. The grasper slot 882 functions as described elsewhere herein. The grasper bore 878 defines at least a portion of the collet bore 810, and the grasper slot 882 defines at least a portion of the collet slot 814. The cap bore 838 extends from the cap end surface 834 to the grasper bore 878, and the grasper bore 878 extends from the cap bore 838 to the grasper end surface 866.

In the illustrated example, the collet 800 has a unitary (single-piece) construction, i.e., the cap 802 and the conduit grasper 806 are integral as a single unit. In this case, the cap 802 and the conduit grasper 806 may be composed of the same flexible material. Moreover, a greater part of the collet bore 810 (beyond just the grasper bore 878) may be compressed against, and thereby hold, a conduit extending through the collet bore 810. In other examples, two or more of the components of the collet 800 (e.g., the cap 802, conduit grasper 806, and/or intermediate section 896) may be (at least initially) separate components that are attached together as an assembly as described herein.

The collet 800 in other aspects (e.g., dimensions, other structural features, functions, advantages) may be the same as or similar to the collet 400 or 500 described above and illustrated in FIGS. 4A to 4D or 5A and 5B.

All examples of the collet described and illustrated herein generally include a first collet end surface and a second collet end surface spaced from (axially opposing) the first collet end surface along the collet axis C, and the collet bore and the collet slot extend from the first collet end surface to the second collet end surface. In the example illustrated in FIGS. 4A to 5B, the conduit grasper 406 is disposed in (or configured to be inserted into) at least a part of the cap bore 438 (specifically the first cap bore 450 in the present example). In such an example, the first cap end surface 430 corresponds to the first collet end surface, the second cap end surface 434 corresponds to the second collet end surface, and the conduit grasper 406 is disposed between the first cap end surface 430 and the second cap end surface 434. By comparison, in the example illustrated in FIGS. 8A to 8D, the conduit grasper 806 is disposed on, or extends axially from, the cap 802, specifically on or from the intermediate section 896 in the present example. In such an example, the grasper end surface 866 corresponds to the first collet end surface, and the axially opposite cap end surface 834 corresponds to the second collet end surface.

Figure 9A:
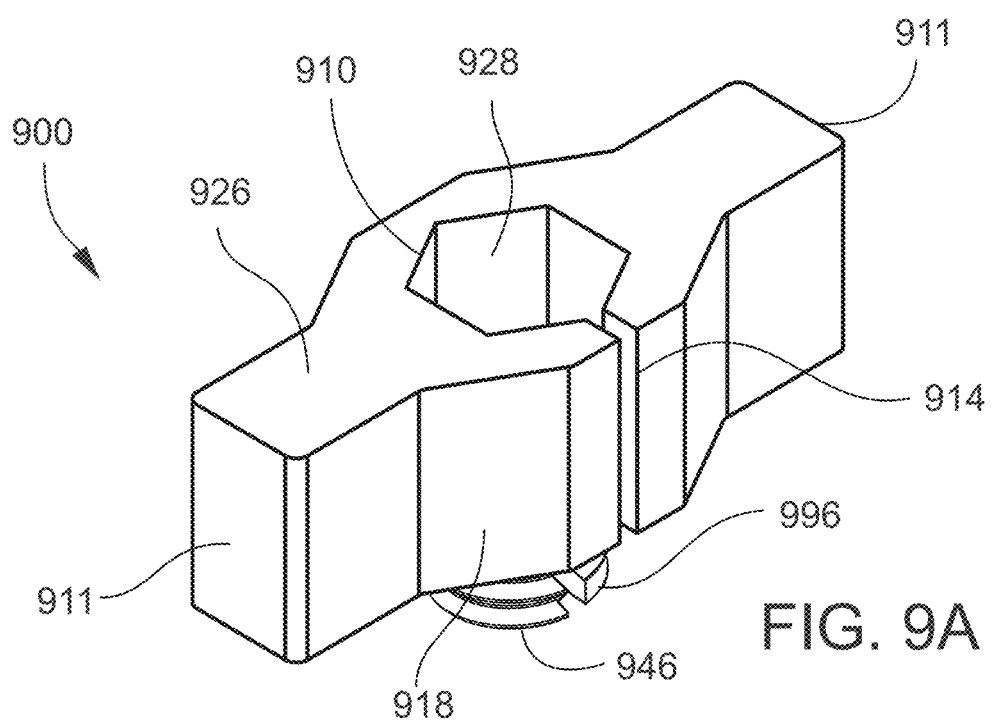
FIG. 9A is a schematic top perspective view of an example of an adapter according to an example of the present disclosure.
Figure 9B:
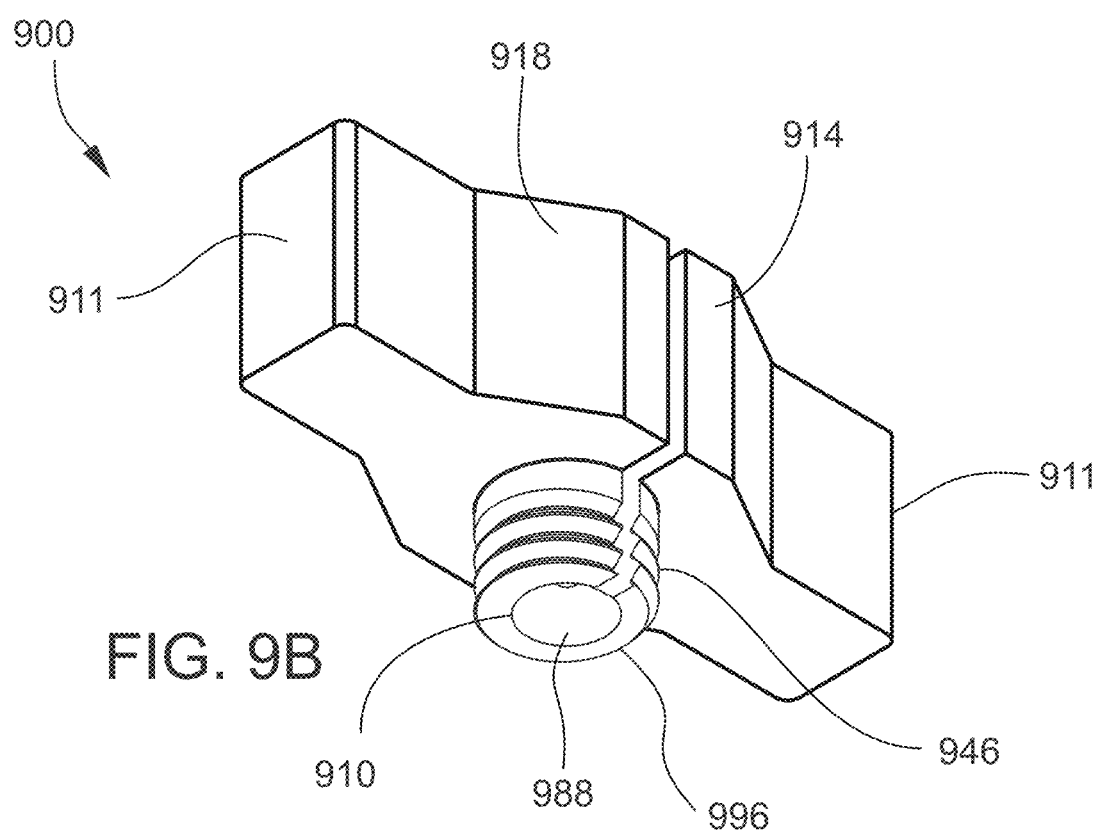
FIG. 9B is a schematic bottom perspective view of the adapter illustrated in FIG. 9A, according to an example of the present disclosure.
Figure 9C:
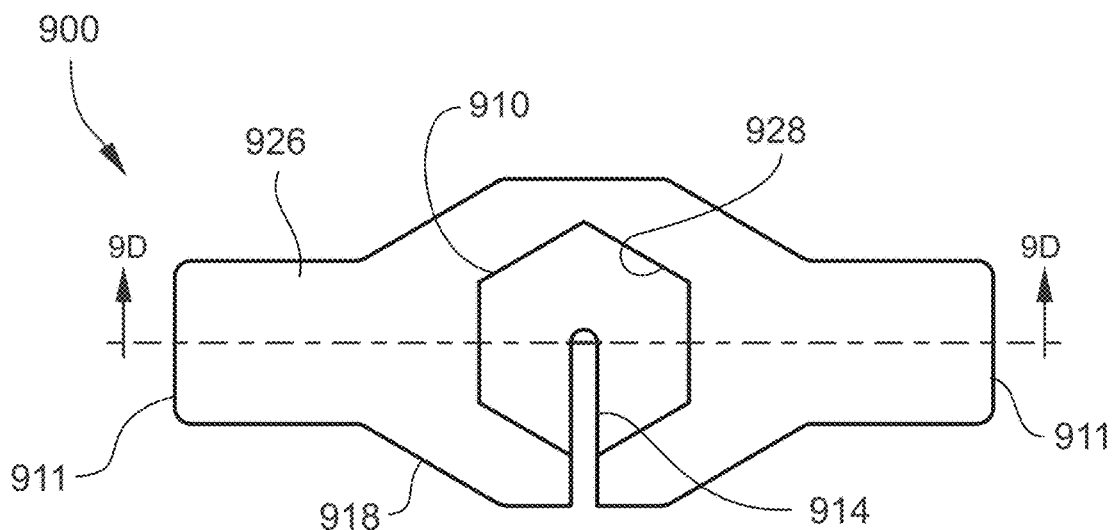
FIG. 9C is a schematic top plan view of the adapter illustrated in FIG. 9A, according to an example of the present disclosure.
Figure 9D:
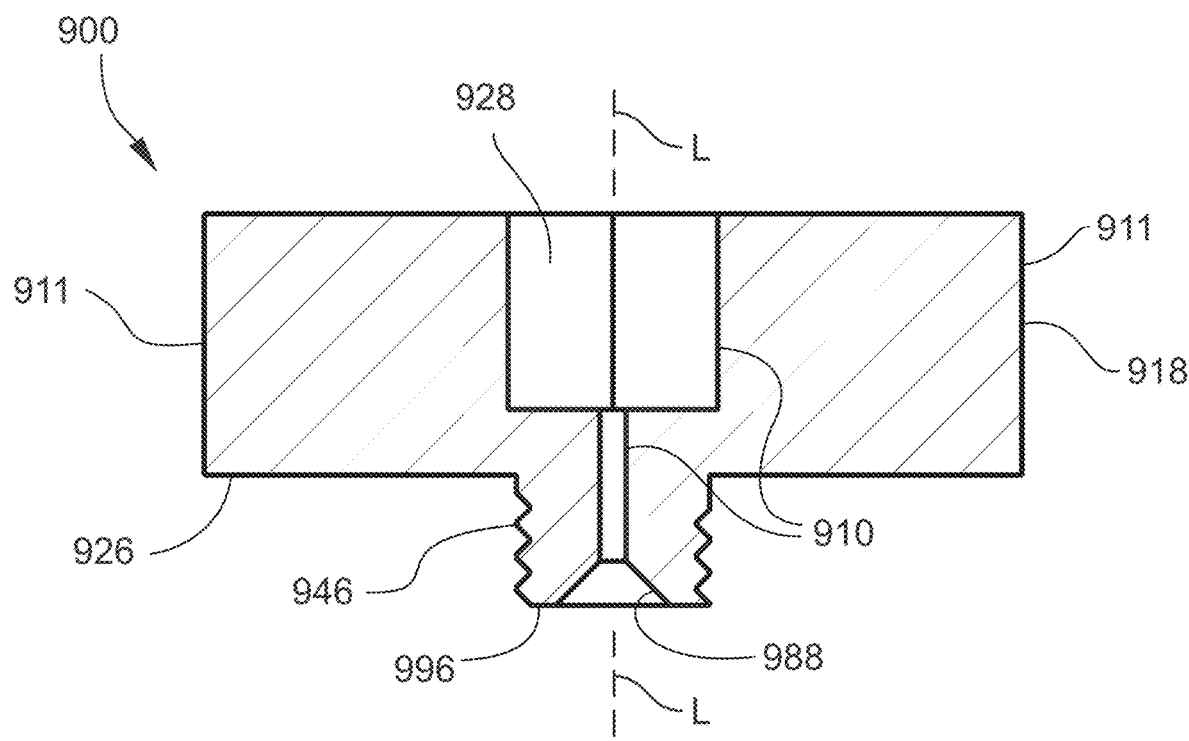
FIG. 9D is a schematic cross-sectional elevation view of the adapter illustrated in FIG. 9A, taken along line 9D-9D in FIG. 9C, according to an example of the present disclosure.

FIGS. 9A to 9D illustrate an example of a conduit nut adapter (or tool) 900 according to an example. Specifically, FIG. 9A is a schematic top perspective view of the adapter 900. FIG. 9B is a schematic bottom perspective view of the adapter 900. FIG. 9C is a schematic top plan view of the adapter 900. FIG. 9D is a schematic cross-sectional elevation view of the adapter 900, taken along line 9D-9D in FIG. 9C. The adapter 900 is configured to be utilized with a column nut having an external nut engagement component as described herein, such as the column nut 200 illustrated in FIGS. 2A and 2B, and with a collet as described herein, such as the collet 400 or 500 illustrated in FIG. 4A to 4D or 5A to 5B, respectively. For reference purposes, the adapter 900 is considered to be disposed along a longitudinal device axis L, as shown in FIG. 9D. In the present example, the conduit nut adapter 900 is a column nut adapter.

The adapter 900 generally includes an adapter body 926. The adapter body 926 includes an outer lateral adapter surface 918 extending in parallel with the between two axially opposing adapter end surfaces (orthogonal to the device axis L). As illustrated, the adapter body 926 may include one or more gripping members 911 (e.g., radially outward extending wings, ribs, handles, or the like, or knurling, flats, etc.) configured to facilitate rotation of the adapter body 926 by a user. In a typical example, the adapter body 926 is composed of a rigid material (i.e., a material that will not appreciably deform under normal use) such as a rigid metal or rigid plastic. The adapter 900 also includes an adapter bore 910 extending axially through the adapter body 926 along the device axis L. The adapter 900 also includes an adapter slot 914 extending axially through the adapter body 926 along the device axis L, and extending radially from the adapter bore 910 to the outer lateral adapter surface 918.

The adapter 900 further includes a first adapter engagement component 928 configured to engage a conduit nut, e.g., the external nut engagement component 228 of the column nut 200 illustrated in FIGS. 2A and 2B. In the illustrated example, the first adapter engagement component 928 includes a cylindrical section of polygonal cross-section defining at least part of the adapter bore 910. By this configuration, the first adapter engagement component 928 can engage the polygonal perimeter of the external nut engagement component 228, after which rotation of the adapter 900 by the user causes rotation of the column nut 200. The number of flats (or "points" adjoining adjacent flats) of the first adapter engagement component 928 need not be the same as the number of flats (or "points") of the external nut engagement component 228, so long as efficient coupling and rotation can be achieved.

The adapter body 926 further includes a cylindrical section 996 disposed on the device axis L. As illustrated, the cylindrical section 996 includes a part of the adapter slot 914. The adapter 900 further includes a second adapter engagement component 946 configured to engage the collet engagement component 446. In the illustrated example, the second adapter engagement component 946 is disposed on or defines at least a part of the outer lateral adapter surface 918, specifically at least a part of the outside surface of the cylindrical section 996. In the illustrated example, the second adapter engagement component 946 is an externally threaded adapter section configured to mate with an internally threaded section (internally threaded cap section 546) of the collet 500 shown in FIGS. 5A and 5B. In another example, the second adapter engagement component 946 may be a non-threaded cylindrical section of circular perimeter disposed on or defining at least part of the outside surface of the cylindrical section 996. In such an example, the second adapter engagement component 946 is configured to engage a non-threaded inner cylindrical surface of the collet engagement component 446 (FIGS. 4A to 4D) by press-fitting as described herein.

As best shown in FIG. 9D, the adapter bore 910 includes a conical adapter section (or conical cavity) 988 inside the cylindrical section 996 and configured to contact the conical grasper section 474 of the collet 400 or 500. By engaging the collet 400 or 500 with the adapter 900 and axially translating the collet 400 or 500 in the direction of the adapter 900, the conical grasper section 474 is compressed against the conical adapter section 988 and the grasper bore 478 is compressed against a conduit extending therethrough), as described herein. As described above, depending on the example, this may be accomplished by engaging an internal thread of the collet 500 (FIGS. 5A and 5B) with an external thread of the adapter 900 and rotating (screwing) the collet 500 relative to the adapter 900. In another example in which the collet 400 is not threaded, this may be accomplished by pushing the collet 400 (FIGS. 4A to 4D) onto the adapter 900 (specifically, onto the cylindrical section 996 in the present example), or both pushing the collet 400 and rotating (twisting) the collet 400 relative to the adapter 900.

Figure 10A:
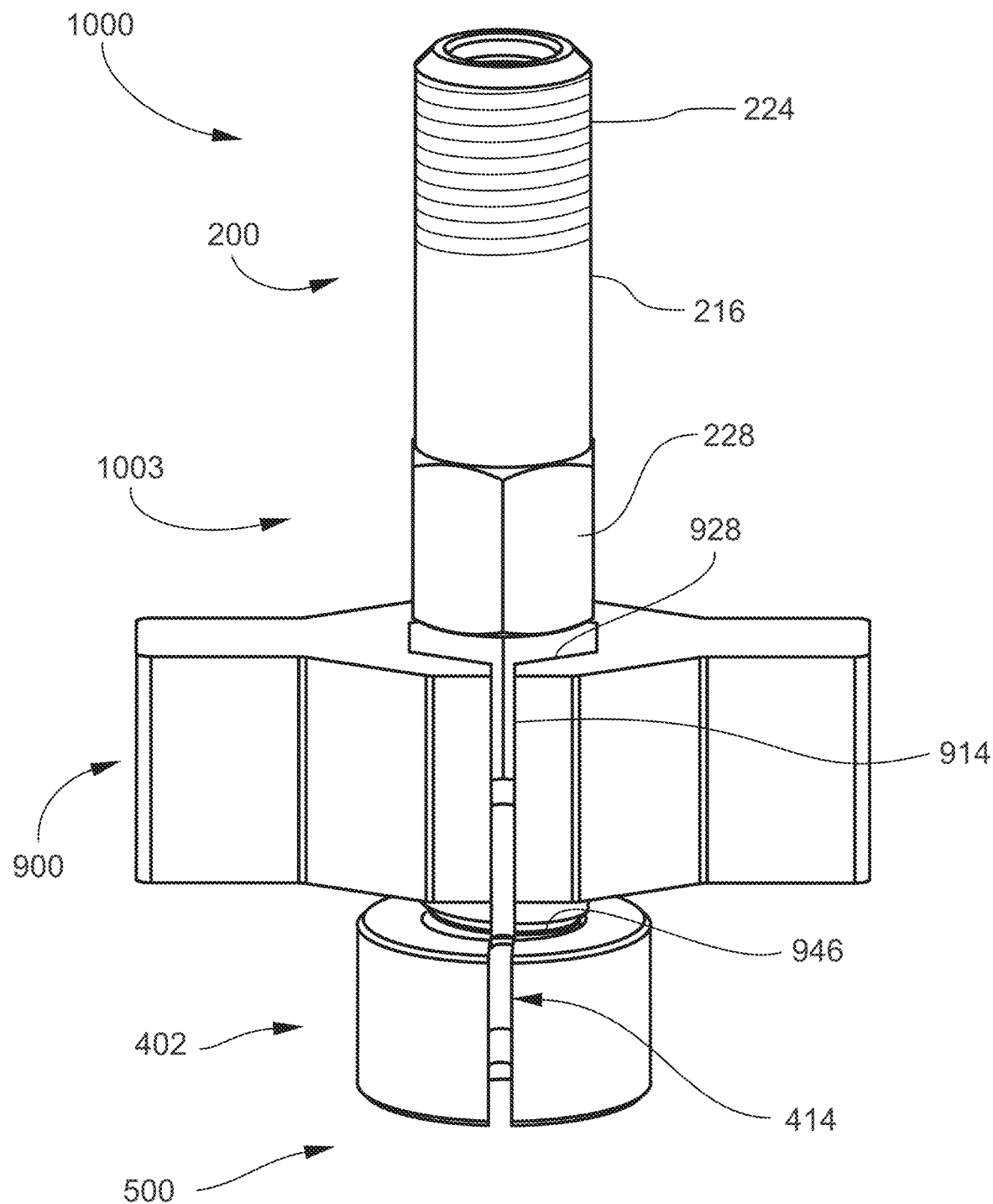
FIG. 10A is a schematic perspective view of an example of a fluidic coupling assembly according to another example of the present disclosure.
Figure 10B:
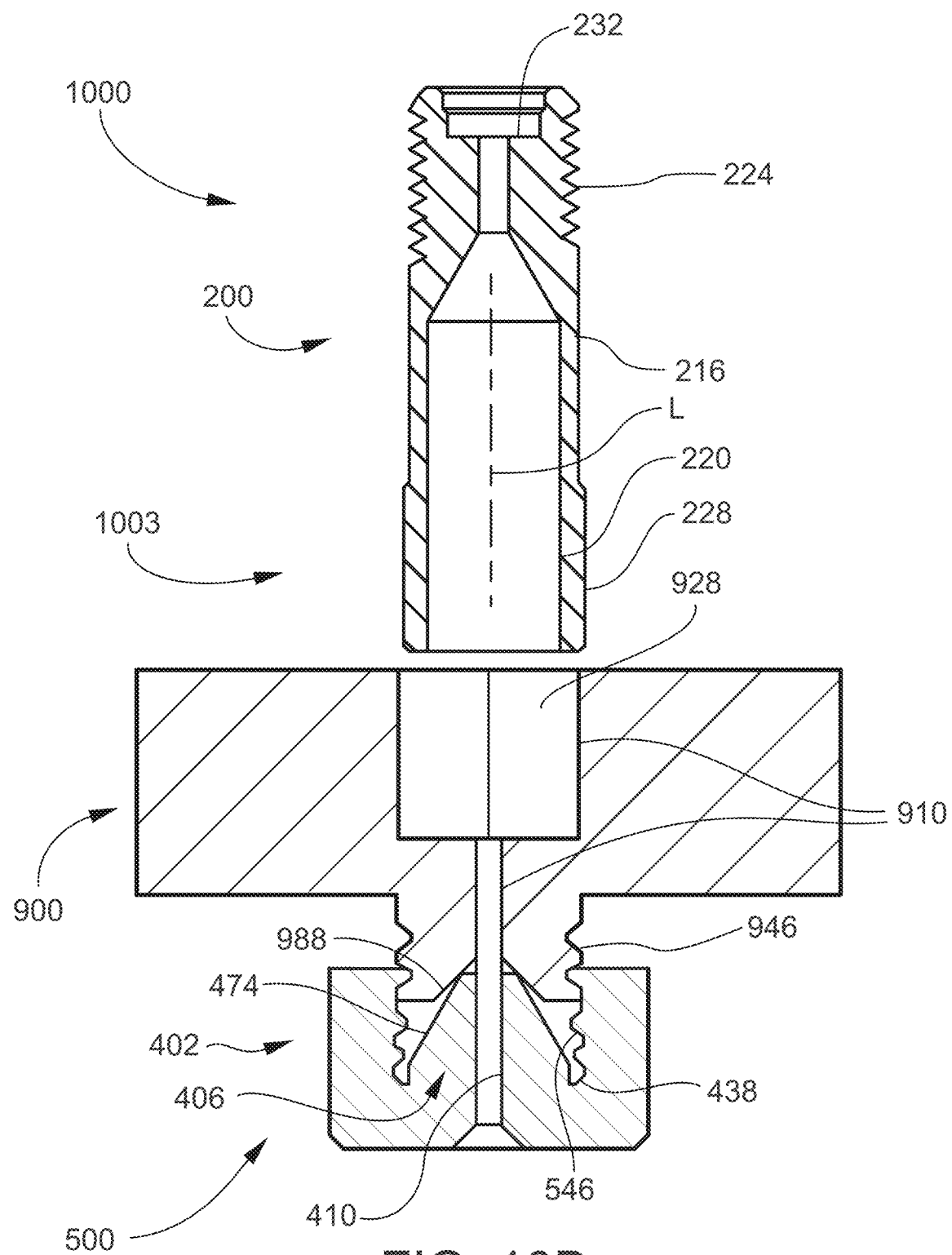
FIG. 10B is a schematic cross-sectional elevation view of the fluidic coupling assembly illustrated in FIG. 10A, according to an example of the present disclosure.

FIGS. 10A and 10B illustrate an example of a fluidic coupling assembly 1000 according to another example of the present disclosure. Specifically, FIG. 10A is a schematic perspective view of the fluidic coupling assembly 1000, and FIG. 10B is a schematic cross-sectional elevation view of the fluidic coupling assembly 1000. The fluid coupling assembly 1000 may be made at either end of a conduit, or two such fluid coupling assemblies 1000 may be made at the respective ends of the conduit. In some examples, the conduit may be, for example, a GC column, and thus may correspond to the column 108 described above and illustrated in FIG. 1. Accordingly, the fluid coupling assembly 1000 may, for example, correspond to the fluid coupling assembly 140 and/or the fluid coupling assembly 144 described above and illustrated in FIG. 1. For illustrative purposes, the components of the fluidic coupling assembly 1000 are considered to be generally arranged along a longitudinal device axis L (FIG. 10B) of the fluidic coupling assembly 1000.

In one example, the fluid coupling assembly 1000 generally may be considered as including the column 108 (or other type of conduit) and the fluidic component 340 as described above in conjunction with FIG. 7, and a fluidic coupling device 1003 configured to securely install the column 108 into the fluidic component 340. In another example, the fluid coupling assembly 1000 generally may be considered as including the column 108 and the fluidic coupling device 1003 without necessarily also including the fluidic component 340—for example, when the fluidic coupling device 1003 is not (yet) coupled to the fluidic component 340. In addition, depending on the example or stage of use or assembly, the fluidic coupling device 1003 or the fluidic coupling assembly 1000 may be considered as also including all or part of the collet 500 (or 400) as described above in conjunction with FIGS. 4A to 5B, or other collet disclosed herein—e.g., the conduit grasper 406 or both the conduit grasper 406 and the cap 402 (FIG. 10B).

The fluidic component 340 (FIG. 7) may be the same as or similar to the corresponding general example of the fluidic component 340 described above and illustrated in FIGS. 3A and 3B.

In the present example, the fluidic coupling device 1003 may include a conduit nut such as the conduit nut 200 described above in conjunction with FIGS. 2A and 2B, and further may include the ferrule 336 described above in conjunction with FIGS. 3A and 3B. The fluidic coupling device 1003 may also be considered as including a removable conduit nut adapter such as the adapter 900 described above in conjunction with FIGS. 9A to 9D. Alternatively, the adapter 900 may be considered as being a component separate from the fluidic coupling device 1003. In addition, the fluidic coupling device 1003 includes a conical cavity configured to receive at least the conical grasper section 474 of the collet 500. In the present example, the conical adapter section 988 of the adapter 900 includes, or corresponds to, the conical cavity. The angle of the conical grasper section 474 of the collet 500 may be different (e.g., smaller, relative to the device axis L) than the angle of the conical adapter section 988 of the adapter 900. The threaded collet 500 or the non-threaded collet 400 may be utilized in this example.

A general example of a method for installing a conduit such as the column 108 (FIG. 7) in the fluidic coupling device 1003 is as follows. First, the collet 500 is positioned such that the conduit grasper 406 is positioned between the cap 402 and the fluidic coupling device 1003 (specifically the adapter 900 in the illustrated example), and the collet 500 is aligned with the fluidic coupling device 1003 (the adapter 900), i.e., the collet axis C is coincident with the device axis L. The collet 500 is removably engaged with the adapter 900. Specifically, the collet engagement component 546 is engaged with the second adapter engagement component 946. By this initial engagement, the collet 500 is only loosely attached to the adapter 900. At this stage, the conduit grasper 406 may or may not be in contact with the adapter bore 910 (more specifically, the internal conical adapter section 988 in the illustrated example), but in either case, the conduit grasper 406 is not (appreciably) compressed. Accordingly, the grasper bore 478 is not (appreciably) compressed (i.e., is fully or almost fully open at its nominal inside diameter), and the grasper slot 442 (FIGS. 4A to 4C) is not (appreciably) compressed (i.e., is fully or almost fully open at its nominal arcuate width).

Before or after engaging the collet 500 with the adapter 900, the adapter 900 is removably engaged with the column nut 200. Specifically, the column nut 200 may be dropped into the adapter bore 910 such that the external nut engagement component 228 engages the first adapter engagement component 928. For clarity, FIGS. 10A and 10B illustrated the column nut 200 as being disengaged from (or before being engaged with) the adapter 900.

Before or after engaging the collet 500 with the adapter 900, and before or after engaging the column nut 200 with the adapter 900, the column 108 (FIG. 7) is passed through the collet bore 410 and the adapter bore 910, and into the device bore (the nut bore 220) of the fluidic coupling device 1003. As described above, the column 108 may be passed through the nut bore 220 to extend beyond the fluidic coupling device 1003, in preparation for installing the column 108 in the fluidic component 340, and to obtain a designated axial distance D if needed, as described herein.

The axial position of the column 108 is then secured by axially translating the collet 500 in a first direction relative to the adapter 900, to thereby axially translate the conduit grasper 406 into contact (or further contact) with the adapter 900. In particular, axially translating the conduit grasper 406 causes the conduit grasper 406 to be compressed against the conical cavity, which in the present example is part of the adapter bore 910. More specifically, the conduit grasper 406 is compressed against the conical adapter section 988 of the adapter 900. Consequently, the conduit grasper 406 is compressed against the column 108 in the collet bore 410. In other words, the rotation and corresponding axial translation of the cap 402 creates a conduit grasper-to-fluidic coupling device interface and a conduit grasper-to-conduit gripping interface, similar to the gripping interfaces 705 and 709 described above and depicted in FIG. 7. To axially translate the collet 500, the collet 500 may be screwed into the adapter bore 910 as illustrated, or the collet 400 may be press-fitted into the adapter bore 910 as described above in conjunction with FIGS. 4A to 4D and FIG. 7. As shown in FIG. 10A, after coupling the collet 500 to the adapter 900, the collet 500 may be oriented such that the collet slot 414 is axially aligned with the adapter slot 914.

At this stage, the position of the column 108 is fixed relative to the adapter 900, and the column 108 may then be installed into a selected fluidic component 340. At some point in the assembly process, before installing the column 108 in the fluidic component 340, the column end 372 (FIG. 7) is (preferably) squarely and cleanly cut by an appropriate technique.

As described herein, the collet 500 (as well as other collets described herein) enables or significantly enhances the ability to reach and maintain the (specific value of the) above-described designated axial distance D during and up to the completion of the conduit installation process. Thus, in an example of the method, before fully securing the column 108 in the adapter 900, the column 108 is passed through the entire device bore (the nut bore 620, and also the ferrule bore 368 as shown in FIG. 7) of the fluidic coupling device 1003 such that an end section of the column 108 protrudes beyond the fluidic coupling device 1003. The axial position of the column 108 is then adjusted until the designated axial distance D is obtained. The collet 500 is then fully secured to lock in the axial position of the column 108 at the designated axial distance D, such that the designated axial distance D will not change during the remainder of the conduit installation process.

In an example, the axial translation of the collet 500 in the first direction is performed in at least two steps: a first translating step and a separate, second translating step as described herein. The first translating step involves translating the collet 500 by a first amount that urges the conduit grasper 406 into contact with the column 108 at the collet bore 410, such that the conduit grasper 406 lightly holds the column 108 while allowing the column 108 to be axially translated through the collet bore 410 by pulling and/or pushing the column 108. The subsequent second translating step involves translating the collet 500 by a second amount that compresses the conduit grasper 406 against the column 108 (to a greater degree than resulted from the first translating step), such that axial translation of the column 108 is now prevented. That is, the second translating step fully secures the column 108 in the adapter 900.

As described herein, the separate first and second translating steps are particularly useful for obtaining and maintaining the designated axial distance D. Thus, in an example of the method, after the first translating step and before the second translating step, the column 108 is axially translated (its axial position is adjusted) until the designated axial distance D is obtained. The second step of axially translating the collet 500 is then performed to lock in the column 108 at the designated axial distance D.

As described herein, in an example, after securing the column 108 in the adapter 900, such as by performing the second translating step just described, although the column 108 is no longer axially translatable, it may still be rotatable relative to the conduit grasper 406 (rotatable in the collet bore 410) in response to a sufficient force or torque applied by the user.

A general example of making the fluid coupling assembly 1000—i.e., installing a conduit such as the column 108 in the fluidic coupling device 1003 and further into the fluidic component 340 to achieve a complete fluidic coupling—is as follows. First, the adapter 900 is coupled to the fluidic coupling device 1003 (the column nut 200 in the present example), and the column 108 is secured to the adapter 900, such that the column 108 passes through and protrudes beyond the fluidic coupling device 1003 (and by a designated axial distance D if needed), as described above. Then, the combination (or assembly) of the column 108 and fluidic coupling device 1003 (including the column nut 200 and adapter 900 in the present example) is aligned with the component bore 344 of the fluidic component 340 on the device axis L (FIG. 7). In particular, the first nut engagement component 224 of the fluidic coupling device 1003 is aligned with the engagement section 352 (FIG. 7) of the fluidic component 340. The column 108 is then inserted (column end 372 first) into the component bore 344 and the fluidic coupling device 1003 is coupled to the fluidic component 340, thereby securing the column 108 in the fluidic component 340 and establishing a fluid-sealed flow path, as described above in conjunction with FIG. 7. Typically, a ferrule 336 is compressed between the column nut 200 and the component bore 344 to achieve a leak-free fluidic coupling (namely, a ferrule-to-fluidic component sealing interface 380 and a ferrule-to-conduit sealing interface 384), as described above in conjunction with FIG. 7.

In the present example, the coupling of the fluidic coupling device 1003 to the fluidic component 340 is done by engaging the threaded section of the first nut engagement component 224 of the fluidic coupling device 1003 with the threaded section of the engagement section 352 (FIG. 7) of the fluidic component 340. The user then rotates the adapter 900 to thereby rotate the column nut 200 relative to the fluidic component 340 (which typically remains stationary) until a secure coupling is achieved.

At this point, the conduit installation is complete, although as a further step, the adapter 900 and the collet 500 may be removed for reuse.

In an example, the removal entails moving the collet 500 to reduce (loosen) the gripping force imparted by the collet 500 on the column 108, consequently enabling the adapter 900 and the collet 500 to axially translate relative to the column 108 (e.g., slide along the column 108). This may be done by axially translating the collet 500 in a second direction opposite to the first direction. The adapter 900 is then disengaged from the column nut 200. The adapter 900 and the collet 500 are then moved (together) away from the column nut 200 (e.g., slid down the column 108). With the adapter slot 914 and the collet slot 414 aligned with each other, the adapter 900 and the collet 500 are then moved away from the column 108 via the adapter slot 914 and collet slot 414—i.e., the column 108 passes through the adapter slot 914 and collet slot 414.

In another example, the collet 500 may be removed (disengaged) from the adapter 900. This may be done before removing the adapter 900 from the fluidic coupling device 1003, or after removing the adapter 900 from the fluidic coupling device 1003. In the latter case, the collet slot 414 should be aligned with the adapter slot 914 so that the adapter 900 and the collet 500 are removed from the column 108 together, after which the collet 500 can be removed from the adapter 900.

Figure 11A:
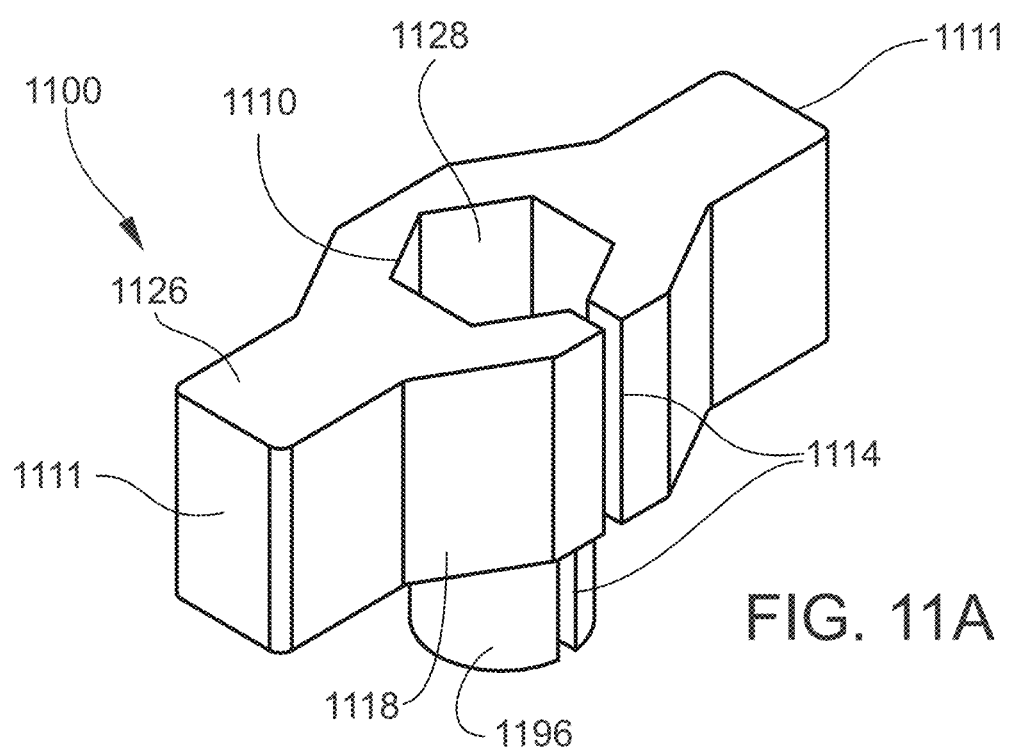
FIG. 11A is a schematic top perspective view of an example of an adapter according to another example of the present disclosure.
Figure 11B:
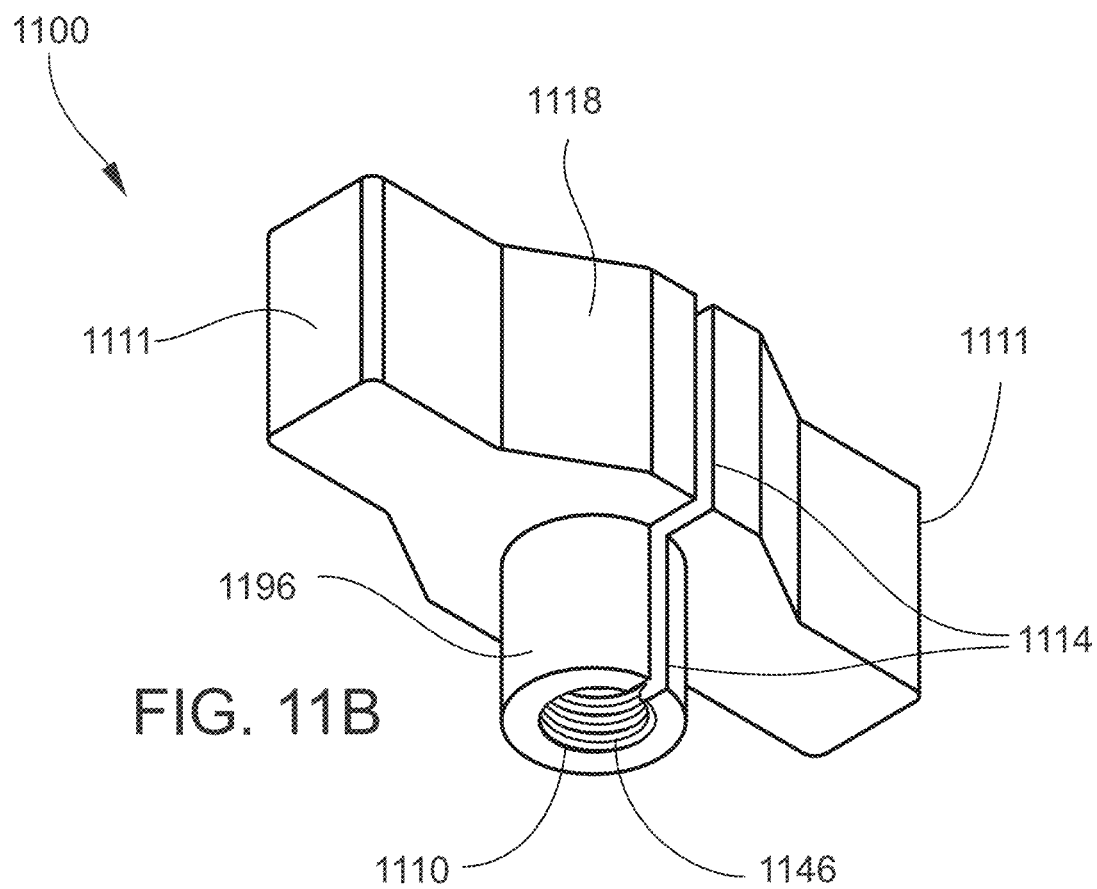
FIG. 11B is a schematic bottom perspective view of the adapter illustrated in FIG. 11A, according to an example of the present disclosure.
Figure 11C:
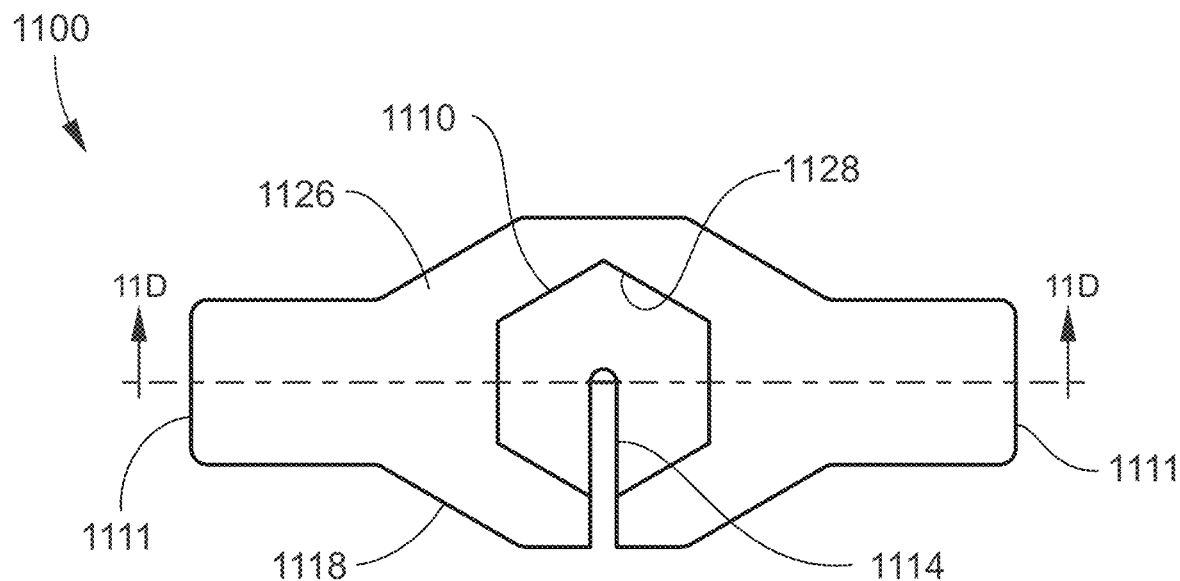
FIG. 11C is a schematic top plan view of the adapter illustrated in FIG. 11A, according to an example of the present disclosure.
Figure 11D:
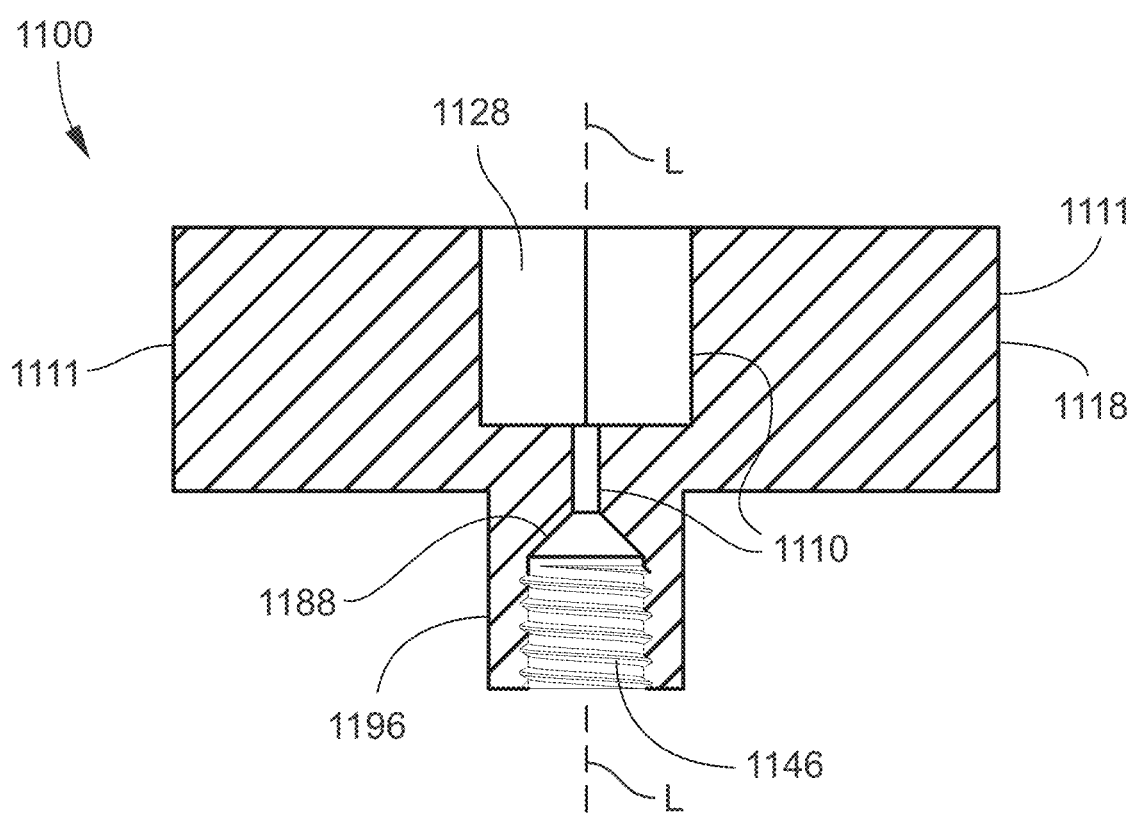
FIG. 11D is a schematic cross-sectional elevation view of the adapter illustrated in FIG. 11A, taken along line 11D-11D in FIG. 11C, according to an example of the present disclosure.

FIGS. 11A to 11D illustrate an example of a conduit nut adapter (or tool) 1100 according to another example. Specifically, FIG. 11A is a schematic top perspective view of the adapter 1100. FIG. 11B is a schematic bottom perspective view of the adapter 1100. FIG. 11C is a schematic top plan view of the adapter 1100. FIG. 11D is a schematic cross-sectional elevation view of the adapter 1100, taken along line 11D-11D in FIG. 11C. The adapter 1100 is configured to be utilized with a conduit nut having a polygonal external nut engagement component as described herein, such as the column nut 200 illustrated in FIGS. 2A and 2B, and with a collet as described herein, such as the collet 800 illustrated in FIGS. 8A to 8D. For reference purposes, the adapter 1100 is considered to be disposed along a longitudinal device axis L, as shown in FIG. 11D.

The adapter 1100 generally includes an adapter body 1126. The adapter body 1126 includes an outer lateral adapter surface 1118 extending in parallel with the between two axially opposing adapter end surfaces (orthogonal to the device axis L). The adapter body 1126 may include one or more gripping members 1111 for manipulation by a user as described above. In a typical example, the adapter body 1126 is composed of a rigid material as described above in conjunction with FIGS. 9A to 9D. The adapter 1100 also includes an adapter bore 1110 extending axially through the adapter body 1126 along the device axis L. The adapter 1100 also includes an adapter slot 1114 extending axially through the adapter body 1126 along the device axis L, and extending radially from the adapter bore 1110 to the outer lateral adapter surface 1118.

The adapter 1100 further includes a first adapter engagement component 1128 configured to engage a conduit nut, e.g., the external nut engagement component 228 of the column nut 200 illustrated in FIGS. 2A and 2B. In the illustrated example, the first adapter engagement component 1128 includes a cylindrical section of polygonal cross-section defining at least part of the adapter bore 1110. By this configuration, the first adapter engagement component 1128 can engage the polygonal perimeter of the external nut engagement component 228, after which rotation of the adapter 1100 by the user causes rotation of the column nut 200, as described herein in conjunction with FIGS. 9A to 9D.

The adapter body 1126 further includes a cylindrical section 1196 disposed on the device axis L. As illustrated, the cylindrical section 1196 includes a part of the adapter slot 1114. The adapter 1100 further includes a second adapter engagement component 1146 configured to engage the collet engagement component 846. In the illustrated example, the second adapter engagement component 1146 is disposed on or defines at least a part of the adapter bore 1110, specifically a part of the adapter bore 1110 inside the cylindrical section 1196. In the illustrated example, the second adapter engagement component 1146 is an internally threaded adapter section configured to mate with an externally threaded section of the collet engagement component 846. In another example, the second adapter engagement component 1146 may be a non-threaded cylindrical section of circular cross-section defining at least a part of the adapter bore 1110. In such an example, the second adapter engagement component 1146 is configured to engage a non-threaded outer cylindrical surface of the collet engagement component 846 (FIGS. 8A to 8D) by press-fitting as described herein.

As shown in FIG. 11D, the adapter bore 1110 includes a conical adapter section (or conical cavity) 1188 inside the cylindrical section 1196 and configured to contact the conical grasper section 874 of the collet 800. By engaging the collet 800 with the adapter 1100 and axially translating the collet 800 in the direction of the adapter 1100, the conical grasper section 874 is compressed against the conical adapter section 1188 and the grasper bore 878 is compressed against a conduit extending therethrough, as described herein. As described above, depending on the example, this may be accomplished by engaging an external thread of the collet 800 with an internal thread of the adapter 1100 and rotating (screwing) the collet 800 relative to the adapter 1100. In another example in which the collet 800 is not threaded, this may be accomplished by pushing the collet 800 into the adapter 900 (specifically, into the cylindrical section 1196 in the present example), or both pushing the collet 800 and rotating (twisting) the collet 800 relative to the adapter 1100.

The adapter 1100 in other aspects (e.g., dimensions, other structural features, functions, advantages) may be the same as or similar to the adapter 900 described above and illustrated in FIGS. 9A to 9D.

Figure 12A:
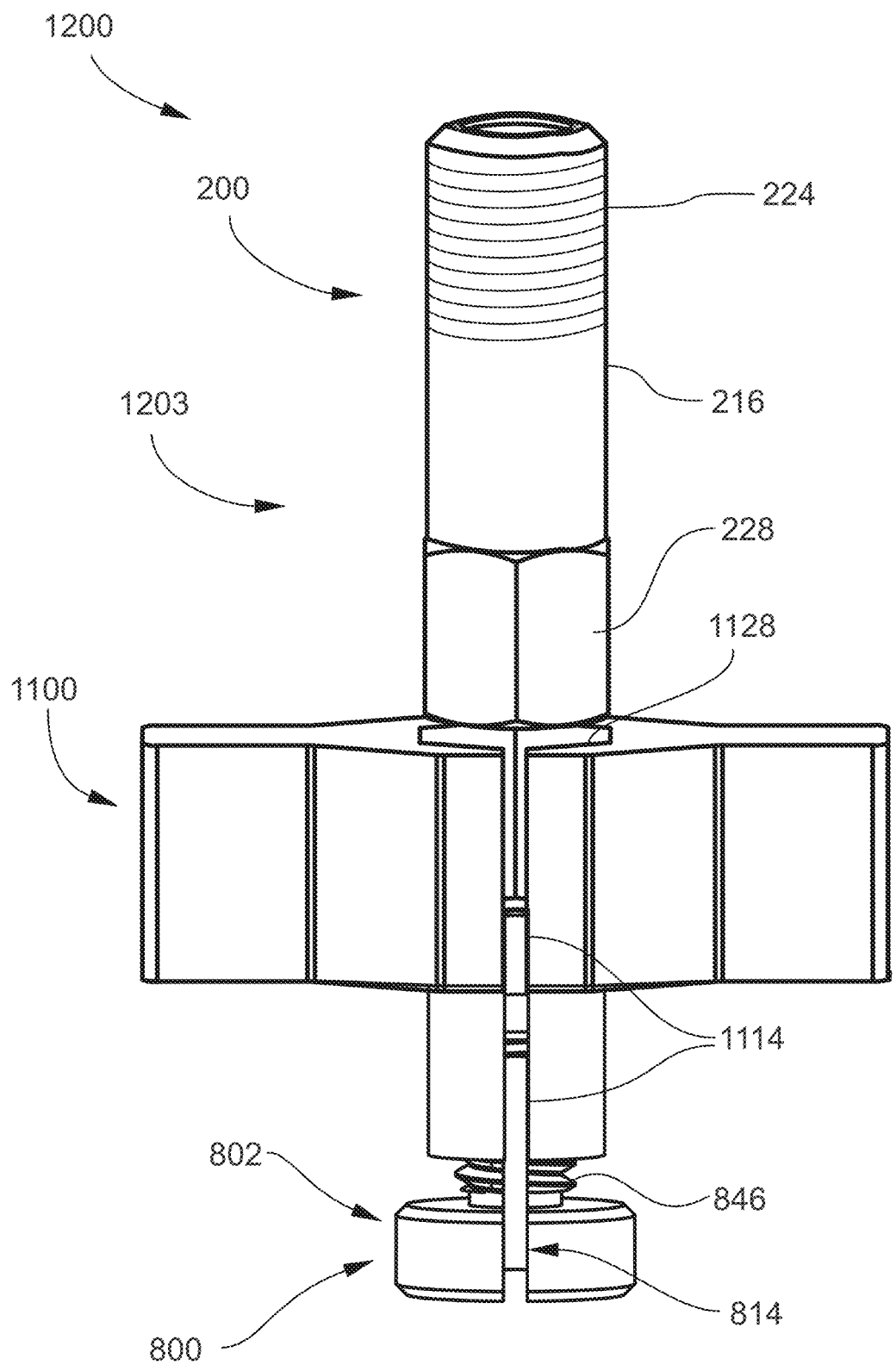
FIG. 12A is a schematic perspective view of an example of a fluidic coupling assembly according to another example of the present disclosure.
Figure 12B:
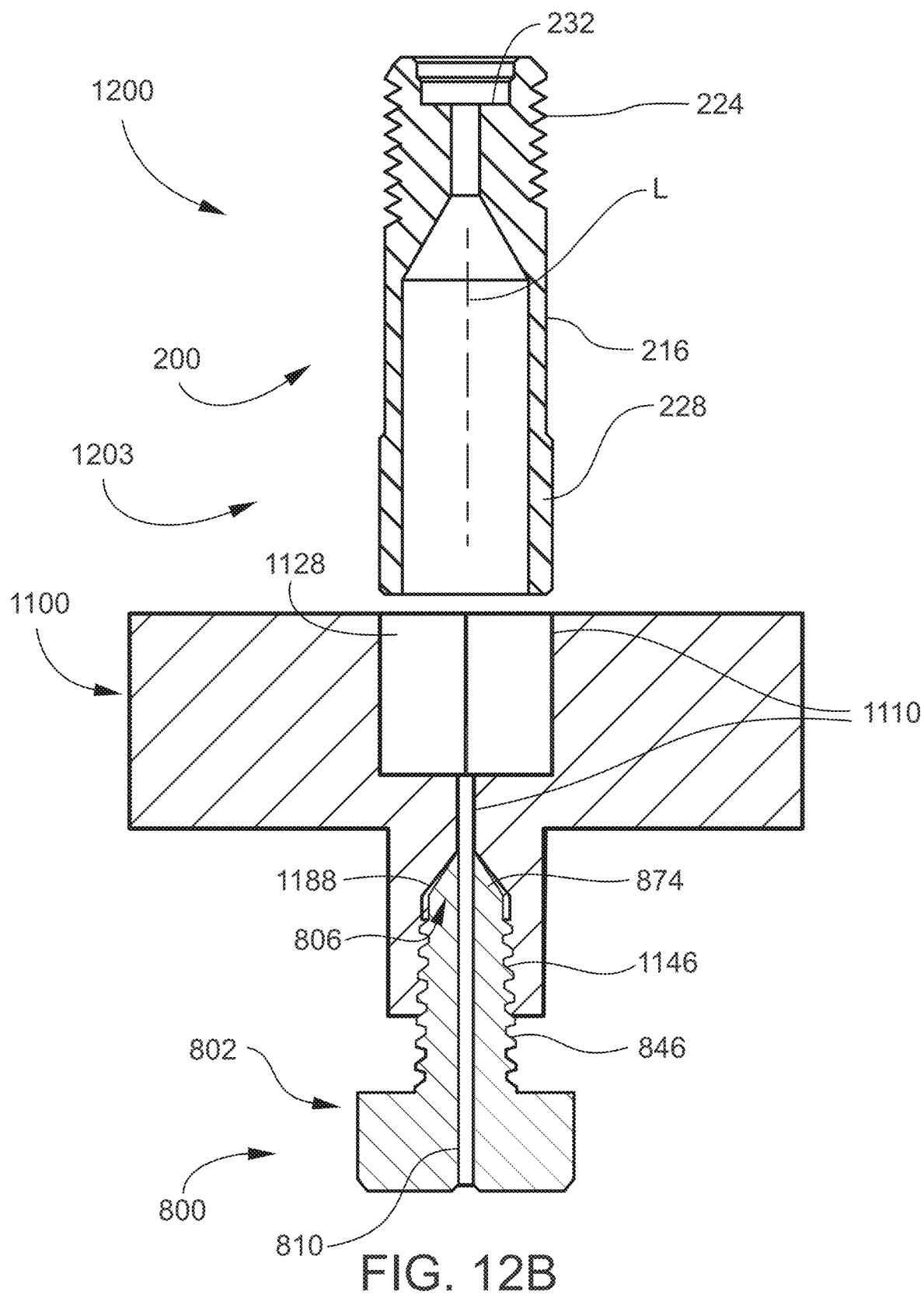
FIG. 12B is a schematic cross-sectional elevation view of the fluidic coupling assembly illustrated in FIG. 12A, according to an example of the present disclosure.

FIGS. 12A and 12B illustrate an example of a fluidic coupling assembly 1200 according to another example of the present disclosure. Specifically, FIG. 12A is a schematic perspective view of the fluidic coupling assembly 1200, and FIG. 12B is a schematic cross-sectional elevation view of the fluidic coupling assembly 1200. The fluid coupling assembly 1200 may be made at either end of a conduit, or two such fluid coupling assemblies 1200 may be made at the respective ends of the conduit. The conduit may correspond to the column 108 described herein.

In one example, the fluid coupling assembly 1200 generally may be considered as including the column 108 and the fluidic component 340 as described above in conjunction with FIG. 7, and a fluidic coupling device 1203 configured to securely install the column 108 into the fluidic component 340. In another example, the fluid coupling assembly 1200 generally may be considered as including the column 108 and the fluidic coupling device 1203 without necessarily also including the fluidic component 340—for example, when the fluidic coupling device 1203 is not (yet) coupled to the fluidic component 340. In addition, depending on the example or stage of use or assembly, the fluidic coupling device 1203 or the fluidic coupling assembly 1200 may be considered as also including all or part of the collet 800 as described above in conjunction with FIGS. 8A to 8D, or other collet disclosed herein—e.g., the conduit grasper 806 or both the conduit grasper 806 and the cap 802 (FIG. 12B).

In the present example, the fluidic coupling device 1203 may include a column nut such as the column nut 200 described above in conjunction with FIGS. 2A and 2B, and further may include the ferrule 336 described above in conjunction with FIGS. 3A and 3B. The fluidic coupling device 1203 may also be considered as including a removable column nut adapter such as the adapter 1100 described above in conjunction with FIGS. 11A to 11D. Alternatively, the adapter 1100 may be considered as being a component separate from the fluidic coupling device 1203. In addition, the fluidic coupling device 1203 includes a conical cavity configured to receive at least the conical grasper section 874 of the collet 800. In the present example, the conical adapter section 1188 of the adapter 900 includes, or corresponds to, the conical cavity. The angle of the conical grasper section 874 of the collet 800 may be different (e.g., smaller, relative to the device axis L) than the angle of the conical adapter section 1188 of the adapter 1100.

The assembly of the fluidic coupling device 1203 and the fluid coupling assembly 1200, with the adapter 1100 positioned between the collet 800 and (the column nut 200 of) the fluidic coupling device 1203, and the method for installing the column 108 in the fluidic coupling device 1203 and also into the fluidic component 340, generally may be similar to the example described above and illustrated in FIGS. 10A and 10B. One difference relates to the coupling of the collet 800 to the adapter 1100. The present example, the collet 800 is axially translated into and out from the internal second adapter engagement component 1146. By comparison, in the example of FIGS. 10A and 10B, the collet 500 (or 400) is axially translated onto and away from the external second adapter engagement component 946.

Figure 13:
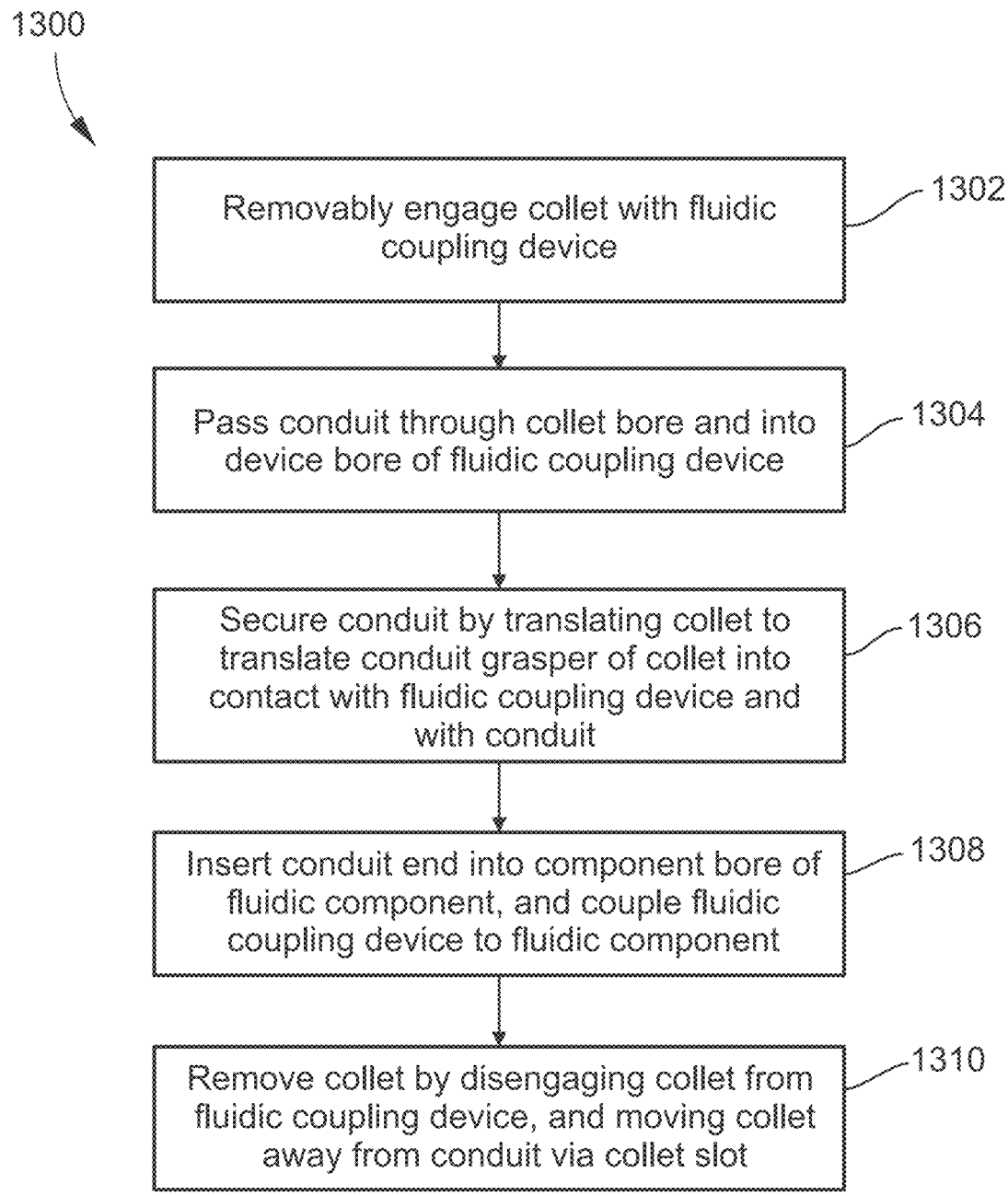
FIG. 13 is a flow diagram illustrating an example of a method for installing a conduit in a fluidic coupling device, or additionally in a fluidic component, according to an example of the present disclosure.

FIG. 13 is a flow diagram 1300 illustrating an example of a method for installing a conduit in a fluidic coupling device, or additionally in a fluidic component, according to an example of the present disclosure. First, a collet that includes a cap, a conduit grasper, and a collet bore, as described herein, is provided. The collet (or at least the cap) is removably engaged with the fluidic coupling device such that the conduit grasper is between the cap and the fluidic coupling device (step 1302). Before or after the engaging, the conduit is passed through the collet bore and into a device bore of the fluidic coupling device (step 1304). After the engaging and the passing, an axial position of the conduit is secured by axially translating the collet (or at least the cap)

in a first direction relative to the fluidic coupling device to axially translate the conduit grasper into contact with the fluidic coupling device, and thereby compress the conduit grasper against the conduit in the collet bore (step 1306). In an example, after the securing, the conduit may be installed in the fluidic component by inserting a conduit end of the conduit into a component bore of the fluidic component, and coupling the fluidic coupling device to the fluidic component (step 1308). In an example, after the securing, the collet (or at least the cap) may be removed by axially translating the collet (or at least the cap) in a second direction opposite to the first direction to disengage the collet (or at least the cap) from the fluidic coupling device, moving the cap away from the conduit such that the conduit passes through the collet slot (step 1310).

In an example, the flow diagram 1300 may also schematically represent the hardware components utilized to carry out the method steps 1302-1310—for example, the collet, conduit, fluidic coupling device, and fluidic component, all as described herein.

Figure 14:
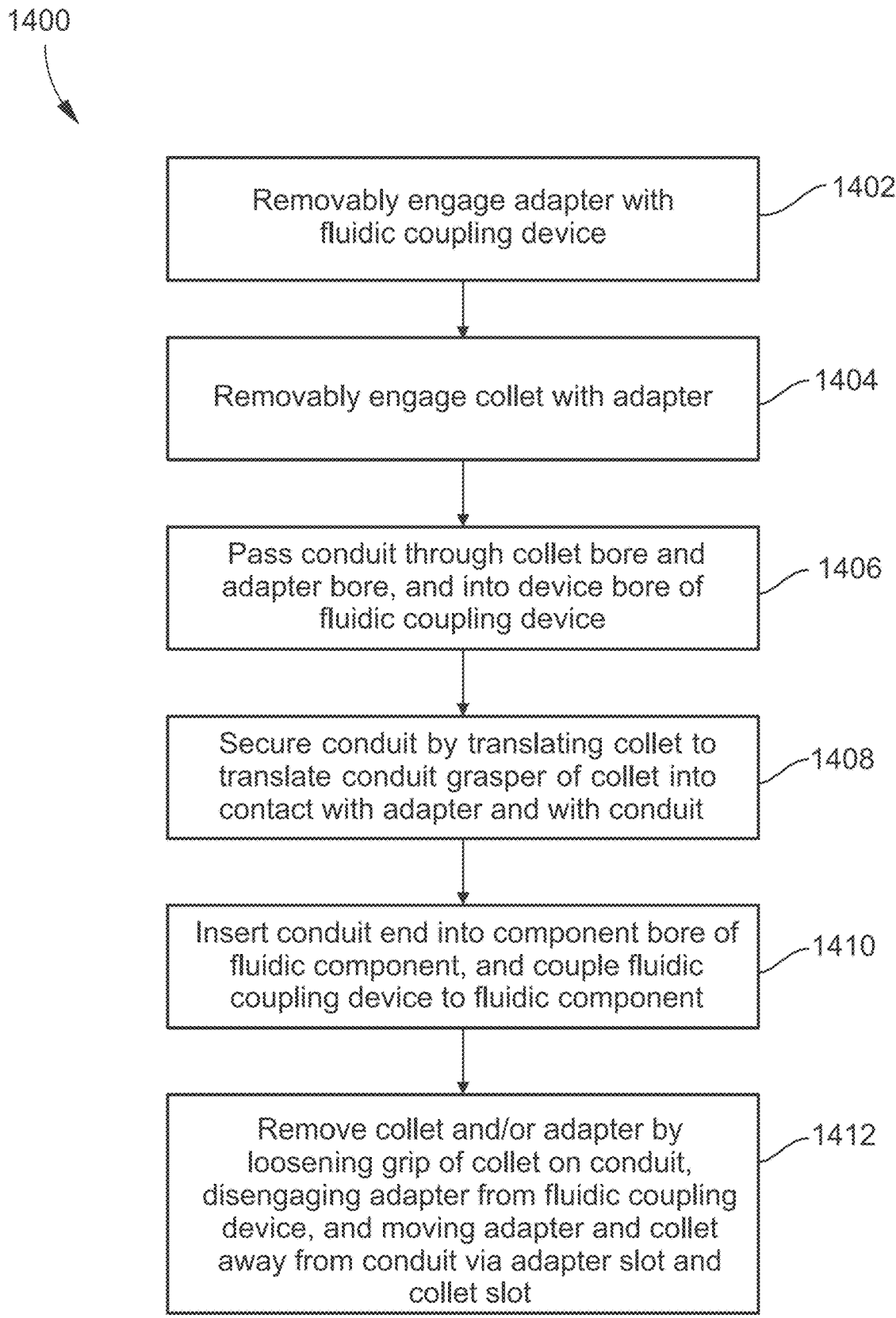
FIG. 14 is a flow diagram illustrating an example of a method for installing a conduit in a fluidic coupling device, or additionally in a fluidic component, according to another example of the present disclosure.

FIG. 14 is a flow diagram illustrating an example of a method for installing a conduit in a fluidic coupling device, or additionally in a fluidic component, according to another example of the present disclosure. First, a collet that includes a cap, a conduit grasper, and a collet bore, as described herein, is provided. An adapter that includes an adapter bore and an adapter slot, as described herein is also provided. The adapter is removably engaged with the fluidic coupling device (such as a conduit nut of the fluidic coupling device) (step 1402). Before or after the foregoing engaging step, the collet is removably engaged with the adapter, such that the conduit grasper is between the cap and the adapter (step 1404). Before, between, or after the foregoing engaging steps, the conduit is passed through the collet bore and the adapter bore, and into a device bore of the fluidic coupling device (step 1406). After the engaging and passing steps, an axial position of the conduit is secured by axially translating the collet in a first direction relative to the adapter to axially translate the conduit grasper into contact with the adapter, and thereby compress the conduit grasper against the conduit in the collet bore (step 1408). In an example, after the securing, the conduit may be installed in the fluidic component by inserting a conduit end of the conduit into a component bore of the fluidic component, and coupling the fluidic coupling device to the fluidic component (step 1410). In an example, after the securing, the collet and the adapter may be removed by axially translating the collet in a second direction opposite to the first direction to reduce a gripping force imparted by the collet on the conduit, disengaging the adapter from the fluidic coupling device (e.g., conduit nut) and, with the collet slot aligned with the adapter slot, moving the collet and the adapter away from the conduit such that the conduit passes through the collet slot and the adapter slot (step 1412).

In an example, the flow diagram 1400 may also schematically represent the hardware components utilized to carry out the method steps 1402-1412—for example, the collet, conduit, fluidic coupling device, adapter, and fluidic component, all as described herein.

From the foregoing, it is evident that the examples described herein—particularly examples of the collet and the fluidic coupling device and the methods utilizing them—make conduit installation much easier as compared to conventional methods employing conventional fluidic coupling components. As one example, the examples described herein eliminate the need for performing delicate pre-swaging of graphite and metal ferrules. More generally, and the examples described herein are compatible with any type of ferrule and any of the standard or common types of fluidic components (e.g., GC inlets, detectors, other fittings, etc.) into which conduits need to be installed. As one example, the examples described herein provide the ability to easily attain and maintain the designated axial distance D described above throughout the conduit installation process.

While the description herein is directed primarily to the installation of chromatographic columns (for either GC or LC), the subject matter generally may be applied to the installation of any (particularly capillary-sized) fluidic conduit to a fluidic fitting.

In another example of the present disclosure, a fluidic coupling device as disclosed herein may be configured as a fluidic union. As appreciated by persons skilled in the art, a fluidic union is configured to interconnect the flow paths of two conduits in a fluid-tight manner. Generally, such a fluidic union includes an internal passage (or chamber, conduit, etc.) and two axially opposite union fittings that communicate with the internal passage on opposite sides thereof. The two conduits are fluidly coupled to the respective union fittings, resulting in a single flow path running from one conduit, through the internal passage, and to the other conduit. The conduits may be the same or different in terms of type, material, and/or size (e.g., inside diameter). As examples, one conduit may be a chromatographic column while the other conduit is a non-chromatographic tube; one conduit may be composed of fused silica while the other conduit is composed of metal; one conduit may have an inside diameter that is larger or smaller than that of the other conduit; etc. A fluidic coupling device as disclosed herein may be modified to provide a fluidic union. As one non-exclusive example, one or two column nuts and associated ferrules may be provided to realize one or both of the union fittings. Accordingly, one or two of the collets as disclosed herein may be utilized in such examples. For instance, the collet(s) may be advantageous for the conduit end(s) in the internal passage of the fluidic union.

EXAMPLES

In addition to the examples described above, other examples provided in accordance with the presently disclosed subject matter include, but are not limited to, the following:

1. A collet for installing a conduit in a fluidic coupling, the collet comprising:
    a cap comprising an outer lateral cap surface and a collet engagement component configured to engage a fluidic coupling device;
    a conduit grasper comprising an outer grasper surface;
    a collet bore extending through the cap and the conduit grasper along a collet axis; and
    a collet slot extending along the collet axis, and extending radially from the collet bore to the outer lateral cap surface and to the outer grasper surface,
    wherein the conduit grasper has a toroidal shape about the collet axis, and is composed of a flexible material such that the conduit grasper is compressible in response to a force applied to the outer grasper surface.

2. The collet of embodiment 1, wherein the toroidal shape of the conduit grasper comprises a configuration according to at least one of:
    a cylinder;
    a cylinder, wherein the outer grasper surface comprises a conical grasper section, and the conduit grasper is compressible in response to a force applied to the conical grasper section; and a torus.

3. The collet of example 1 or 2, wherein the collet engagement component comprises at least one of:
- a cylindrical section of circular cross-section, the cylindrical section defining at least part of the collet bore;
- an internally threaded cap section defining at least part of the collet bore;
- a cylindrical section of circular perimeter, the cylindrical section disposed on or defining at least part of the outer lateral cap surface; and
- an externally threaded cap section disposed on or defining at least part of the outer lateral cap surface.

4. The collet of any of the preceding examples, wherein:
- the cap comprises a cap bore surrounded by the outer lateral cap surface, and a cap slot extending radially from the cap bore to the outer lateral cap surface;
- the conduit grasper comprises a grasper bore surrounded by the outer grasper surface, and a grasper slot extending radially from the grasper bore to the outer grasper surface;
- the collet bore comprises at least a portion of the cap bore and the grasper bore; and
- the collet slot comprises the cap slot and the grasper slot, wherein the grasper bore is compressible in response to the force applied to the outer grasper surface.

5. The collet of example 4, wherein the conduit grasper is configured to be inserted into the cap bore such that the grasper bore is aligned with the cap bore on the collet axis.

6. The collet of example 5, wherein the cap comprises a shoulder disposed in the cap bore, and the conduit grasper is configured to contact the shoulder when the conduit grasper is inserted into the cap bore.

7. The collet of example 6, wherein the cap bore comprises a first cap bore having a first bore diameter and a second cap bore having a second bore diameter, the first bore diameter is greater than the second bore diameter, and the shoulder is defined between the first cap bore and the second cap bore.

8. The collet of example 7, wherein the collet engagement component comprises at least one of:
- a cylindrical section of circular cross-section, the cylindrical section defining at least part of the first cap bore; and
- an internally threaded cap section defining at least part of the first cap bore.

9. The collet of any of examples 4-8, wherein the grasper slot is aligned with the cap slot.

10. The collet of any of examples 4-9, wherein:
- the cap comprises a first cap end surface and a second cap end surface spaced from the first cap end surface along the collet axis; and
- the outer lateral cap surface, the cap bore, and the cap slot extend from the first cap end surface to the second cap end surface.

11. The collet of example 10, wherein:
- the cap bore comprises a first cap bore and a second cap bore;
- the first cap bore extends along the collet axis from the first cap end surface toward the second cap end surface, and has a first bore diameter;
- the second cap bore extends along the collet axis from the first cap bore to the second cap end surface, and has a second bore diameter;
- the first bore diameter is greater than the second bore diameter, wherein a shoulder is defined between the first cap bore and the second cap bore;
- the conduit grasper is configured to be disposed in the first cap bore such that the grasper bore is aligned with the cap bore on the collet axis; and
- the conduit grasper is configured to contact the shoulder.

12. The collet of any of examples 4-11, wherein:
- the conduit grasper comprises a first grasper end surface and a second grasper end surface axially opposing the first grasper end surface; and
- the outer lateral grasper surface, the grasper bore, and the grasper slot extend from the first grasper end surface to the second grasper end surface.

13. The collet of example 12, wherein the toroidal shape of the conduit grasper comprises a conical grasper section, and the conical grasper section terminates at the first grasper end surface.

14. The collet of example 12 or 13, wherein the toroidal shape of the conduit grasper comprises a conical grasper section, and the cap comprises a shoulder disposed in the cap bore, and the second grasper end surface is configured to contact the shoulder such that the conical grasper section faces away from the shoulder.

15. The collet of any of the preceding examples, wherein the cap and the conduit grasper are separate components.

16. The collet of example 15, wherein the conduit grasper is attached to the cap.

17. The collet of any of the preceding examples, wherein the flexible material comprises at least one of: a rubber; a silicone rubber; a vulcanized rubber; polyurethane; polytetrafluoroethylene (PTFE); a polyaryletherketone (PAEK); polyether ether ketone (PEEK); and a polyimide-based polymer.

18. The collet of any of examples 1-14 or 17, wherein the cap and the conduit grasper are integral as a single unit, such that the cap is composed of the flexible material.

19. The collet of any of the preceding examples, comprising a first collet end surface, and a second collet end surface spaced from the first collet end surface along the collet axis, wherein the collet bore and the collet slot extend from the first collet end surface to the second collet end surface.

20. The collet of example 19, wherein:
- the cap comprises a cap bore surrounded by the outer lateral cap surface and defining at least a part of the collet bore, a first cap end surface corresponding to the first collet end surface, and a second cap end surface corresponding to the second collet end surface; and
- the conduit grasper is disposed in the cap bore or configured to be inserted into the cap bore.

21. The collet of example 19, wherein:
- the conduit grasper comprises a grasper end surface, and is disposed on from the cap such that the grasper end surface corresponds to the first collet end surface; and
- the cap comprises a cap end surface corresponding to the second collet end surface.

22. A fluidic coupling device for installing a conduit, comprising:
- a conical cavity configured to receive the conduit grasper of the collet of any of the preceding examples;
- a conduit nut body comprising a first axial nut end and a second axial nut end spaced from the first axial nut end along a device axis;
- a nut bore extending through the conduit nut body from the first axial nut end to the second axial nut end; and a first nut engagement component disposed at the first axial nut end, and configured to engage a fluidic component configured to receive the conduit.

23. The fluidic coupling device of example 22, wherein:
the nut bore comprises a conical nut section disposed at the second axial nut end, the conical nut section configured to contact the outer grasper surface;
the conical nut section comprises the conical cavity; and
the fluidic coupling device comprises a second nut engagement component configured to engage the collet engagement component.

24. The fluidic coupling device of example 23, comprising the collet, wherein the conduit grasper is in contact with the conical nut section.

25. The fluidic coupling device of example 23 or 24, comprising the collet, wherein the collet engagement component is removably engaged with the second nut engagement component.

26. The fluidic coupling device of example 22, comprising:
an external nut engagement component configured to facilitate rotation of the column nut; and
an adapter comprising an adapter bore, a first adapter engagement component configured to engage the external nut engagement component, and a second adapter engagement component configured to engage the collet engagement component,
wherein the adapter bore comprises a conical adapter section configured to contact the outer grasper surface, and the conical adapter section comprises the conical cavity.

27. The fluidic coupling device of example 26, comprising the collet, wherein the conduit grasper is in contact with the conical adapter section.

28. The fluidic coupling device of example 26 or 27, comprising the collet, wherein the collet engagement component is removably engaged with the second adapter engagement component.

29. The fluidic coupling device of any of examples 26-28, wherein the external nut engagement component comprises a cylindrical section of polygonal perimeter disposed on or defining at least part of an outer lateral nut surface of the column nut, and the first adapter engagement component comprises a cylindrical section of polygonal cross-section defining at least part of the adapter bore.

30. The fluidic coupling device of any of examples 26-29, wherein the second adapter engagement component comprises at least one of:
a cylindrical section of circular cross-section, the cylindrical section defining at least part of the adapter bore;
an internally threaded adapter section defining at least part of the adapter bore;
a cylindrical section of circular perimeter, the cylindrical section disposed on or defining at least part of an outer lateral adapter surface of the adapter; and
an externally threaded adapter section disposed on or defining at least part of an outer lateral adapter surface of the adapter.

31. The fluidic coupling device of any of examples 26-30, wherein the adapter comprises an outer lateral adapter surface, and an adapter slot extending along the device axis and extending radially from the adapter bore to the outer lateral adapter surface.

32. The fluidic coupling device of example 31, wherein the adapter and the cap are engaged such that the adapter slot is aligned with the collet slot.

33. The fluidic coupling device of any of examples 22-32, wherein the first nut engagement component comprises at least one of:
an internally threaded nut section defining at least part of the nut bore; and
an externally threaded nut section disposed on or defining at least part of an outer lateral nut surface of the column nut.

34. The fluidic coupling device of any of examples 22-25 or 33, comprising a second nut engagement component configured to engage the collet engagement component, the second nut engagement component comprising at least one of:
a cylindrical section of circular cross-section, the cylindrical section defining at least part of the nut bore;
an internally threaded nut section defining at least part of the nut bore;
a cylindrical section of circular perimeter, the cylindrical section disposed on or defining at least part of an outer lateral nut surface of the column nut; and
an externally threaded nut section disposed on or defining at least part of an outer lateral nut surface of the column nut.

35. A fluidic coupling assembly, comprising:
the fluidic coupling device of any of examples 22-34; and
a column extending through the collet bore and into the nut bore,
wherein the outer grasper surface is in contact with the conical cavity, and the conduit grasper is in contact with the column in the collet bore.

36. The fluidic coupling assembly of example 35, comprising the collet, wherein:
the nut bore comprises a conical nut section disposed at the second axial nut end;
the conical nut section comprises the conical cavity; and
the conduit grasper is in contact with the conical nut section.

37. The fluidic coupling assembly of example 35 or 36, comprising a second nut engagement component, and a configuration according to at least one of:
the cap is removably engaged with the second nut engagement component, and the cap is removable from the column via the collet slot; and
the cap is removably engaged with the second nut engagement component, and the conduit grasper and the cap are removable from the conduit via the collet slot.

38. The fluidic coupling assembly of example 35 or 36, comprising the collet, wherein:
the fluidic coupling device comprises an external nut engagement component configured to facilitate rotation of the conduit nut body; and an adapter comprising an adapter bore, a first adapter engagement component configured to engage the external nut engagement component, and a second adapter engagement component configured to engage the collet engagement component;
the adapter bore comprises a conical adapter section configured to contact the conduit grasper, and the conical adapter section comprises the conical cavity;
the conduit extends from the collet bore, through the adapter bore, and into the nut bore; and
the conduit grasper is in contact with the conical adapter section, and the conduit grasper is in contact with the conduit in the collet bore.

39. The fluidic coupling assembly of example 38, comprising a configuration according to at least one of:

the adapter comprises an outer lateral adapter surface, and an adapter slot extending along the device axis and extending radially from the adapter bore to the outer lateral adapter surface, the adapter is removably engaged with the external nut engagement component, and the adapter is removable from the conduit via the adapter slot;

the cap is removably engaged with the second adapter engagement component, and the cap is removable from the conduit via the collet slot;

the conduit grasper is in contact with the conical adapter section, the cap is removably engaged with the second adapter engagement component, and the conduit grasper and the cap are removable from the conduit via the collet slot; and a combination of two or more of the foregoing.

40. The fluidic coupling assembly of any of examples 35-39, wherein the conduit comprises a stationary phase effective for chromatography.

41. The fluidic coupling assembly any of examples 35-40, comprising a ferrule disposed at the first axial nut end, wherein the ferrule comprises a ferrule bore and the conduit extends from the nut bore into the ferrule bore.

42. The fluidic coupling assembly of any of examples 35-41, comprising the fluidic component, the fluidic component comprising a component bore, wherein the fluidic component is engaged with the first nut engagement component, and the conduit extends from the nut bore into the component bore.

43. The fluidic coupling assembly of example 42, comprising a ferrule, the ferrule comprising an outside tapered surface and a ferrule bore, wherein:

the conduit extends from the nut bore, through the ferrule bore, and into the component bore;

the fluidic component comprises an inside tapered surface; and the ferrule is in contact with the first axial nut end and the inside tapered surface, and is in contact with the conduit in the ferrule bore.

44. The fluidic coupling assembly of example 42 or 43, wherein the fluidic component comprises at least one of: a fluidic fitting; a gas chromatograph (GC) inlet; a detector inlet; and a fluidic union.

45. A method for installing a conduit in a fluidic coupling device, the method comprising:

providing the collet of any of examples 1-21;

removably engaging the collet with the fluidic coupling device, such that the conduit grasper is between the cap and the fluidic coupling device;

passing the conduit through the collet bore and into a device bore of the fluidic coupling device; and after the engaging and the passing, securing an axial position of the conduit by axially translating the collet in a first direction relative to the fluidic coupling device to axially translate the conduit grasper into contact with the fluidic coupling device, wherein the conduit grasper is compressed against the conduit in the collet bore.

46. The method of example 45, wherein the fluidic coupling device comprises a conical cavity, and the securing compresses the conduit grasper against the conical cavity.

47. The method of example 46, wherein the conical cavity comprises a configuration according to at least one of:

the device bore comprises the conical cavity; and the fluidic coupling device comprises an adapter engaged with a conduit nut of the fluidic coupling device, the adapter comprises an adapter bore, and the adapter bore comprises the conical cavity.

48. The method of any of examples 45-47, comprising, after the securing, removing at least the cap of the collet by a step or steps according to at least one of:

axially translating the cap in a second direction opposite to the first direction to disengage the cap from the fluidic coupling device, and moving the cap away from the conduit such that the conduit passes through the collet slot; and axially translating the collet in a second direction opposite to the first direction to disengage the collet from the fluidic coupling device, and moving the collet away from the conduit such that the conduit passes through the collet slot.

49. The method of example 48, wherein the fluidic coupling device comprises an adapter engaged with a conduit nut of the fluidic coupling device, the removably engaging comprises removably engaging the collet with the adapter, and the removing at least the cap comprises a step or steps according to at least one of:

disengaging the cap from the adapter;

moving the collet to reduce a gripping force imparted by the collet on the conduit, and disengaging the adapter from the conduit nut;

moving the collet to reduce a gripping force imparted by the collet on the conduit, disengaging the adapter from the conduit nut, and moving the adapter away from the conduit such that the conduit passes through an adapter slot of the adapter; and removing the collet and the adapter together by moving the collet to reduce a gripping force imparted by the collet on the conduit, disengaging the adapter from the conduit nut with the collet slot aligned with an adapter slot of the adapter, and moving the collet and the adapter away from the conduit such that the conduit passes through the collet slot and the adapter slot.

50. The method of any of examples 45-48, wherein the fluidic coupling device comprises an adapter, the adapter comprising an adapter bore, and the method further comprises:

removably engaging the adapter with a conduit nut of the fluidic coupling device, wherein:

the removably engaging the collet with the fluidic coupling device comprises removably engaging the collet with the adapter, such that the conduit grasper is between the cap and the adapter;

the passing comprises passing the conduit from the collet bore through the adapter bore, and into the device bore;

the securing is performed after the engaging the adapter with the fluidic coupling device, after the engaging the collet with the adapter, and after the passing; and the securing comprises axially translating the collet in the first direction relative to the adapter to axially translate the conduit grasper into contact with the adapter.

51. The method of any of examples 45-50, wherein:

the axially translating in the first direction is performed in at least a first translating step and a separate second translating step;

the first translating step comprises translating the collet by a first amount that urges the conduit grasper into contact with the conduit at the grasper bore, such that the conduit grasper holds the conduit while allowing the conduit to be axially translated through the grasper bore by pulling or pushing the conduit; and the second translating step comprises further translating the collet by a second amount that compresses the conduit grasper against the conduit, such that axial translation of the conduit is prevented.

52. The method of example 51, wherein:
the passing comprises passing the conduit through the device bore such that an end section of the conduit protrudes beyond the fluidic coupling device, the end section terminating at a conduit end; and
the method further comprises, after the first translating step and before the second translating step, axially translating the conduit until a designated axial distance of the conduit end from the fluidic coupling device is obtained,
wherein the second translating step secures the conduit to maintain the designated axial distance.

53. The method of example 51 or 52, wherein, after the second translating step, the conduit is rotatable relative to the conduit grasper without being axially translatable.

54. The method of any of examples 45-53, wherein:
the passing comprises passing the conduit through the device bore such that an end section of the conduit protrudes beyond the fluidic coupling device, the end section terminating at a conduit end; and
the method further comprises, before the securing, axially translating the conduit until a designated axial distance of the conduit end from the fluidic coupling device is obtained,
wherein the securing secures the conduit to maintain the designated axial distance.

55. The method of example 54, wherein:
the fluidic coupling device comprises a ferrule, the ferrule comprising a ferrule bore;
the passing comprises passing the conduit from the device bore through the ferrule bore, such that the end section protrudes beyond the ferrule; and
the designated axial distance is defined between the ferrule and the conduit end.

56. The method of example 55, wherein:
the fluidic coupling device comprises a ferrule, the ferrule comprising a ferrule bore; and
the passing comprises passing the conduit from the device bore through the ferrule bore, such that an end section of the conduit protrudes beyond the ferrule.

57. The method of any of examples 45-56, wherein:
the passing comprises passing the conduit through the device bore such that an end section of the conduit protrudes beyond the fluidic coupling device, the end section terminating at a conduit end; and
the method further comprises, after the securing, inserting the conduit end into a component bore of a fluidic component, and coupling the fluidic coupling device to the fluidic component.

58. The method of example 57, wherein:
the fluidic coupling device comprises a ferrule, the ferrule comprising a ferrule bore;
the passing comprises passing the conduit from the device bore through the ferrule bore, such that the end section protrudes beyond the ferrule; and
the coupling comprises compressing the ferrule against an internal tapered section of the fluidic component defining at least a portion of the component bore, and compressing the ferrule against the conduit at the ferrule bore.

59. The method of any of examples 45-48, wherein the axially translating comprises a step or steps according to at least one of:
pushing the collet into the fluidic coupling device;
pushing the collet into the fluidic coupling device, and rotating the cap relative to the fluidic coupling device;
threading the collet into the fluidic coupling device;
pushing the collet onto the fluidic coupling device;
pushing the collet onto the fluidic coupling device, and rotating the cap relative to the fluidic coupling device;
threading the collet onto the fluidic coupling device;
pushing the collet into an adapter of the fluidic coupling device, the adapter configured to engage a conduit nut of the fluidic coupling device;
pushing the collet into an adapter of the fluidic coupling device, and rotating the cap relative to the adapter, the adapter configured to engage a conduit nut of the fluidic coupling device;
threading the collet into an adapter of the fluidic coupling device, the adapter configured to engage a conduit nut of the fluidic coupling device;
pushing the collet onto an adapter of the fluidic coupling device, the adapter configured to engage a conduit nut of the fluidic coupling device;
pushing the collet onto an adapter of the fluidic coupling device, and rotating the cap relative to the adapter, the adapter configured to engage a conduit nut of the fluidic coupling device; and
threading the collet onto an adapter of the fluidic coupling device, the adapter configured to engage a conduit nut of the fluidic coupling device.

60. The method of any of examples 45-59, wherein the axially translating comprises axially translating the conduit grasper into contact with a conical cavity of the fluidic coupling device.

61. A method for installing a conduit in a fluidic coupling device, the method comprising:
providing a collet comprising a cap, a conduit grasper, and a collet bore;
removably engaging the collet with the fluidic coupling device, such that the conduit grasper is between the cap and a fluidic coupling device;
passing the conduit through the collet bore and into a device bore of the fluidic coupling device; and
after the engaging and the passing, securing an axial position of the conduit by axially translating the collet in a first direction relative to the fluidic coupling device to axially translate the conduit grasper into contact with the fluidic coupling device, wherein the conduit grasper is compressed against the conduit in the collet bore.

62. A method for installing a conduit in a fluidic coupling device, the method comprising:
providing the collet of any of examples 1-21;
providing an adapter comprising an adapter bore;
removably engaging the adapter with the fluidic coupling device;
removably engaging the collet with the adapter, such that the conduit grasper is between the cap and the adapter;
passing the conduit through the collet bore and the adapter bore, and into a device bore of the fluidic coupling device; and
after the engaging the adapter with the fluidic coupling device, after the engaging the collet with the adapter, and after the passing, securing an axial position of the conduit by axially translating the collet in a first direction relative to the adapter to axially translate the conduit grasper into contact with the adapter, wherein the conduit grasper is compressed against the conduit in the collet bore.

63. The method of example 62, wherein:
the adapter comprises a first adapter engagement component and a second adapter engagement component;

the removably engaging the adapter comprises removably engaging the first adapter engagement component with the fluidic coupling device; and the removably engaging the collet comprises removably engaging the collet with the second adapter engagement component.

64. A method for installing a conduit in a fluidic coupling device, the method comprising:
providing a collet comprising a cap, a conduit grasper, and a collet bore;
providing an adapter comprising an adapter bore;
removably engaging the adapter with the fluidic coupling device;
removably engaging the collet with the adapter, such that the conduit grasper is between the cap and the adapter;
passing the conduit through the collet bore and the adapter bore, and into a device bore of the fluidic coupling device; and
after the engaging the adapter with the fluidic coupling device, after the engaging the collet with the adapter, and after the passing, securing an axial position of the conduit by axially translating the collet in a first direction relative to the adapter to axially translate the conduit grasper into contact with the adapter, wherein the conduit grasper is compressed against the conduit in the collet bore.

65. The method of example 64, wherein:
the adapter comprises a first adapter engagement component and a second adapter engagement component;
the removably engaging the adapter comprises removably engaging the first adapter engagement component with the fluidic coupling device; and
the removably engaging the collet comprises removably engaging the collet with the second adapter engagement component.

66. The method of any of examples 45-65, comprising one or more features of any of examples 1-44.

67. A kit for installing a conduit in a fluidic coupling, the kit comprising:
the collet of any of examples 1-21; and
a fluidic coupling device comprising:
a conical cavity configured to receive the conduit grasper of the collet;
a conduit nut body comprising a first axial nut end and a second axial nut end spaced from the first axial nut end along a device axis;
a nut bore extending through the conduit nut body from the first axial nut end to the second axial nut end; and
a first nut engagement component disposed at the first axial nut end, and configured to engage a fluidic component configured to receive the conduit,
wherein the collet bore and the nut bore are configured to receive the conduit, and the collet is configured to be coupled to the fluidic coupling device.

68. The kit of example 67, wherein:
the nut bore comprises a conical nut section disposed at the second axial nut end, the conical nut section configured to contact the conduit grasper;
the conical nut section comprises the conical cavity; and
the fluidic coupling device comprises a second nut engagement component configured to engage the collet engagement component.

69. The kit of example 67, wherein the fluidic coupling device comprises an external nut engagement component configured to facilitate rotation of the conduit nut, and the kit further comprises:

an adapter comprising an adapter bore, a first adapter engagement component configured to engage the external nut engagement component, and a second adapter engagement component configured to engage the collet engagement component,
wherein the adapter bore comprises a conical adapter section configured to contact the conduit grasper, and the conical adapter section comprises the conical cavity.

70. The kit of any of examples 67-69, comprising one or more features of any of examples 1-65.

71. A chromatograph apparatus or system comprising:
a conduit comprising a conduit inlet and a conduit outlet;
a fluidic component configured to receive the conduit; and
the fluidic coupling device of any of examples 22-65, wherein the fluidic coupling device couples at least one of the conduit inlet or the conduit outlet to the fluidic component.

72. The chromatograph apparatus or system of example 71, wherein the fluidic coupling device comprises a first fluidic coupling device coupled to the conduit inlet and a second fluidic coupling device coupled to the conduit outlet.

It will be understood that terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A collet for installing a conduit in a fluidic coupling, the collet comprising:
a cap comprising an outer lateral cap surface and a collet engagement component configured to engage a fluidic coupling device;
a conduit grasper comprising an outer grasper surface, a first grasper end surface that includes a flat configuration and is orthogonal to a collet axis, and a second grasper end surface that is orthogonal to the collet axis and contiguously engages a shoulder of the cap, wherein the shoulder is orthogonal to the collet axis;
a collet bore extending through the cap and the conduit grasper along the collet axis; and
a collet slot extending along the collet axis, and extending radially from the collet bore to the outer lateral cap surface and to the outer grasper surface,
wherein the conduit grasper has a toroidal shape about the collet axis, and is composed of a flexible material such that the conduit grasper is compressible in response to a force applied to the outer grasper surface.

2. The collet of claim 1, wherein the toroidal shape of the conduit grasper is a cylinder or a torus.

3. The collet of claim 1, wherein the outer grasper surface comprises a conical grasper section, and the conduit grasper is compressible in response to a force applied to the conical grasper section.

4. The collet of claim 1, wherein the collet engagement component comprises at least one of:
- a cylindrical section of circular cross-section, the cylindrical section defining at least part of the collet bore;
- an internally threaded cap section defining at least part of the collet bore;
- a cylindrical section of a circular perimeter disposed on or defining at least part of the outer lateral cap surface; or
- an externally threaded cap section disposed on or defining at least part of the outer lateral cap surface.

5. The collet of claim 1, wherein:
- the cap comprises a cap bore surrounded by the outer lateral cap surface, and a cap slot extending radially from the cap bore to the outer lateral cap surface;
- the conduit grasper comprises a grasper bore surrounded by the outer grasper surface, and a grasper slot extending radially from the grasper bore to the outer grasper surface;
- the collet bore comprises at least a portion of the cap bore and the grasper bore; and
- the collet slot comprises the cap slot and the grasper slot, wherein the grasper bore is compressible in response to the force applied to the outer grasper surface.

6. The collet of claim 5, comprising a configuration according to at least one of:
- the conduit grasper is configured to be inserted into the cap bore;
- the grasper bore is aligned with the cap bore on the collet axis;
- the grasper slot is aligned with the cap slot in a radial direction orthogonal to the collet axis;
- the cap comprises the shoulder disposed in the cap bore, and the conduit grasper is configured to contact the shoulder;
- the cap bore comprises: a first cap bore having a first bore diameter; a second cap bore having a second bore diameter, wherein the first bore diameter is greater than the second bore diameter; and the shoulder defined between the first cap bore and the second cap bore, wherein the conduit grasper is configured to contact the shoulder; or
- a combination of two or more of the foregoing.

7. The collet of claim 5, wherein the grasper bore is aligned with the cap bore on the collet axis.

8. The collet of claim 5, wherein the grasper slot is aligned with the cap slot in a radial direction orthogonal to the collet axis.

9. The collet of claim 5, wherein the cap comprises the shoulder disposed in the cap bore, and the conduit grasper is configured to contact the shoulder.

10. The collet of claim 5, wherein the cap bore comprises: a first cap bore having a first bore diameter; a second cap bore having a second bore diameter, wherein the first bore diameter is greater than the second bore diameter; and the shoulder defined between the first cap bore and the second cap bore, wherein the conduit grasper is configured to contact the shoulder.

11. The collet of claim 1, wherein the cap and the conduit grasper comprise a configuration according to at least one of:
- the cap and the conduit grasper are separate components;
- the cap and the conduit grasper are separate components, and the conduit grasper is attached to the cap; or
- the cap and the conduit grasper are integral as a single unit, such that the cap is composed of the flexible material.

12. The collet of claim 1, wherein the flexible material comprises at least one of: a rubber; a silicone rubber; a vulcanized rubber; polyurethane; polytetrafluoroethylene (PTFE); a polyaryletherketone (PAEK); polyether ether ketone (PEEK); or a polyimide-based polymer.

13. The collet of claim 1, comprising a first collet end surface, and a second collet end surface spaced from the first collet end surface along the collet axis, wherein the collet bore and the collet slot extend from the first collet end surface to the second collet end surface, and wherein
- the cap comprises a cap bore surrounded by the outer lateral cap surface and defining at least a part of the collet bore, a first cap end surface corresponding to the first collet end surface, and a second cap end surface corresponding to the second collet end surface; and the conduit grasper is disposed in the cap bore or configured to be inserted into the cap bore.

14. The collet of claim 1, wherein the collet engagement component comprises an internally threaded cap section defining at least part of the collet bore.

15. The collet of claim 1, wherein the collet engagement component comprises a cylindrical section of a circular perimeter disposed on or defining at least part of the outer lateral cap surface.

16. The collet of claim 1, wherein the conduit grasper comprises a grasper bore including a diameter that is same as an opening width of the collet slot.

17. A collet comprising:
- a conduit grasper comprising an outer grasper surface and a grasper end surface that is orthogonal to a collet central axis and contiguously engages a shoulder of a cap in which the conduit grasper is disposed, wherein the shoulder is orthogonal to the collet central axis;
- a collet bore extending through the cap and the conduit grasper along the collet central axis; and
- a single collet slot extending along the collet central axis and extending radially from the collet central axis to include the collet central axis, wherein the collet slot includes a predetermined opening width sized for radial entry of a column disposable in the collet bore and radial removal of the cap from the column, and wherein the collet bore includes a diameter that is substantially similar to a diameter of the column; and
- a first collet end surface and a second collet end surface spaced from the first collet end surface along the collet central axis, wherein the collet slot extends from the first collet end surface to the second collet end surface, and wherein the first collet end surface and the second collet end surface are axial end faces.

* * * * *